US012343666B2

(12) United States Patent
Rowlands et al.

(10) Patent No.: US 12,343,666 B2
(45) Date of Patent: Jul. 1, 2025

(54) FILTER MEDIA INCLUDING OUT-OF-PLANE SOLID ELEMENTS, METHODS OF FORMING THEM, AND USES THEREOF

(71) Applicant: Hollingsworth & Vose Company, East Walpole, MA (US)

(72) Inventors: Mark Rowlands, Stratford-Upon-Avon (GB); James M. Witsch, Westfield, MA (US); Wei Mu, Saratoga Springs, NY (US); Stephan Daus, Frankenberg (DE)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

(21) Appl. No.: 16/842,178

(22) Filed: Apr. 7, 2020

(65) Prior Publication Data
US 2021/0308609 A1   Oct. 7, 2021

(51) Int. Cl.
*B01D 39/04*  (2006.01)
*B01D 39/18*  (2006.01)

(52) U.S. Cl.
CPC ............. *B01D 39/04* (2013.01); *B01D 39/18* (2013.01); *B01D 2239/025* (2013.01); *B01D 2239/0618* (2013.01); *B01D 2239/065* (2013.01); *B01D 2239/10* (2013.01); *B01D 2239/1225* (2013.01); *B01D 2239/1233* (2013.01); *B01D 2239/1258* (2013.01); *B01D 2239/1275* (2013.01)

(58) Field of Classification Search
None
See application file for complete search history.

(56) References Cited

U.S. PATENT DOCUMENTS

| | | |
|---|---|---|
| 5,580,459 A | 12/1996 | Powers et al. |
| 5,672,399 A | 9/1997 | Kahlbaugh et al. |
| 5,780,369 A | 7/1998 | Allison et al. |
| 5,785,725 A | 7/1998 | Cusick et al. |
| 6,171,684 B1 | 1/2001 | Kahlbaugh et al. |
| 6,916,752 B2 | 7/2005 | Berrigan et al. |
| 7,008,465 B2 | 3/2006 | Graham et al. |
| 7,137,510 B1 | 11/2006 | Klein et al. |
| 7,314,497 B2 | 1/2008 | Kahlbaugh et al. |
| 8,689,985 B2 | 4/2014 | Bates, III et al. |
| 9,694,556 B2 | 7/2017 | Turner et al. |
| 2003/0213109 A1 | 11/2003 | Neely et al. |
| 2012/0091072 A1 | 4/2012 | Kozlov et al. |
| 2012/0175298 A1 | 7/2012 | Gupta et al. |

(Continued)

FOREIGN PATENT DOCUMENTS

| | | |
|---|---|---|
| EP | 2 561 127 B1 | 1/2015 |
| JP | 2017-155385 A | 9/2017 |

OTHER PUBLICATIONS

Patanaik, A. and Anandjiwala, R.D. (2010), Hydroentanglement nonwoven filters for air filtration and its performance evaluation. J. Appl. Polym. Sci., 117: 1325-1331. (Year: 2009).*

(Continued)

*Primary Examiner* — Jason M Greene
*Assistant Examiner* — Eric J McCullough
(74) *Attorney, Agent, or Firm* — Wolf, Greenfield & Sacks, P.C.

(57) ABSTRACT

Filter media including out-of-plane solid elements are generally described. Inventive methods of forming them and uses thereof are also described.

22 Claims, 17 Drawing Sheets

(56) References Cited

U.S. PATENT DOCUMENTS

| | | |
|---|---|---|
| 2013/0108831 A1 | 5/2013 | Wu et al. |
| 2013/0198984 A1 | 8/2013 | Strandqvist et al. |
| 2014/0130469 A1* | 5/2014 | Nagy ................ B01D 39/1607 |
| | | 55/487 |
| 2015/0375150 A1 | 12/2015 | Sahbaee et al. |
| 2016/0051919 A1 | 2/2016 | Nagy et al. |
| 2016/0136553 A1 | 5/2016 | Healey et al. |
| 2016/0175754 A1 | 6/2016 | Morison et al. |
| 2017/0137981 A1* | 5/2017 | Viñas Pich ............ D04H 1/498 |
| 2017/0233909 A1 | 8/2017 | Wright et al. |
| 2017/0259524 A1 | 9/2017 | Neton et al. |
| 2018/0251925 A1 | 9/2018 | Knowlson et al. |
| 2019/0076768 A1 | 3/2019 | Goenka et al. |

OTHER PUBLICATIONS

PCT/US2021/025742, Jul. 16, 2021, International Search Report and Written Opinion.
International Search Report and Written Opinion for International Application No. PCT/US2021/025742 mailed Jul. 16, 2021.
Extended European Search Report for EP Application No. 21784299.6 dated Jul. 11, 2024.

* cited by examiner

FILTER MEDIA INCLUDING OUT-OF-PLANE SOLID ELEMENTS, METHODS OF FORMING THEM, AND USES THEREOF

TECHNICAL FIELD

Filter media including out-of-plane solid elements, methods of forming them, and uses thereof, are generally described.

BACKGROUND

Filter media are articles that can be used to remove contamination in a variety of applications. In general, filter media can be formed of a web (e.g., non-woven) of fibers. The fiber web provides a porous structure that permits fluid (e.g., fuel, oil, air) to flow through the filter media. Contaminant particles contained within the fluid may be trapped on the fibrous web. Filter media and fiber characteristics may be selected to affect filtration performance (e.g., efficiency, dust holding capacity, air permeability, etc.) as well as mechanical performance (e.g., Gurley bending dry stiffness, tensile strength, etc.).

SUMMARY

Filter media including out-of-plane solid elements are generally described.

Certain aspects are related to filter media. In some embodiments, the filter media comprises: a non-woven fibrous layer defining a plane; wherein at least a section of the non-woven fibrous layer has a gradient in relative frequency of out-of-plane solid elements having an out-of-plane orientation angle of greater than 30 degrees; wherein the section has a thickness that extends from a top surface of the section to a bottom surface of the section, wherein the top surface is the surface with the highest relative frequency of out-of-plane solid elements; wherein the section has a total volume that includes a first volume portion, a second volume portion and a third volume portion; wherein the first volume portion starts at a cross-sectional area located at 20% of the thickness and extends to a cross-sectional area located at 40% of the thickness, wherein a first relative frequency of the out-of-plane solid elements in the first volume portion is assigned to be located at a cross-sectional area located at 30% of the thickness; wherein the second volume portion starts at a cross-sectional area located at 40% of the thickness and extends to a cross-sectional area located at 60% of the thickness, wherein a second relative frequency of the out-of-plane solid elements in the second volume portion is assigned to be located at a cross-sectional area located at 50% of the thickness; wherein the third volume portion starts at a cross-sectional area located at 60% of the thickness and extends to a cross-sectional area located at 80% of the thickness, wherein a third relative frequency of the out-of-plane solid elements in the third volume portion is assigned to be located at a cross-sectional area located at 70% of the thickness; wherein the gradient in relative frequency of the out-of-plane solid elements is represented by a linear equation fit to the first relative frequency of the out-of-plane solid elements, the second relative frequency of the out-of-plane solid elements, and the third relative frequency of the out-of-plane solid elements; wherein the linear equation is $y=mx+b$, where y is the relative frequency of the out-of-plane solid elements (expressed in percentage), x is the assigned location within the thickness of the section (expressed in percentage of the thickness from the top surface of the section), m is the slope, and b is the y-intercept; and wherein the slope is greater than or equal to $-10$ and less than or equal to $c-0.01$.

Certain aspects are related to methods. In some embodiments, the method comprises: providing a non-woven precursor layer defining a plane and comprising fibers; impinging fluid on a top surface of the precursor layer to produce a modified layer, wherein at least a section of the modified layer comprises out-of-plane solid elements having an out-of-plane orientation angle of greater than 30 degrees; wherein the section has a thickness that extends from a top surface of the section to a bottom surface of the section, wherein the top surface is the surface with the highest relative frequency of out-of-plane solid elements; wherein the section has a total volume that includes a first volume portion, a second volume portion and a third volume portion; wherein the first volume portion starts at a cross-sectional area located at 20% of the thickness and extends to a cross-sectional area located at 40% of the thickness, wherein a first relative frequency of the out-of-plane solid elements in the first volume portion is assigned to be located at a cross-sectional area located at 30% of the thickness; wherein the second volume portion starts at a cross-sectional area located at 40% of the thickness and extends to a cross-sectional area located at 60% of the thickness, wherein a second relative frequency of the out-of-plane solid elements in the second volume portion is assigned to be located at a cross-sectional area located at 50% of the thickness; wherein the third volume portion starts at a cross-sectional area located at 60% of the thickness and extends to a cross-sectional area located at 80% of the thickness, wherein a third relative frequency of the out-of-plane solid elements in the third volume portion is assigned to be located at a cross-sectional area located at 70% of the thickness; wherein the section has a gradient in relative frequency of the out-of-plane solid elements across at least a portion of the thickness and the gradient is represented by a linear equation fit to the first relative frequency of the out-of-plane solid elements, the second relative frequency of the out-of-plane solid elements, and the third relative frequency of the out-of-plane solid elements; wherein the linear equation is $y=mx+b$, where y is the relative frequency of the out-of-plane solid elements (expressed in percentage), x is the assigned location within the thickness of the section (expressed in percentage of the thickness from the top surface of the section), m is the slope, and b is the y-intercept; and wherein the slope is greater than or equal to $-10$ and less than or equal to $-0.01$.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
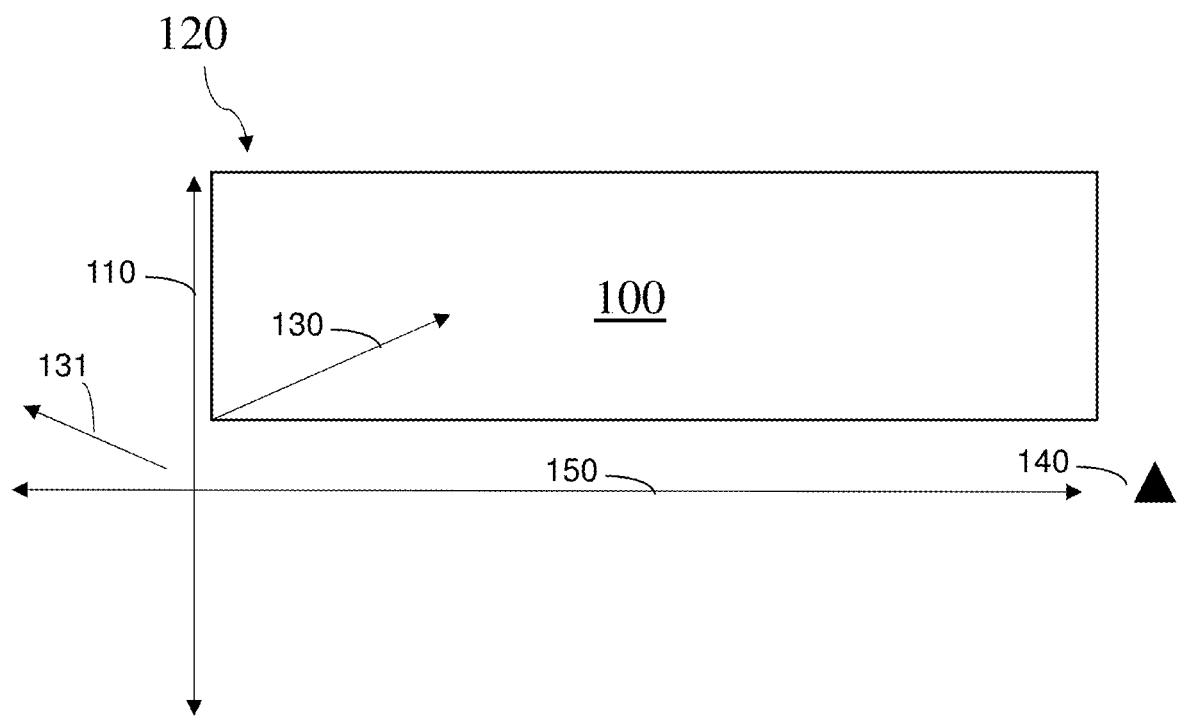
FIG. 1 is, in accordance with certain embodiments, a schematic of a filter media comprising a layer.

Disclosed herein are filter media including out-of-plane solid elements, methods of forming them and uses thereof. Solid elements may include fibers, resins, additives, portions or combinations thereof, and/or any other solid material present. The filter media may comprise a fiber (e.g., non-woven) web. The fiber web may comprise out-of-plane solid elements. As described further below, "out-of-plane solid elements" refer to solid elements that have an out-of-plane orientation angle of greater than 30 degrees relative to the X-Y plane defined by the fiber web. The out-of-plane solid elements may be present across all, or a portion, of the planar area of the web. In some embodiments, as described further below, the relative frequency of the out-of-plane solid elements (as compared to total solid elements of the fiber web) may form a gradient across at least a portion of the web thickness. For example, in certain embodiments, the relative frequency of the out-of-plane solid elements across at least a portion of the web thickness may be a gradient represented by a linear equation. In some embodiments, the out-of-plane solid elements may impart the filter media with desirable filtration (e.g., increased air permeability and/or increased dust holding capacity) and/or mechanical properties (e.g., increased tensile ratio), amongst other advantages. In certain embodiments, the solid elements may be oriented out-of-plane using a hydroentanglement process that involves impinging fluid on the surface of the fiber web. In some embodiments, the out-of-plane solid elements may be present in a layer of a filter media that includes additional layers (e.g., an efficiency layer, a backer, and/or a pre-filter layer).

According to certain embodiments, the filter media comprises a layer. In certain embodiments, the layer comprises and/or is formed of a non-woven web. For example, FIG. 1, in accordance with certain embodiments, shows filter media 120 comprising layer 100, which comprises and/or is formed of a non-woven web. In certain embodiments, the non-woven web comprises fibers. In some embodiments, the non-woven web comprises out-of-plane solid elements, as described further below.

The fibers of the non-woven fibrous layer may include a variety of suitable types of fibers including synthetic fibers, glass fibers (e.g., microglass fibers and/or chopped strand glass fibers), cellulose fibers, cellulose derivative fibers (e.g., lyocell fibers and/or rayon fibers), and/or combinations thereof.

Examples of suitable cellulose fibers may include softwood fibers, hardwood fibers, and combinations thereof. Examples of softwood cellulose fibers may include fibers that are derived from the wood of pine, cedar, alpine fir, douglas fir, and spruce trees. Examples of hardwood cellulose fibers may include fibers derived from the wood of *eucalyptus* (e.g., *Grandis*), maple, birch, and other deciduous trees.

Suitable cellulose fibers may have any suitable amount of hardwood fibers. For example, in some embodiments, the cellulose fibers have greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % hardwood fibers relative to the total weight of the cellulose fibers. In some embodiments, the cellulose fibers have less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % hardwood fibers relative to the total weight of the cellulose fibers. Combinations of these ranges are also possible (e.g., 0.01 wt %-100 wt %). In some embodiments, the cellulose fibers have 100 wt % hardwood fibers relative to the total weight of the cellulose fibers. In some embodiments, the cellulose fibers do not have hardwood fibers.

Suitable cellulose fibers may have any suitable amount of softwood fibers. For example, in some embodiments, the cellulose fibers have greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % softwood fibers relative to the total weight of the cellulose fibers. In some embodiments, the cellulose fibers have less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % softwood fibers relative to the total weight of the cellulose fibers. Combinations of these ranges are also possible (e.g., 0.01 wt %-100 wt %). In some embodiments, the cellulose fibers have 100 wt % softwood fibers relative to the total weight of the cellulose fibers. In some embodiments, the cellulose fibers do not have softwood fibers.

Non-limiting examples of suitable synthetic fibers include fibers comprising one or more of the following materials: poly(ester) s (e.g., poly(ethylene terephthalate), poly(butylene terephthalate)), poly(carbonate), poly(amide) s (e.g., various nylon polymers), poly(aramid) s, poly(imide) s, poly(olefin) s (e.g., poly(ethylene), poly(propylene)), poly (ether ketone), poly(acrylic) s (e.g., poly(acrylonitrile)), poly(vinyl alcohol), regenerated cellulose (e.g., synthetic cellulose such cellulose acetate, lyocell, rayon), fluorinated polymers (e.g., poly(vinylidene difluoride) (PVDF)), copolymers of poly(ethylene) and PVDF, and poly(ether sulfone) s. In some embodiments, the synthetic fibers are organic polymer fibers.

Various synthetic fiber configurations may also be used. In some embodiments, synthetic fibers may have a single composition; or, in other embodiments, synthetic fibers may have multiple compositions. That is, an individual synthetic fiber may have a single composition in some embodiments; or, in other embodiments, an individual synthetic fiber may have multiple compositions. When the fibers have multiple compositions, the fibers may be referred to as multi-component fibers. An example of a multi-component fiber is a bi-component fiber which includes a first material and a second material. Multicomponent fibers may have a variety of spatial arrangements of their components including a core-sheath configuration (e.g., the first material may be a sheath material that surrounds the second material which is a core material), a side by side configuration, a segmented pie arrangement, a tri-lobal arrangement (e.g., the first material may be at the tip of the lobe) and an arrangement of localized regions of one component in the other component (e.g., "islands in sea').

In embodiments where the non-woven fibrous layer comprises cellulose fibers, the non-woven fibrous layer may have any suitable amount of cellulose fibers. In some embodiments, the non-woven fibrous layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose fibers relative to the total weight of the non-woven fibrous layer. In some embodiments, the non-woven fibrous layer comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % cellulose fibers relative to the total weight of the non-woven fibrous layer. Combinations of these ranges are also possible (e.g., greater than or equal to 0.01 wt % and less than or equal to 100 wt %). In some embodiments, the non-woven fibrous layer comprises 100 wt % cellulose fibers relative to the total weight of the non-woven fibrous layer. In some embodiments, the non-woven fibrous layer does not have cellulose fibers.

In embodiments where the non-woven fibrous layer comprises cellulose derivative fibers, the non-woven fibrous layer may have any suitable amount of cellulose derivative fibers. In some embodiments, the non-woven fibrous layer comprises greater than or equal to 0.01 wt %, greater than or equal to 1 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt % cellulose derivative fibers relative to the total weight of the non-woven fibrous layer. In some embodiments, the non-woven fibrous layer comprises less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, or less than or equal to 1 wt % cellulose derivative fibers relative to the total weight of the non-woven fibrous layer. Combinations of these ranges are also possible (e.g., greater than or equal to 0.01 wt % and less than or equal to 50 wt %, greater than or equal to 0.01 wt % and less than or equal to 35 wt %, greater than or equal to 0.01 wt % and less than or equal to 20 wt %). In some embodiments, the non-woven fibrous layer does not have cellulose derivative fibers.

In embodiments where the non-woven fibrous layer comprises synthetic fibers, the non-woven fibrous layer may have any suitable amount of synthetic fibers. In some embodiments, the non-woven fibrous layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, or greater than or equal to 60 wt % synthetic fibers relative to the total weight of the non-woven fibrous layer. In some embodiments, the non-woven fibrous layer comprises less than or equal to 70 wt %, less than or equal to 60 wt %, less than or equal to 50 wt %, less than or equal to 40 wt %, less than or equal to 35 wt %, less than or equal to 30 wt %, less than or equal to 20 wt %, less than or equal to 10 wt %, or less than or equal to 1 wt % synthetic fibers relative to the total weight of the non-woven fibrous layer. Combinations of these ranges are also possible (e.g., greater than or equal to 0.01 wt % and less than or equal to 70 wt %, greater than or equal to 0.01 wt % and less than or equal to 50 wt %, greater than or equal to 0.01 wt % and less than or equal to 35 wt %, greater than or equal to 0.01 wt % and less than or equal to 30 wt %, or greater than or equal to 0.01 wt % and less than or equal to 20 wt %). In some embodiments, the non-woven fibrous layer does not have synthetic fibers.

In embodiments where the non-woven fibrous layer comprises glass fibers, the non-woven fibrous layer may have any suitable amount of glass fibers. In some embodiments, the non-woven fibrous layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, or greater than or equal to 60 wt % glass fibers relative to the total weight of the non-woven fibrous layer. In some embodiments, the non-woven fibrous layer comprises less than or equal to 70 wt %, less than or equal to 60 wt %, less than or equal to 50 wt %, less than or equal to 40 wt %, less than or equal to 35 wt %, less than or equal to 30 wt %, less than or equal to 20 wt %, less than or equal to 10 wt %, or less than or equal to 1 wt % glass fibers relative to the total weight of the non-woven fibrous layer. Combinations of these ranges are also possible (e.g., greater than or equal to 0.01 wt % and less than or equal to 70 wt %, greater than or equal to 0.01 wt % and less than or equal to 50 wt %, greater than or equal to 0.01 wt % and less than or equal to 35 wt %, greater than or equal to 0.01 wt % and less than or equal to 30 wt %, or greater than or equal to 0.01 wt % and less than or equal to 20 wt %). In some embodiments, the non-woven fibrous layer does not have glass fibers.

In some embodiments, the type of fiber and/or fiber properties (e.g., average fiber diameter or average fiber length) can affect the relative frequency of out-of-plane solid elements. For example, fibers with smaller diameters and/or smaller lengths may, in some embodiments, be easier (e.g., require less pressure) to push out-of-plane than fibers with larger diameters and/or longer lengths.

Regardless of the fiber types, the non-woven fibrous layer may have any suitable average fiber diameter. In some embodiments, the non-woven fibrous layer has an average fiber diameter of greater than or equal to 1 micron, greater than or equal to 2 microns, greater than or equal to 3 microns, greater than or equal to 4 microns, greater than or equal to 5 microns, greater than or equal to 10 microns, greater than or equal to 15 microns, greater than or equal to 20 microns, greater than or equal to 25 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the non-woven fibrous layer has an average fiber diameter of less than or equal to 100 microns, less than or equal to 90 microns, less than or equal to 80 microns, less than or equal to 75 microns, less than or equal to 70 microns, less than or equal to 60 microns, less than or equal to 50 microns, less than or equal to 40 microns, less than or equal to 35 microns, less than or equal to 30 microns, less than or equal to 25 microns, less than or equal to 20 microns, less than or equal to 15 microns, or less than or equal to 10 microns. Combinations of these ranges are also possible (e.g., greater than or equal to 3 microns and less than or equal to 50 microns, greater than or equal to 5 microns and less than or equal to 35 microns, or greater than or equal to 1 microns and less than or equal to 100 microns). Average diameter of fibers may be measured used scanning electron microscopy Regardless of the fiber types, the non-woven fibrous layer may have any suitable average fiber length. In some embodiments, the non-woven fibrous layer has an average fiber length of greater than or equal to 1 millimeter, greater than or equal to 2 millimeters, greater than or equal to 3 millimeters, greater than or equal to 4 millimeters, greater than or equal to 5 millimeters, greater than or equal to 10 millimeters, greater than or equal to 15 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the non-woven fibrous layer has an average fiber length of less than or equal to 52 millimeters, less than or equal to 50 millimeters, less than or equal to 45 millimeters, less than or equal to 42 millimeters, less than or equal to 39 millimeters, less than or equal to 35 millimeters, less than or equal to 30 millimeters, less than or equal to 26 millimeters, less than or equal to 23 millimeters, less than or equal to 20 millimeters, less than or equal to 15 millimeters, less than or equal to 10 millimeters, less than or equal to 5 millimeters, less than or equal to 4 millimeters, less than or equal to 3 millimeters, or less than or equal to 2 millimeters. Combinations of these ranges are also possible (e.g., greater than or equal to 1 millimeter and less than or equal to 52 millimeters, greater than or equal to 3 millimeters and less than or equal to 39 millimeters, or greater than or equal to 3 millimeter and less than or equal to 26 millimeters). In some embodiments, the non-woven fibrous layer comprises continuous fibers having an average length of greater than 5 inches.

In embodiments where the non-woven fibrous layer comprises cellulose fibers, the cellulose fibers may have any suitable average diameter. In some embodiments, the cellulose fibers have a diameter of greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the cellulose fibers have a diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, or less than or equal to 3 microns. Combinations of these ranges are also possible (e.g., greater than or equal to 1 micron and less than or equal to 100 microns, greater than or equal to 3 microns and less than or equal to 50 microns, or greater than or equal to 5 microns and less than or equal to 35 microns).

The cellulose fibers may have any suitable average length. In some embodiments, the cellulose fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, or greater than or equal to 9 millimeters. In some embodiments, the cellulose fibers have an average length of less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 10 millimeters, greater than or equal to 0.3 millimeters and less than or equal to 7 millimeters, or greater than or equal to 0.5 millimeters and less than or equal to 4 millimeters).

In embodiments where the non-woven fibrous layer comprises cellulose derivative fibers, the cellulose derivative fibers may be regenerated fibers (e.g., lyocell fibers and/or rayon fibers). In some embodiments, the cellulose derivative fibers may be fibrillated fibers. In embodiments where the cellulose derivative fibers are fibrillated fibers, the cellulose derivative fibers may have any suitable Canadian Standard Freeness (CSF). In some embodiments, the cellulose derivative fibers have a CSF of greater than or equal to 0 mL, greater than or equal to 1 mL, greater than or equal to 5 mL, greater than or equal to 10 mL, greater than or equal to 20 mL, greater than or equal to 30 mL, greater than or equal to 40 mL, greater than or equal to 50 mL, greater than or equal to 60 mL, greater than or equal to 70 mL, greater than or equal to 80 mL, greater than or equal to 90 mL, greater than or equal to 100 mL, greater than or equal to 125 mL, greater than or equal to 150 mL, greater than or equal to 175 mL, greater than or equal to 200 mL, greater than or equal to 250 mL, greater than or equal to 300 mL, greater than or equal to 350 mL, greater than or equal to 400 mL, or greater than or equal to 450 mL. In some embodiments, the cellulose derivative fibers have a CSF of less than or equal to 500 mL, less than or equal to 450 mL, less than or equal to 400 mL, less than or equal to 350 mL, less than or equal to 300 mL, less than or equal to 250 mL, less than or equal to 200 mL, less than or equal to 175 mL, less than or equal to 150 mL, less than or equal to 125 mL, less than or equal to 100 mL, less than or equal to 90 mL, less than or equal to 80 mL, less than or equal to 70 mL, less than or equal to 60 mL, less than or equal to 50 mL, less than or equal to 40 mL, less than or equal to 30 mL, less than or equal to 20 mL, or less than or equal to 10 mL. Combinations of these ranges are also possible (e.g., greater than or equal to 0 mL and less than or equal to 500 mL, greater than or equal to 0 mL and less than or equal to 200 mL, or greater than or equal to 0 mL and less than or equal to 100 mL). CSF may be measured according to ISO 5267-2:2001.

The cellulose derivative fibers may have any suitable average length. In some embodiments, the cellulose derivative fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, or greater than or equal to 11 millimeters. In some embodiments, the cellulose derivative fibers have an average length of less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 12 millimeters, greater than or equal to 0.3 millimeters and less than or equal to 10 millimeters, or greater than or equal to 0.5 millimeters and less than or equal to 8 millimeters).

In embodiments where the non-woven fibrous layer comprises synthetic fibers, the synthetic fibers may have any suitable average diameter. In some embodiments, the synthetic fibers have an average diameter of greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the synthetic fibers have an average diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.4 microns and less than or equal to 5 microns, greater than or equal to 0.7 microns and less than or equal to 5 microns, greater than or equal to 1 micron and less than or equal to 5 microns, greater than or equal to 5 microns and less than or equal to 100 microns, greater than or equal to 5 microns and less than or equal to 50 microns, or greater than or equal to 5 microns and less than or equal to 35 microns).

Synthetic fibers may have any suitable average length. In some embodiments, the synthetic fibers have an average length of greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 12 mm, greater than or equal to 14 mm, greater than or equal to 16 mm, greater than or equal to 18 mm, greater than or equal to 20 mm, greater than or equal to 22 mm, or greater than or equal to 24 mm. In some embodiments, the synthetic fibers have an average length of less than or equal to 26 mm, less than or equal to 24 mm, less than or equal to 22 mm, less than or equal to 20 mm, less than or equal to 18 mm, less than or equal to 16 mm, less than or equal to 14 mm, less than or equal to 12 mm, less than or equal to 10 mm, less than or equal to 9 mm, less than or equal to 8 mm, less than or equal to 7 mm, less than or equal to 6 mm, less than or equal to 5 mm, less than or equal to 4 mm, or less than or equal to 3 mm. Combinations of these ranges are also possible (e.g., greater than or equal to 1 mm and less than or equal to 26 mm, greater than or equal to 1 mm and less than or equal to 5 mm, greater than or equal to 1 mm and less than or equal to 4 mm, greater than or equal to 1 mm and less than or equal to 3 mm, greater than or equal to 3 mm and less than or equal to 26 mm, greater than or equal to 3 mm and less than or equal to 20 mm, or greater than or equal to 5 mm and less than or equal to 13 mm).

In embodiments where the non-woven fibrous layer comprises glass fibers, the glass fibers may have any suitable average diameter. In some embodiments, the glass fibers have an average diameter of greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 20 microns, or greater than or equal to 25 microns. In some embodiments, the glass fibers have an average diameter of less than or equal to 30 microns, less than or equal to 25 microns, less than or equal to 20 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.1 microns and less than or equal to 10 microns, greater than or equal to 0.4 microns and less than or equal to 6 microns, greater than or equal to 0.4 microns and less than or equal to 3 microns, greater than or equal to 4 microns and less than or equal to 30 microns, greater than or equal to 6 microns and less than or equal to 20 microns, or greater than or equal to 7 microns and less than or equal to 14 microns).

The glass fibers may have any suitable average length. In some embodiments, the glass fibers have an average length of greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, greater than or equal to 11 millimeters, greater than or equal to 12 millimeters, greater than or equal to 15 millimeters, greater than or equal to 17 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the glass fibers have an average length of less than or equal to 52 millimeters, less than or equal to 50 millimeters, less than or equal to 45 millimeters, less than or equal to 40 millimeters, less than or equal to 35 millimeters, less than or equal to 30 millimeters, less than or equal to 25 millimeters, less than or equal to 20 millimeters, less than or equal to 17 millimeters, less than or equal to 15 millimeters, less than or equal to 13 millimeters, less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, or less than or equal to 4 millimeters. Combinations of these ranges are also possible (e.g., greater than or equal to 3 millimeters and less than or equal to 52 millimeters, greater than or equal to 3 millimeters and less than or equal to 20 millimeters, or greater than or equal to 6 millimeters and less than or equal to 13 millimeters).

In some embodiments, the non-woven fibrous layer defines a plane (i.e., the XY-plane). For example, in accordance with certain embodiments, layer 100 in FIG. 1 and FIG. 2 defines a plane with x-axis 150 and y-axis 140 (which is represented by a triangle, which indicates that the y-axis goes into the page). In certain embodiments, the non-woven fibrous layer comprises in-plane fibers (corresponding to in-plane solid elements). For example, in accordance with certain examples, layer 100 in FIG. 1 and FIG. 2 includes fibers (corresponding to solid elements) that are oriented along the plane defined by x-axis 150 and y-axis 140. Typical non-woven fibrous layers comprise fibers (corresponding to solid elements) that are generally oriented in the direction of the XY-plane. However, in some embodiments described herein, some of the in-plane fibers (corresponding to in-plane solid elements) of a non-woven fibrous layer may be pushed out of plane (e.g., with the use of impinging fluid, such as with the use of hydrojets), such that they have a greater degree of orientation in the Z-direction (i.e., out-of-plane).

Figure 2:
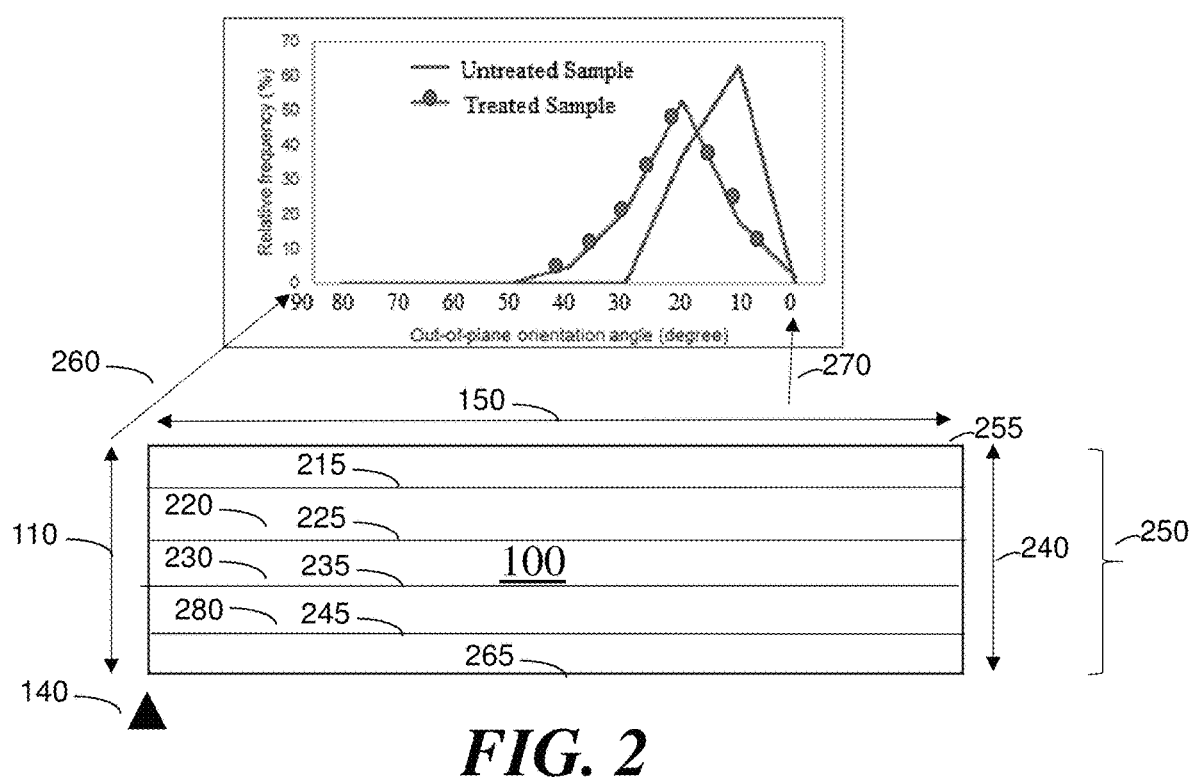
FIG. 2 is a schematic of a layer in accordance with certain embodiments compared to a plot of relative frequencies of out-of-plane solid elements in a sample that has been treated with hydroentanglement and a sample that has not.

In some embodiments, at least a section of the non-woven fibrous layer comprises fibers (corresponding to solid elements) with a greater degree of orientation in the Z-direction. For example, in accordance with certain embodiments, layer 100 in FIG. 1 or FIG. 2 comprises fibers (corresponding to solid elements) that are not in line with the plane defined by x-axis 150 or y-axis 140, such as fibers (corresponding to solid elements) aligned with z-axis 110 of FIG. 1 and FIG. 2. As shown in FIG. 2 by dotted arrow 260, a fiber that is in line with z-axis 110 would have a 90 degree orientation angle relative to the XY-plane. Similarly, a fiber aligned with line 130 in FIG. 1, which is 30 degrees out of the plane defined by x-axis 150 and y-axis 140, in the direction of z-axis 110, would have an orientation angle of 30 degrees relative to the XY-plane. In contrast, as shown in FIG. 2 by dotted arrow 270, a fiber that is oriented in the direction of the plane defined by x-axis 150 and y-axis 140 would have an orientation angle of zero degrees relative to the XY-plane.

In certain embodiments, the pressure of the impinging fluid can form a gradient in the amount of fibers (corresponding to solid elements) with greater orientation in the Z-direction (e.g., more fibers are pushed out of plane on the side of the non-woven fibrous layer closer to the hydrojets than on the side of the non-woven fibrous layer farther from the hydrojets). The amount of fibers with greater orientation in the Z-direction may be characterized by determining the orientation angle of the solid elements (e.g., fibers, or portions thereof), where the sample (e.g., the non-woven fibrous layer, or a section thereof) is divided into cube elements with a 1 micron3 volume (i.e., each element has dimensions of 1 micron×1 micron×1 micron), and each of the cube elements are classified as a solid element (i.e., an element where 50% or more of the volume of the element is a solid material) or a void element (i.e., an element where less than 50% of the volume of the element is a solid material, such as a pore).

As used herein, out-of-plane solid elements are solid elements with an orientation angle greater than 30 degrees relative to the XY-plane. A suitable technique for measuring the orientation angle is described further below. Referring to FIG. 1, for example, an out-of-plane solid element would be any solid element with an orientation angle to the left of line 130 (which is at 30 degrees relative to the XY-plane established by x-axis 150 and y-axis 140) and to the right of z-axis 110 or any solid element with an orientation angle to the left of z-axis 110 and to the right of line 131 (which is at 30 degrees relative to the XY-plane established by x-axis 150 and y-axis 140).

In some embodiments, the out-of-plane solid element may have an orientation angle (relative to the XY-plane) of greater than or equal to 35 degrees, greater than or equal to 40 degrees, greater than or equal to 45 degrees, greater than or equal to 50 degrees, greater than or equal to 60 degrees, greater than or equal to 70 degrees, or greater than or equal to 80 degrees. In some embodiments, the out-of-plane orientation angle is less than or equal to 90 degrees (e.g., a fiber with an orientation angle to the right or to the left of z-axis 110 in FIG. 1 or FIG. 2), less than or equal to 80 degrees, less than or equal to 70 degrees, less than or equal to 60 degrees, less than or equal to 50 degrees, or less than or equal to 40 degrees. Combinations of these ranges are also possible (e.g., 30-90 degrees or 30-60 degrees).

The orientation angle of a solid element relative to the XY-plane may be determined by drawing a line through a point in the center of the solid element such that the line is oriented to extend the longest possible distance through solid material before hitting non-solid material (e.g., a pore or void). The angle between that longest line and the XY-plane is then determined and that is the orientation angle of the solid element.

As used herein, the relative frequency of out-of-plane solid elements (i.e., solid elements with an orientation angle of greater than 30 degrees relative to the XY-plane) is the percentage of out-of-plane solid elements compared to total solid elements of a studied volume (e.g., a fiber web). For example, if there were 1,000,000 1 cubic micron elements in a volume portion, 500,000 of which were solid elements, and if 100,000 of those solid elements had an orientation angle of greater than 30 degrees, the percentage of out-of-plane solid elements compared to total solid elements would be 20% (i.e., 100,000/500,000×100), and, thus, the relative frequency of out-of-plane solid elements is defined to be 20%.

There may be multiple suitable methods of determining the orientation angle of a solid element or the relative frequency of out-of-plane solid elements in a given volume, and multiple types of software that are capable of providing such an approximation.

In one such method, the orientation of the solid elements and the relative frequency of out-of-plane solid elements in a layer/section can be determined with x-ray computer tomography (CT). In accordance with certain embodiments, this can be accomplished via the following general steps, which will be discussed in more detail below: (1) taking a number of 2D x-ray radiographs of the sample at various projection angles; (2) stacking the 2D radiographs together to produce a 3D volume rendering; (3) analyzing the 3D representation (e.g., with commercially available software) to determine the solid orientation tensor in each solid element (i.e., solid voxel) of the 3D representation, and the average orientation tensor of the overall 3D representation; and (4) converting the (average) orientation tensor(s) to out-of-plane orientation angle(s).

Any suitable x-ray computer tomography system can be used to take a number of x-ray radiographs of the sample at various projection angles. A non-limiting example of a suitable imaging system is the commercially available ZEISS Xradia Versa 510 submicron X-ray imaging system, manufactured by Carl Zeiss Microscopy GmbH, 07745 Jena, Germany, which was used in the examples described herein. Any suitable spatial image resolution can be used. A spatial image resolution of 0.9 microns was used in the examples described herein (i.e., the elements had a volume of 0.9 $\mu m^3$); however, any spatial image resolution (i.e., element volume) of 1 $\mu m^3$ or less will provide accurate results. In some embodiments, the imaging field of view should include the entire thickness of the sample. In certain embodiments, the cross-sectional field of view should be as large as practical, for example, in some cases, the cross-sectional field should be at least 2 mm×2 mm.

Once the x-ray radiographs have been obtained, in accordance with some embodiments, any suitable computer method (e.g., scanner supplied software and algorithms) can be used to convert the radiographs into stacks of 2D gray-scale slices that together represent a 3D volume rendering of the given sample. In some cases, each individual 2D gray-scale image in the stack consists of light intensity data scaled in an 8-bit range (0-255 possible values). To convert the 2D radiographs into a 3D binary volume rendering of the structure with separated solid elements and void elements (i.e., solid voxels and void voxels), it can be helpful, in some instances, to preprocess the 2D images (e.g., by applying appropriate image filters to reduce speckling and noise) and apply an appropriate intensity cut-off/threshold value (i.e., an appropriate value between 0 and 255, where any number above that threshold is considered to be a solid material (e.g., a fiber) while any number below that threshold is considered to be a void/pore space) to correctly segment the elements into solid elements and void elements. In some instances, the computational method establishes a cut-off value (i.e., threshold value) for distinguishing void elements from solid elements to generate the 3D computational representation of the filter media. In such cases, the accuracy of the cut-off value may be confirmed by comparing the computationally determined air permeability of the 3D computational representation of the filter media to the experimentally determined air permeability of the actual filter media. In embodiments in which the computationally and experimentally determined air permeabilities are substantially different, the threshold value may be changed by the user until the air permeabilities are substantially the same. Any suitable software package can be used for this step. A non-limiting example of a suitable software package is the GeoDict 2018 software package (Math2Market GmbH, Richard-Wagner-Straße 1, 67655 Kaiserslautern, Germany), which was used in the examples described herein to perform image stack preprocessing, thresholding, binary volume rendering, and consequent CFD simulations.

For example, the ImportGeo Volume module of the software was used to convert stacks of raw images into 3D voxelized geometry. The 2D images were preprocessed by applying a median filter with a radius of 2 elements to reduce noise. The applied intensity cut-off/threshold value was chosen based on a match of experimentally measured air permeability of the sample with the computed air permeability. That is, the air permeability was experimentally measured according to TAPPI T 251 with TEXTEST FX 3300 AIR PERMEABILITY TESTER III (Textest AG, Zurich). The FlowDict module of the GeoDict 2018 software package was then used to efficiently solve Stoke's equation $(-\mu\alpha\alpha u + \alpha p = 0, \alpha u = 0)$, with no slip boundary conditions in the pore space. The transverse air permeability of the virtual media was then determined by the domain averaging of the resulting velocity field in transverse direction.

Various threshold values were selected, and each selected threshold value resulted in unique 3D voxel representations of the structure. As the next step, air permeability of the structure corresponding to each thresholding value was computed and compared to the measured air permeability. Then the thresholding value (and corresponding structure) that had the closest match between the computed air permeability and the measured air permeability was selected for subsequent analysis. The best match of the computed air permeability with the measured air permeability was the criteria for the selection of the threshold value.

In certain embodiments, once the 2D radiographs have been stacked together to produce a 3D volume rendering and the stack has been preprocessed and thresholded, the 3D media representation can then be analyzed with any suitable software program to determine the out-of-plane solid element orientation angle. As a non-limiting example, the FiberGuess module of the Geodict 2018 was used in the examples described herein. As explained in detail in the User Guide, the Estimate Fiber Orientation function of the FiberGuess module divides the 3D representation into 50×50×50 elements (i.e., voxel subdomains) (although any suitable subdomain could be used), and uses a star length distribution method to determine the average orientation tensor in each solid element.

Figure 16A:
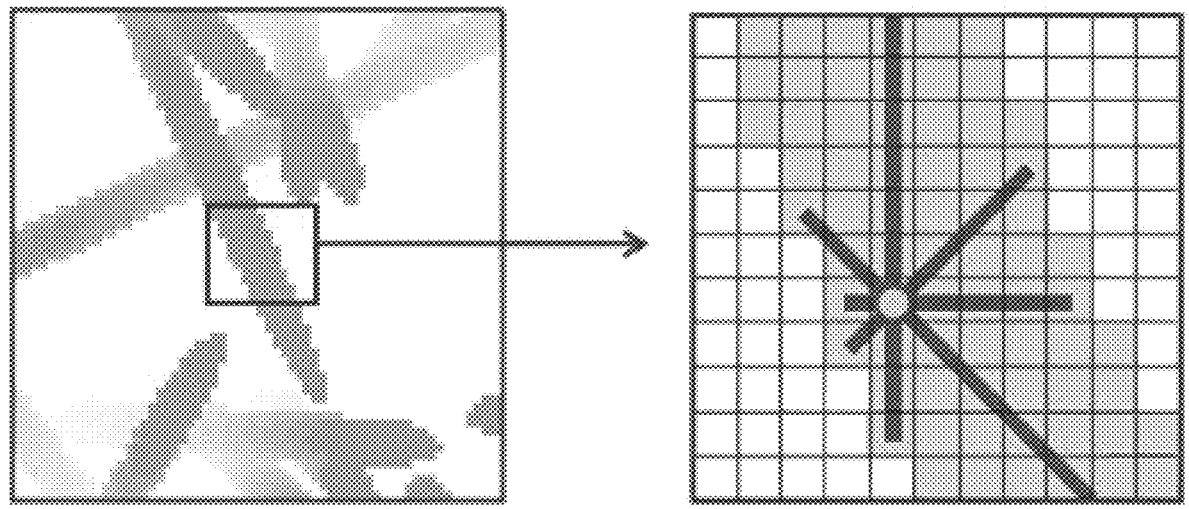
FIG. 16A is a portion of one possible method of determining fiber orientation angle.

The global averaging method of orientation analysis and anisotropy determination (such as the Star Length Distribution (SLD) method) is one method that works well for fibers with complex morphology (e.g., cellulose fibers). With this method, the software divides the 3D representation into elements (i.e., voxels), which, in some embodiments, are the smallest units of 3D image analysis possible, and then classifies the elements as solid elements or void elements. The software then starts with one point in the center of each solid element, and draws the longest line possible containing that point without hitting a pore/void. The software accomplishes this by drawing the longest line possible containing that same point for every 5 degrees of the 360 degrees around the point (e.g., at angles in-plane and out-of-plane), and then selecting the longest line out of those lines. An embodiment where lines are drawn every 45 degrees (instead of 5 degrees) is shown in FIG. 16A.

This allows the software to determine the orientation tensor at that point, which is the orientation tensor for the solid element. The software then averages the orientation tensors of each solid element within the studied volume to determine the average orientation tensor of the studied volume. The average orientation tensor (T) (or the individual orientation tensor of a solid element of interest) can then be used to solve the following matrices to determine the values of various components (e.g., $a_{33}$, $p_3$, etc.) of the matrices:

$$T = \begin{pmatrix} a_{11} & a_{12} & a_{13} \\ . & a_{22} & a_{23} \\ . & . & a_{33} \end{pmatrix} = \begin{pmatrix} p_1^2 & p_1 p_2 & p_1 p_3 \\ p_1 p_2 & p_2^2 & p_2 p_3 \\ p_1 p_3 & p_2 p_3 & p_3^2 \end{pmatrix}$$

Orientation tensor is a method that uses a 3×3 matrix where the sum of the diagonal elements equals 1, its eigenvectors give the main directions, and the eigenvalues represent relative magnitude of orientation along this direction. It has been demonstrated that for artificial structures with idealized geometries where an analytical solution for orientation is available (such as for a sphere, rods oriented in one direction, an ellipsoid with a known degree of anisotropy, etc.) the SLD method gives results within 1% of the analytical solution. This method can be accomplished with many types of software, such as the FiberGuess module of the Geodict 2018 software package.

Once the matrices have been solved, the values of the various components (e.g., $a_{33}$ or $p_3$) can be used to determine the value of θ (theta) using one or more of the following equations:

$p_1 = \sin\theta \cos\varphi$ $p_2 = \sin\theta \sin\varphi$ $p_3 = \cos\theta$ $\cos(\theta) = \sqrt{a_{33}}$.

Theta (θ) is the angle between the longest line in the solid element (which is the orientation of the solid material of the solid element, discussed above) and the z-axis. 90 degrees minus theta (90°−θ) gives the out-of-plane orientation angle relative to the XY-plane.

Figure 16B:
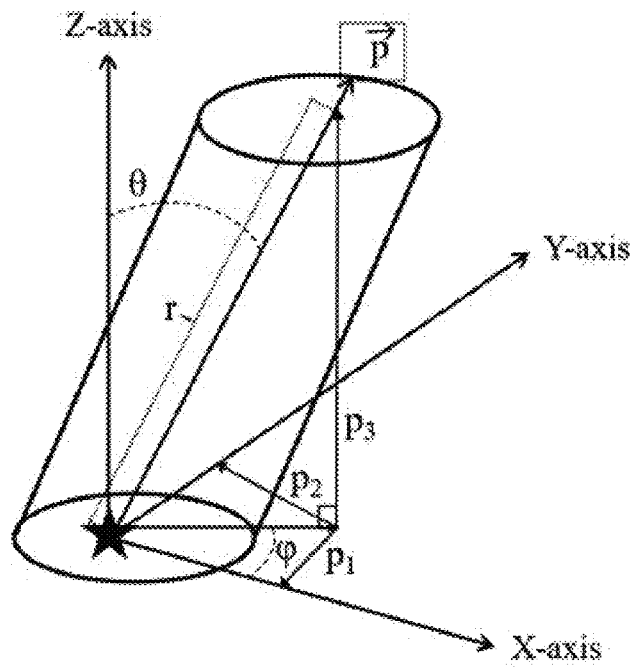
FIG. 16B is a portion of one possible method of determining fiber orientation angle.

For example, if the fiber (i.e., a solid material) shown in FIG. 16B were in a solid element, the software might pick the point represented by the star, and determine the longest lines possible containing that point without hitting a pore/void at every orientation 5 degrees around the star (e.g., at angles in-plane and out-of-plane). In this case, the longest line without hitting a pore/void from the star would be the line represented by the p in the box. This line represents the orientation of the solid element. The orientation of the solid element is characterized by two angles: θ (theta), which is the angle between the z-axis and the orientation of the solid element, and q (phi), which is the angle between the x-axis and the orientation of the solid element. Rather than providing θ (theta) directly, the software might provide an orientation tensor of the point/solid element instead. The software could then take the orientation tensor of each solid element within the studied volume and average them to provide the average orientation tensor of the studied volume. The average orientation tensor (T) of the volume (or an individual orientation tensor of a solid element of interest)

can then be used to solve the matrices described above in order to determine the values of various components of the matrices (e.g., $a_{33}$ or $p_3$). Once the values of these components have been determined, the value of 0 (theta) can be determined using the equations described above. Once theta is known, the out-of-plane orientation angle relative to the XY-plane can be calculated by subtracting theta from 90 degrees. This would provide the average orientation angle of the studied volume.

In some embodiments, the non-woven fibrous layer has an area of the XY-plane. In some embodiments, the area of the XY-plane of the section of the non-woven fibrous layer that comprises out-of-plane solid elements is a certain percentage of the area of the XY-plane of the non-woven fibrous layer. In certain embodiments, the area of the XY-plane of the section of the non-woven fibrous layer that comprises out-of-plane solid elements is greater than or equal to 1%, greater than or equal to 5%, greater than or equal to 10%, greater than or equal to 20%, greater than or equal to 30%, greater than or equal to 33%, greater than or equal to 40%, greater than or equal to 50%, greater than or equal to 60%, or greater than or equal to 66% of the area of the XY-plane of the non-woven fibrous layer. In some embodiments, the area of the XY-plane of the section of the non-woven fibrous layer that comprises out-of-plane solid elements is less than or equal to 100%, less than or equal to 90%, less than or equal to 80%, less than or equal to 70%, less than or equal to 60%, less than or equal to 50%, or less than or equal to 40% of the area of the XY-plane of the non-woven fibrous layer. Combinations of these ranges are also possible (e.g., 1-100%, 33-100%, or 66-100%). In some embodiments, the area of the XY-plane of the section of the non-woven fibrous layer that comprises out-of-plane solid elements is 100% of the area of the XY-plane of the non-woven fibrous layer.

In some embodiments, the non-woven fibrous layer has a thickness (as measured in the Z-plane). For example, in accordance with certain embodiments, in FIG. 2, layer 100 has thickness 240 along z-axis 110. In some embodiments, the section of the non-woven fibrous layer that comprises out-of-plane solid elements is a certain percentage of the thickness of the non-woven fibrous layer. In certain embodiments, the section of the non-woven fibrous layer that comprises out-of-plane solid elements is greater than or equal to 1%, greater than or equal to 5%, greater than or equal to 10%, greater than or equal to 20%, greater than or equal to 30%, greater than or equal to 40%, greater than or equal to 50%, greater than or equal to 60%, greater than or equal to 70%, or greater than or equal to 80% of the thickness of the non-woven fibrous layer. In some embodiments, the section of the non-woven fibrous layer that comprises out-of-plane solid elements is less than or equal to 100%, less than or equal to 90%, less than or equal to 80%, less than or equal to 70%, less than or equal to 60%, less than or equal to 50%, or less than or equal to 40% of the thickness of the non-woven fibrous layer. Combinations of these ranges are also possible (e.g., 1-100%, 40-100%, or 80-100%). For example, in accordance with certain embodiments, in FIG. 2, section 250 is 100% of thickness 240 of layer 100.

In some embodiments, the section of the non-woven fibrous layer that comprises out-of-plane solid elements has a thickness that extends from a top surface of the section to a bottom surface of the section. For example, in accordance with certain embodiments, in FIG. 2, section 250 is 100% of thickness 240 of layer 100, so the thickness of section 250 extends from top surface 255 to bottom surface 265. As used herein, the top surface is the surface that has the highest relative frequency of out-of-plane solid elements.

In certain embodiments, the section of the non-woven fibrous layer that comprises out-of-plane solid elements has a total volume. The relative frequency of out-of-plane solid elements of the total volume of the section of the non-woven fibrous layer that comprises out-of-plane solid elements can be any suitable value. In some embodiments, the relative frequency of out-of-plane solid elements of the total volume of the section of the non-woven fibrous layer that comprises out-of-plane solid elements is greater than or equal to 5%, greater than or equal to 10%, or greater than or equal to 15%, greater than or equal to 20%, greater than or equal to 30%, greater than or equal to 40%, greater than or equal to 50%, or greater than or equal to 60%. In some embodiments, the relative frequency of out-of-plane solid elements of the total volume of the section of the non-woven fibrous layer that comprises out-of-plane solid elements is less than or equal to 100%, less than or equal to 90%, less than or equal to 80%, less than or equal to 70%, less than or equal to 60%, or less than or equal to 50%. Combinations of these ranges are also possible (e.g., 5-100%, 10-70%, or 15-50%).

In some embodiments, the total volume of the section of the non-woven fibrous layer that comprises out-of-plane solid elements includes multiple volume portions. In certain embodiments, the total volume includes greater than or equal to 1, greater than or equal to 2, greater than or equal to 3, greater than or equal to 4, greater than or equal to 5, greater than or equal to 6, greater than or equal to 7, greater than or equal to 8, or greater than or equal to 9 volume portions. In certain embodiments, the total volume includes less than or equal to 15, less than or equal to 10, less than or equal to 9, less than or equal to 8, less than or equal to 7, less than or equal to 6, less than or equal to 5, less than or equal to 4, less than or equal to 3, or less than or equal to 2 volume portions. Combinations of the above-referenced ranges are also possible (e.g., 1-3 or 1-5 volume portions).

In certain embodiments, the total volume includes a first volume portion, a second volume portion, and a third volume portion. For example, in accordance with certain embodiments, in FIG. 2, section 250 comprises first volume portion 220, second volume portion 230, and third volume portion 280. In some embodiments, the volume portions may be the same volume. For example, in some embodiments, the total volume includes a first volume portion that is 20% of the volume, a second volume portion that is 20% of the volume, and a third volume portion that is 20% of the volume.

Each of the volume portions may start and end at various cross-sectional areas located within the thickness of the section of the non-woven fibrous layer that comprises out-of-plane solid elements. In some embodiments, a volume portion starts at a cross-sectional area located at 5%, 10%, 15%, 20%, 25%, 30%, 35%, 40%, 45%, 50%, 55%, 60%, 65%, 70%, 75%, 80%, 85%, 90%, or 95% of the thickness of the section of the non-woven fibrous layer that comprises out-of-plane solid elements (as measured from the top surface of the section). In some embodiments, the volume portion ends at a cross-sectional area located at 10%, 15%, 20%, 25%, 30%, 35%, 40%, 45%, 50%, 55%, 60%, 65%, 70%, 75%, 80%, 85%, 90%, 95%, or 100% of the thickness of the section of the non-woven fibrous layer that comprises out-of-plane solid elements (as measured from the top surface of the section). Combinations of these ranges are also possible (e.g., 15-25%, 30-60%, or 85-90%). Other ranges are also possible.

Each of the volume portions may have a suitable relative frequency of out-of-plane solid elements, as discussed in more detail below. As used herein, the relative frequency of out-of-plane solid elements is the percentage of out-of-plane solid elements out of total solid elements. In some embodiments, the relative frequency of out-of-plane solid elements in a volume portion is artificially assigned to be located at a cross-sectional area located at the average of the starting location and the ending location of the volume portion so that it can be plotted. As used herein, the term assigned means artificially assigned to be located at a cross-sectional area located at the average of the starting location and the ending location of the volume portion. For example, in a case where the volume portion starts at a cross-sectional area located at 30% of the thickness of the section and extends to a cross-sectional area located at 60% of the thickness of the section, the first relative frequency of out-of-plane solid elements for that volume portion would be assigned to be located at a cross-sectional area located at 45% of the thickness of the section.

In some embodiments, the relative frequency of out-of-plane solid elements of each volume portion is independently greater than or equal to 0.1%, greater than or equal to 0.5%, greater than or equal to 1%, greater than or equal to 2%, greater than or equal to 3%, greater than or equal to 4%, greater than or equal to 5%, greater than or equal to 10%, greater than or equal to 15%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. In some embodiments, the relative frequency of out-of-plane solid elements of each volume portion is independently less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, less than or equal to 15%, less than or equal to 10%, less than or equal to 5%, less than or equal to 4%, less than or equal to 3%, less than or equal to 2%, less than or equal to 1%, or less than or equal to 0.5%. Combinations of these ranges are also possible (e.g., 0.1-100%).

In some embodiments, the total volume of the section of the non-woven fibrous layer that comprises out-of-plane solid elements includes a first volume portion. In some embodiments, the first volume portion starts and ends at various cross-sectional areas. For example, in certain embodiments, the first volume portion starts at a cross-sectional area located at 0%, 5%, 10%, 15%, 20%, 25%, 30%, 35%, 40%, or 45% of the thickness of the section of the non-woven fibrous layer that comprises out-of-plane solid elements (as measured from the top surface of the section). In some embodiments, the first volume portions ends at a cross-sectional area located at 10%, 15%, 20%, 25%, 30%, 35%, 40%, 45%, or 50% of the thickness of the section of the non-woven fibrous layer that comprises out-of-plane solid elements (as measured from the top surface of the section). Combinations of these ranges are also possible (e.g., 20-40%, 20-30%, or 10-20%). Other ranges are also possible. In certain embodiments, the first volume portion starts at a cross-sectional area located at 20% of the thickness of the section of the non-woven fibrous layer that comprises out-of-plane solid elements and extends to a cross-sectional area located at 40% of the thickness of the section of the non-woven fibrous layer that comprises out-of-plane solid elements. For example, in accordance with certain embodiments, in FIG. 2, first volume portion 220 starts at cross-sectional area 215 (which is located at 20% of the thickness of the section) and ends at cross-sectional area 225 (which is located at 40% of the thickness of the section).

In certain embodiments, the first volume portion has a suitable first relative frequency of out-of-plane solid elements. In some embodiments, the first relative frequency of out-of-plane solid elements is greater than or equal to 5%, greater than or equal to 10%, greater than or equal to 15%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. In some embodiments, the first relative frequency of out-of-plane solid elements is less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, less than or equal to 15%, or less than or equal to 10%. Combinations of these ranges are also possible (e.g., 5-100%, 10-100%, or 20-100%).

In some embodiments, the first relative frequency of out-of-plane solid elements in the first volume portion is assigned to be located at a cross-sectional area located at the average of the starting location and the ending location of the first volume portion. For example, in a case where the first volume portion starts at a cross-sectional area located at 20% of the thickness of the section of the non-woven fibrous layer that comprises out-of-plane solid elements and extends to a cross-sectional area located at 40% of the thickness of the section of the non-woven fibrous layer that comprises out-of-plane solid elements, the first relative frequency of out-of-plane solid elements is assigned to be located at a cross-sectional area located at 30% of the thickness of the section of the non-woven fibrous layer that comprises out-of-plane solid elements.

In some embodiments, the total volume of the section of the non-woven fibrous layer that comprises out-of-plane solid elements includes a second volume portion. In some embodiments, the second volume portion starts and ends at various cross-sectional areas. For example, in certain embodiments, the second volume portion starts at a cross-sectional area located at 10%, 15%, 20%, 25%, 30%, 35%, 40%, 45%, 50%, 55%, 60%, 65%, or 70% of the thickness of the section of the non-woven fibrous layer that comprises out-of-plane solid elements (as measured from the top surface of the section).

In some embodiments, the second volume portions ends at a cross-sectional area located at 15%, 20%, 25%, 30%, 35%, 40%, 45%, 50%, 55%, 60%, 65%, 70%, or 75% of the thickness of the section of the non-woven fibrous layer that comprises out-of-plane solid elements (as measured from the top surface of the section). Combinations of these ranges are also possible (e.g., 40-60%, 20-30%, or 30-70%). Other ranges are also possible. In certain embodiments, the second volume portion starts at a cross-sectional area located at 40% of the thickness of the section of the non-woven fibrous layer that comprises out-of-plane solid elements and extends to a cross-sectional area located at 60% of the thickness of the section of the non-woven fibrous layer that comprises out-of-plane solid elements. For example, in accordance with certain embodiments, in FIG. 2, second volume portion 230 starts at cross-sectional area 225 (which is located at 40% of the thickness of the section) and ends at cross-sectional area 235 (which is located at 60% of the thickness of the section).

In certain embodiments, the second volume portion has a suitable second relative frequency of out-of-plane solid elements. In some embodiments, the second relative frequency of out-of-plane solid elements is greater than or equal to 1%, greater than or equal to 2%, greater than or equal to 3%, greater than or equal to 4%, greater than or equal to 5%, greater than or equal to 10%, greater than or equal to 15%, greater than or equal to 20%, greater than or equal to 30%, greater than or equal to 40%, greater than or equal to 50%, greater than or equal to 60%, greater than or equal to 70%, or greater than or equal to 80%. In some embodiments, the second relative frequency of out-of-plane solid elements is less than or equal to 90%, less than or equal to 80%, less than or equal to 70%, less than or equal to 60%, less than or equal to 50%, less than or equal to 40%, less than or equal to 30%, less than or equal to 20%, less than or equal to 15%, less than or equal to 10%, less than or equal to 5%, less than or equal to 4%, less than or equal to 3%, or less than or equal to 2%. Combinations of these ranges are also possible (e.g., 1-90%, 10-80%, or 10-60%).

In some embodiments, the second relative frequency of out-of-plane solid elements in the second volume portion is assigned to be located at a cross-sectional area located at the average of the starting location and the ending location of the second volume portion. For example, in a case where the second volume portion starts at a cross-sectional area located at 40% of the thickness of the section of the non-woven fibrous layer that comprises out-of-plane solid elements and extends to a cross-sectional area located at 60% of the thickness of the section of the non-woven fibrous layer that comprises out-of-plane solid elements, the second relative frequency of out-of-plane solid elements is assigned to be located at a cross-sectional area located at 50% of the thickness of the section of the non-woven fibrous layer that comprises out-of-plane solid elements.

In some embodiments, the total volume of the section of the non-woven fibrous layer that comprises out-of-plane solid elements includes a third volume portion. In some embodiments, the third volume portion starts and ends at various cross-sectional areas. For example, in certain embodiments, the third volume portion starts at a cross-sectional area located at 15%, 20%, 25%, 30%, 35%, 40%, 45%, 50%, 55%, 60%, 65%, 70%, 75%, 80%, 85%, 90%, or 95% of the thickness of the section of the non-woven fibrous layer that comprises out-of-plane solid elements (as measured from the top surface of the section). In some embodiments, the second volume portion ends at a cross-sectional area located at 20%, 25%, 30%, 35%, 40%, 45%, 50%, 55%, 60%, 65%, 70%, 75%, 80%, 85%, 90%, 95%, or 100% of the thickness of the section of the non-woven fibrous layer that comprises out-of-plane solid elements (as measured from the top surface of the section). Combinations of these ranges are also possible (e.g., 60-80%, 80-100%, or 15-20%). Other ranges are also possible. In certain embodiments, the second volume portion starts at a cross-sectional area located at 60% of the thickness of the section of the non-woven fibrous layer that comprises out-of-plane solid elements and extends to a cross-sectional area located at 80% of the thickness of the section of the non-woven fibrous layer that comprises out-of-plane solid elements. For example, in accordance with certain embodiments, in FIG. 2, third volume portion 280 starts at cross-sectional area 235 (which is located at 60% of the thickness of the section) and ends at cross-sectional area 245 (which is located at 80% of the thickness of the section).

In certain embodiments, the third volume portion has a suitable third relative frequency of out-of-plane solid elements. In some embodiments, the third relative frequency of out-of-plane solid elements is greater than or equal to 0.1%, greater than or equal to 0.5%, greater than or equal to 0.7%, greater than or equal to 1%, greater than or equal to 2%, greater than or equal to 3%, greater than or equal to 4%, greater than or equal to 5%, greater than or equal to 7%, greater than or equal to 10%, greater than or equal to 15%, greater than or equal to 20%, greater than or equal to 30%, greater than or equal to 40%, greater than or equal to 50%, greater than or equal to 60%, or greater than or equal to 70%. In some embodiments, the third relative frequency of out-of-plane solid elements is less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, less than or equal to 15%, less than or equal to 10%, less than or equal to 5%, less than or equal to 4%, less than or equal to 3%, less than or equal to 2%, less than or equal to 1%, or less than or equal to 0.5%. Combinations of these ranges are also possible (e.g., 0.7-100%, 7-100%, or 10-100%).

In some embodiments, the third relative frequency of out-of-plane solid elements in the third volume portion is assigned to be located at a cross-sectional area located at the average of the starting location and the ending location of the third volume portion. For example, in a case where the third volume portion starts at a cross-sectional area located at 60% of the thickness of the section of the non-woven fibrous layer that comprises out-of-plane solid elements and extends to a cross-sectional area located at 80% of the thickness of the section of the non-woven fibrous layer that comprises out-of-plane solid elements, the third relative frequency of out-of-plane solid elements is assigned to be located at a cross-sectional area located at 70% of the thickness of the section of the non-woven fibrous layer that comprises out-of-plane solid elements.

In some embodiments, the first relative frequency of out-of-plane solid elements is greater than the second relative frequency of out-of-plane solid elements and/or the third relative frequency of out-of-plane solid elements. In certain embodiments, the second relative frequency of out-of-plane solid elements is greater than the third relative frequency of out-of-plane solid elements.

In some embodiments, the section has a gradient in relative frequency of the out-of-plane solid elements across at least a portion of the thickness of the section of the non-woven fibrous layer that comprises out-of-plane solid elements. In certain embodiments, the section of the non-woven fibrous layer that comprises out-of-plane solid elements has a gradient in relative frequency of the out-of-plane solid elements across greater than or equal to 1%, greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90% of the thickness of the section of the non-woven fibrous layer that comprises out-of-plane solid elements. In some embodiments, the section of the non-woven fibrous layer that comprises out-of-plane solid elements has a gradient in relative frequency of the out-of-plane solid elements across less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, less than or equal to 10%, or less than or equal to 5% of the thickness of the section of the non-woven fibrous layer that comprises out-of-plane solid elements. Combinations of these ranges are also possible (e.g., 1-100% or 20-60%).

In certain embodiments, the gradient is represented by a linear equation (i.e., y=mx+b, where m is the slope, b is the y-intercept, y is the value of the y-axis (the relative frequency of out-of-plane solid elements), and x is the value on the x-axis (the assigned location within the thickness of the section of the non-woven fibrous layer that comprises out-of-plane solid elements (described in percentage of the thickness from the top surface of the section of the non-woven fibrous layer that comprises out-of-plane solid elements, which is the surface with the highest relative frequency of out-of-plane solid elements)). In some embodiments, the linear equation is fit to the relative frequencies of one or more volume portions. As used herein, when a linear equation is fit, this means the best linear fit possible using the criterion of minimum mean square error (MMSE). In some embodiments, the linear equation is fit to the first relative frequency of out-of-plane solid elements, the second relative frequency of out-of-plane solid elements, and the third relative frequency of out-of-plane solid elements. As used herein, a linear equation fit to certain data points (e.g., the first relative frequency of out-of-plane solid elements, the second relative frequency of out-of-plane solid elements, and the third relative frequency of out-of-plane solid elements) has an $R^2$ value of greater than or equal to 0.5. In some embodiments, the $R^2$ value is greater than or equal to 0.6, greater than or equal to 0.7, greater than or equal to 0.8, greater than or equal to 0.9, greater than or equal to 0.95, or greater than or equal to 0.99. In some embodiments, the R2 value is less than or equal to 1, less than or equal to 0.99, less than or equal to 0.95, less than or equal to 0.9, less than or equal to 0.8, less than or equal to 0.7, or less than or equal to 0.6. Combinations of these ranges are also possible (e.g., 0.5-1, 0.6-1, 0.7-1, or 0.9-1).

In some embodiments, the linear equation is fit to 3 or more data points, 4 or more data points, 5 or more data points, or 6 or more data points. In certain embodiments, the linear equation is fit to less than or equal to 10 data points, less than or equal to 9 data points, less than or equal to 8 data points, less than or equal to 7 data points, less than or equal to 6 data points, less than or equal to 5 data points, or less than or equal to 4 data points. Combinations of these ranges are also possible (e.g., 3-10 data points).

The linear equation can have any suitable slope. In some embodiments, the slope is less than or equal to −0.01, less than or equal to −0.02, less than or equal to −0.03, less than or equal to −0.04, less than or equal to −0.05, less than or equal to −0.06, less than or equal to −0.07, less than or equal to −0.08, less than or equal to −0.09, less than or equal to −0.1, less than or equal to −0.15, less than or equal to −0.2, less than or equal to −0.3, less than or equal to −0.4, less than or equal to −0.5, less than or equal to −0.6, less than or equal to −0.7, less than or equal to −0.8, less than or equal to −0.9, less than or equal to −1, less than or equal to −2, less than or equal to −3, less than or equal to −4, less than or equal to −5, less than or equal to −6, less than or equal to −7, less than or equal to −8, or less than or equal to −9. In some embodiments, the slope is greater than or equal to −10, greater than or equal to −9, greater than or equal to −8, greater than or equal to −7, greater than or equal to −6, greater than or equal to −5, greater than or equal to −4, greater than or equal to −3, greater than or equal to −2, greater than or equal to −1, greater than or equal to −0.9, greater than or equal to −0.8, greater than or equal to −0.7, greater than or equal to −0.6, greater than or equal to −0.5, greater than or equal to −0.4, greater than or equal to −0.3, greater than or equal to −0.2, greater than or equal to −0.15, greater than or equal to −0.1, greater than or equal to −0.09, greater than or equal to −0.08, greater than or equal to −0.07, greater than or equal to −0.06, greater than or equal to −0.05, greater than or equal to −0.04, greater than or equal to −0.03, or greater than or equal to −0.02. Combinations of these ranges are also possible (e.g., less than or equal to −0.01 and greater than or equal to −10, less than or equal to −0.5 and greater than or equal to −10, or less than or equal to −0.15 and greater than or equal to −10).

In embodiments in which the non-woven fibrous layer comprises two or more types of fibers, each type of fiber may independently have the properties described herein and/or all of the fibers in the non-woven fibrous layer may together have the properties described herein.

In certain embodiment, the non-woven fibrous layer comprises other components. In some embodiments, the non-woven fibrous layer comprises resin. Examples of suitable resins include polyesters, poly(olefin) s, vinyl compounds (e.g., acrylics, styrenated acrylics, vinyl acetates, vinyl acrylics, poly(styrene acrylate), poly(acrylate) s, poly(vinyl alcohol), poly(ethylene vinyl acetate), poly(ethylene vinyl chloride), styrene butadiene rubber, poly(vinyl chloride), poly(vinyl alcohol) derivatives), poly(urethane), poly(amide) s, poly(nitrile) s, elastomers, natural rubber, urea formaldehyde, melamine formaldehyde, phenol formaldehyde, starch polymers and combinations thereof. In some embodiments, the resin comprises acrylic and/or phenolic resins. It should be understood that other resin compositions may also be suitable. In some embodiments, the resin may be a thermoset and, in some embodiments, a thermoset/thermoplastic combination. The resin may be in the form of a latex such as a water-based emulsion. In some embodiments, the resin may be in the form of a dispersion, powder, hot melt, and/or solution.

In some embodiments, the resin comprises a cross-linking agent. Examples of suitable cross-linking agents include melamine, formaldehyde, urea, epoxy, phenolic, polycarboxylic acid, or combinations thereof.

In certain embodiments, the resin may include one or more additives. In some embodiments, the one or more additives comprises an oil repellent agent, a water repellent agent, a flame retardant chemical and/or particle, and/or a dye. Examples of suitable oil repellent agents include fluorocarbon polymers, silicone, or combinations thereof. Examples of suitable water repellent agents include fluorocarbon polymers, silicone, wax, or combinations thereof. Examples of suitable flame retardant chemicals and/or particles include brominated flame retardants, nitrogen-containing flame retardants, phosphorus-containing flame retardants, phosphoric acid, mineral flame retardants, aluminum trihydroxide, or combinations thereof. Examples of suitable dyes include organic pigments, inorganic pigments, chromophoric dyes, or combinations thereof.

The non-woven fibrous layer may have any suitable amount of resin. In some embodiments, a non-woven fibrous layer with a higher relative frequency of out-of-plane solid elements can have a lower amount of resin than an identical layer with a lower relative frequency of out-of-plane solid elements without a negative effect on any properties. In some embodiments, the resin in the non-woven fibrous layer is greater than or equal to 0.01 wt %, greater than or equal to 1 wt %, greater than or equal to 3 wt %, greater than or equal to 5 wt %, greater than or equal to 10 wt %, greater than or equal to 15 wt %, greater than or equal to 20 wt %, or greater than or equal to 25 wt % of the total weight of the non-woven fibrous layer. In some embodiments, the resin in the non-woven fibrous layer is less than or equal to 50 wt %, less than or equal to 40 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 3 wt %, or less than or equal to 1 wt % of the total weight of the non-woven fibrous layer. Combinations of these ranges are also possible (e.g., 0.01-50 wt %, 3-30 wt %, or 10-25 wt %). In some embodiments, the non-woven fibrous layer does not have resin.

The resin may have a variety of suitable properties. For example, in some embodiments, the resin is conductive.

The non-woven fibrous layer may have a variety of suitable properties.

The non-woven fibrous layer may have any suitable basis weight. In some embodiments, the non-woven fibrous layer has a basis weight of greater than or equal to 10 gsm, greater than or equal to 20 gsm, greater than or equal to 30 gsm, greater than or equal to 40 gsm, greater than or equal to 50 gsm, greater than or equal to 100 gsm, or greater than or equal to 150 gsm. In some embodiments, the non-woven fibrous layer has a basis weight of less than or equal to 500 gsm, less than or equal to 400 gsm, less than or equal to 300 gsm, less than or equal to 250 gsm, less than or equal to 200 gsm, less than or equal to 180 gsm, less than or equal to 150 gsm, less than or equal to 100 gsm, or less than or equal to 50 gsm. Combinations of these ranges are also possible (e.g., 10-500, 20-250, or 30-180 gsm). The basis weight may be determined in accordance with TAPPI T 410:2013.

The non-woven fibrous layer may have any suitable thickness. In some embodiments, the non-woven fibrous layer has a thickness (e.g., an overall caliper thickness) of greater than or equal to 0.025 millimeters, greater than or equal to 0.05 millimeters, greater than or equal to 0.075 millimeters, greater than or equal to 0.1 millimeters, greater than or equal to 0.13 millimeters, greater than or equal to 0.15 millimeters, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 1.75 millimeters, or greater than or equal to 2 millimeters. In some embodiments, the non-woven fibrous layer has a thickness (e.g., an overall caliper thickness) of less than or equal to 5 millimeters, less than or equal to 4 millimeters, less than or equal to 3 millimeters, less than or equal to 2.5 millimeters, less than or equal to 2 millimeters, less than or equal to 1.75 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, less than or equal to 0.3 millimeters, less than or equal to 0.2 millimeters, or less than or equal to 0.1 millimeters. Combinations of these ranges are also possible (e.g., 0.025-5 millimeters, 0.13-2.5 millimeters, or 0.13-0.75 millimeters). The thickness may be determined using scanning electron microscopy.

The non-woven fibrous layer may have any suitable tensile ratio. In some embodiments, the non-woven fibrous layer has a tensile ratio of greater than or equal to 0.03, greater than or equal to 0.04, greater than or equal to 0.05, greater than or equal to 0.06, greater than or equal to 0.07, greater than or equal to 0.1, greater than or equal to 0.2, greater than or equal to 0.3, greater than or equal to 0.4, greater than or equal to 0.5, greater than or equal to 0.6, greater than or equal to 0.7, greater than or equal to 0.8, or greater than or equal to 0.9. In some embodiments, the non-woven fibrous layer has a tensile ratio of less than or equal to 1, less than or equal to 0.9, less than or equal to 0.8, less than or equal to 0.7, less than or equal to 0.6, less than or equal to 0.5, less than or equal to 0.4, less than or equal to 0.3, less than or equal to 0.2, less than or equal to 0.1, less than or equal to 0.07, less than or equal to 0.06, less than or equal to 0.05, or less than or equal to 0.04. Combinations of these ranges are also possible (e.g., 0.03-1 or 0.07-0.5).

The tensile ratio may be determined by dividing the internal bond strength in the Z-plane by the average of the machine direction tensile strength in the XY plane and the cross direction tensile strength in the XY plane (i.e., (internal bond strength in the Z-plane)/(the average of the machine direction tensile strength in the XY plane and the cross direction tensile strength in the XY plane). The internal bond strength in the Z plane may be measured according to TAPPI T 569 om-14 using 3M Double Coated paper tape type 410M or an equivalent. The machine direction tensile strength in the XY plane and cross direction tensile strength in the XY plane may be measured according to TAPPI T 494 om-88.

The non-woven fibrous layer may have any suitable internal bond strength in the Z-plane. In some embodiments, the non-woven fibrous layer has an internal bond strength in the Z-plane of greater than or equal to 20, greater than or equal to 25, greater than or equal to 30, greater than or equal to 40, greater than or equal to 50, greater than or equal to 75, greater than or equal to 100, greater than or equal to 150, greater than or equal to 200, greater than or equal to 300, greater than or equal to 400, greater than or equal to 500, greater than or equal to 600, greater than or equal to 700, greater than or equal to 800, or greater than or equal to 900 $10^3$ ft*lbs/in$^2$. In certain embodiments, the non-woven fibrous layer has an internal bond strength in the Z-plane of less than or equal to 1000, less than or equal to 900, less than or equal to 800, less than or equal to 700, less than or equal to 600 less than or equal to 500, less than or equal to 400, less than or equal to 300, less than or equal to 200, less than or equal to 150, less than or equal to 100, less than or equal to 75, less than or equal to 50, less than or equal to 40, less than or equal to 30, or less than or equal to 25 $10^3$ ft*lbs/in$^2$. Combinations of these ranges are also possible (e.g., 20-1000, 30-800, or 50-500 $10^3$ ft*lbs/in$^2$).

In some embodiments, the internal bond strength in the Z-plane is higher in non-woven fibrous layers with a higher relative frequency of out-of-plane solid elements compared to identical non-woven fibrous layers with a lower relative frequency of out-of-plane solid elements. In some embodiments, the tensile ratio is higher in non-woven fibrous layers with a higher relative frequency of out-of-plane solid elements compared to identical non-woven fibrous layers with a lower relative frequency of out-of-plane solid elements.

In some embodiments, the increased internal bond strength in the Z-plane results in more durable media, which is beneficial for aggressive applications, such as Gas Turbine. In some embodiments, the increased internal bond strength in the Z-plane allows for lower amounts of resin to be used and/or lower amounts of glass to be used to achieve the same strength and efficiency.

The non-woven fibrous layer may have any suitable Gurley bending dry stiffness in the machine direction and cross direction. In some embodiments, the non-woven fibrous layer has a Gurley bending dry stiffness in the machine direction and/or in the cross direction of greater than or equal to 50 mg, greater than or equal to 100 mg, greater than or equal to 150 mg, greater than or equal to 200 mg, greater than or equal to 250 mg, greater than or equal to 300 mg, greater than or equal to 350 mg, greater than or equal to 400 mg, greater than or equal to 500 mg, greater than or equal to 600 mg, greater than or equal to 700 mg, greater than or equal to 800 mg, greater than or equal to 900 mg, greater than or equal to 1,000 mg, greater than or equal to 2,000 mg, greater than or equal to 3,000 mg, greater than or equal to 4,000 mg, greater than or equal to 5,000 mg, greater than or equal to 6,000 mg, greater than or equal to 7,000 mg, greater than or equal to 8,000 mg, or greater than or equal to 9,000 mg. In certain embodiments, the non-woven fibrous layer has a Gurley bending dry stiffness in the machine direction and/or in the cross direction of less than or equal to 10,000 mg, less than or equal to 9,000 mg, less than or equal to 8,000 mg, less than or equal to 7,000 mg, less than or equal to 6,000 mg, less than or equal to 5,000 mg, less than or equal to 4,000 mg, less than or equal to 3,000 mg, less than or equal to 2,000 mg, less than or equal to 1,000 mg, less than or equal to 900 mg, less than or equal to 800 mg, less than or equal to 700 mg, less than or equal to 600 mg, less than or equal to 500 mg, less than or equal to 400 mg, less than or equal to 350 mg, less than or equal to 300 mg, less than or equal to 250 mg, less than or equal to 200 mg, less than or equal to 150 mg, or less than or equal to 100 mg. Combinations of these ranges are also possible (e.g., 50-10,000; 200-10,000; or 400-10,000 mg). Gurley bending dry stiffness may be determined according to TAPPI T543 om-00 (2000).

The non-woven fibrous layer may have any suitable maximum pore size. In some embodiments, the non-woven fibrous layer has a maximum pore size of greater than or equal to 0.1 microns, greater than or equal to 0.2 microns, greater than or equal to 0.3 microns, greater than or equal to 0.4 microns, greater than or equal to 0.5 microns. greater than or equal to 1 micron, greater than or equal to 5 microns, greater than or equal to 10 microns, greater than or equal to 20 microns, greater than or equal to 30 microns, greater than or equal to 40 microns, greater than or equal to 50 microns, greater than or equal to 75 microns, greater than or equal to 100 microns, greater than or equal to 150 microns, greater than or equal to 200 microns, greater than or equal to 250 microns, greater than or equal to 300 microns, or greater than or equal to 400 microns. In certain embodiments, the non-woven fibrous layer has a maximum pore size of less than or equal to 500 microns, less than or equal to 400 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 40 microns, less than or equal to 30 microns, less than or equal to 20 microns, less than or equal to 10 microns, less than or equal to 5 microns, less than or equal to 1 micron, less than or equal to 0.5 microns, less than or equal to 0.4 microns, less than or equal to 0.3 microns, or less than or equal to 0.2 microns. Combinations of these ranges are also possible (e.g., 0.1-500 microns or 1-100 microns) Maximum pore size may be determined according to ASTM F316-03 (2011).

In some embodiments, the pore size is higher in non-woven fibrous layers with a higher relative frequency of out-of-plane solid elements compared to identical non-woven fibrous layers with a lower relative frequency of out-of-plane solid elements. In some embodiments, the higher pore size results in higher dust holding capacity at a given efficiency.

In some embodiments, the pore size (e.g., maximum pore size) is larger in non-woven fibrous layers with a higher relative frequency of out-of-plane solid elements compared to identical non-woven fibrous layers with a lower relative frequency of out-of-plane solid elements. In some embodiments, the larger pore size (e.g., maximum pore size) results in an increase in air permeability.

The non-woven fibrous layer may have any suitable air permeability. In some embodiments, the non-woven fibrous layer has an air permeability of greater than or equal to 1 CFM, greater than or equal to 10 CFM, greater than or equal to 25 CFM, greater than or equal to 50 CFM, greater than or equal to 75 CFM, greater than or equal to 100 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, or greater than or equal to 900 CFM. In some embodiments, the non-woven fibrous layer has an air permeability of less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 300 CFM, less than or equal to 200 CFM, less than or equal to 150 CFM, less than or equal to 100 CFM, less than or equal to 75 CFM, less than or equal to 50 CFM, less than or equal to 25 CFM, or less than or equal to 10 CFM. Combinations of these ranges are also possible (e.g., 1-1000, 1-500, or 1-200 CFM). Air permeability may be determined according to ASTM D737-04 (2016) at a pressure of 125 Pa.

In some embodiments, the non-woven fibrous layer is treated and/or processed. In some embodiments, the non-woven fibrous layer is treated mechanically (e.g., needle-punching). In some embodiments, the non-woven fibrous layer is treated chemically (e.g., chemical vapor deposition, chemical spray coating, physical vapor deposition, plasma oxidation, and/or Corona discharge). In some embodiments, the non-woven fibrous layer is laminated with membrane and/or dry-laid material (e.g., spunbond or woven mats). In some embodiments, the non-woven fibrous layer is coated.

Figure 3:
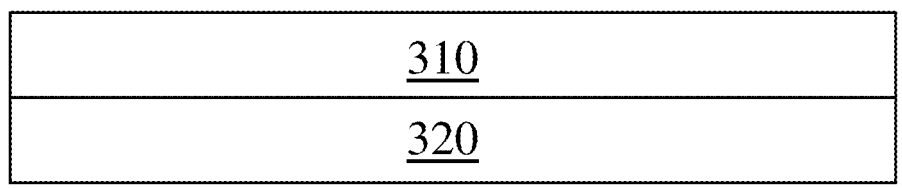
FIG. 3 is, in accordance with certain embodiments, a schematic of a filter media comprising two layers.

In some embodiments, the filter media comprises the non-woven fibrous layer and one or more additional layers. For example, in some embodiments, filter media 300 in FIG. 3 comprises upstream layer 310 (e.g., the non-woven fibrous layer) and downstream layer 320 (e.g., an additional layer). In some embodiments, the filter media comprises greater than or equal to 1 layer, greater than or equal to 2 layers, greater than or equal to 3 layers, or greater than or equal to 4 layers. In some embodiments, the filter media comprises less than or equal to 5 layers, less than or equal to 4 layers, less than or equal to 3 layers, or less than or equal to 2 layers. Combinations of these ranges are also possible (e.g., 1-5 or 1-3 layers).

The layers described herein may be in any suitable order. In some embodiments, one or more additional layers (e.g., a prefilter layer, efficiency layer, and/or backer) are upstream and/or downstream of the non-woven fibrous layer. For example, in some embodiments, filter media 300 in FIG. 3 comprises upstream layer 310 (e.g., the non-woven fibrous layer) and downstream layer 320 (e.g., an additional layer). In other embodiments, filter media 300 in FIG. 3 comprises upstream layer 310 (e.g., an additional layer) and downstream layer 320 (e.g., the non-woven fibrous layer).

In some embodiments, the non-woven fibrous layer can be combined with one or more additional layers through various processes. Examples of suitable processes include directly depositing, calendering, thermal bonding, ultrasonic bonding, collating, gluing (e.g., with hot melt, water-based, and/or solvent-based glues), co-saturating, and/or melting fibers (e.g., bicomponent fibers, binder fibers, and/or melting fibers). In some embodiments, the non-woven fibrous layer is stitched into a mesh. In some embodiments, the non-woven fibrous layer is stitched into a scrim. In some embodiments, the non-woven fibrous layer is bound in-line and/or offline with a woven layer and/or non-woven layer.

In some embodiments, the additional layer comprises a prefilter layer. For example, in some embodiments, filter media 300 in FIG. 3 comprises upstream layer 310 (e.g., a prefilter layer) and downstream layer 320 (e.g., the non-woven fibrous layer). The prefilter may enhance the capacity of the filter media and/or protect one or more components of the filter media. Prefilters are typically positioned upstream of one or more other components of the filter media, such as an efficiency layer. It should be understood that any individual prefilter may independently have some or all of the properties described herein with respect to prefilters.

When present, a prefilter may comprise a non-woven fiber web. The non-woven fiber web may be a meltblown non-woven fiber web, a spunbond non-woven fiber web, a wetlaid non-woven fiber web, an airlaid non-woven fiber web, and/or a carded non-woven fiber web. Such fiber webs may comprise continuous fibers (e.g., meltblown fibers, spunbond fibers) or non-continuous fibers.

In embodiments in which a filter media comprises two or more prefilters, each prefilter may independently comprise one of the non-woven fiber webs described above and/or one or more of the types of fibers described below.

In some embodiments, a prefilter comprises cellulose fibers, synthetic fibers, meltblown fibers, spunbond fibers, and/or glass fibers (e.g., microglass fibers and/or chopped strand fibers).

In certain embodiments, the synthetic fibers are monocomponent fibers. Non-limiting examples of suitable synthetic fibers include fibers comprising one or more of the following materials: poly(ester) s (e.g., poly(ethylene terephthalate), poly(butylene terephthalate)), poly(carbonate), poly(amide) s (e.g., various nylon polymers), poly(aramid) s, poly(imide) s, poly(olefin) s (e.g., poly(ethylene), poly (propylene)), poly(ether ketone), poly(acrylic) s (e.g., poly (acrylonitrile)), poly(vinyl alcohol), regenerated cellulose (e.g., synthetic cellulose such cellulose acetate, lyocell, rayon), fluorinated polymers (e.g., poly(vinylidene difluoride) (PVDF)), copolymers of poly(ethylene) and PVDF, and poly(ether sulfone) s. In some embodiments, the synthetic fibers are organic polymer fibers.

The prefilters described herein may include more than one type of fiber (e.g., two or more different types of monocomponent synthetic fibers, such as poly(ethylene) fibers and poly(ester) fibers) or may include exclusively one type of fiber (e.g., exclusively monocomponent synthetic fibers comprising poly(ethylene)). In some embodiments, the fibers in the prefilter comprise fibers comprising a blend of two or more of the polymers listed above (e.g., a blend of two types of poly(ester)).

Fibers in a prefilter (e.g., synthetic fibers) may further comprise one or more additives. For instance, in some embodiments, a prefilter comprises fibers further comprising a charge-stabilizing additive. The charge-stabilizing additive may be dispersed throughout the fiber (e.g., it may be extruded with a polymeric component to form a fiber comprising both the charge-stabilizing additive and the polymeric component), or may be positioned within the fiber in another suitable manner. One example of a suitable class of charge-stabilizing additives is hindered amine light stabilizers. Without wishing to be bound by any particular theory, it is believed that hindered amine light stabilizers are capable of stabilizing charged species (e.g., a positively charged species, such as a proton from water; a negatively charged species). Further non-limiting examples of suitable charge-stabilizing additives include fused aromatic thioureas, organic triazines, UV stabilizers, phosphites, additives comprising two or more amide groups (e.g., bisamides, trisamides), and stearates (e.g., magnesium stearate, calcium stearate). Charge-stabilizing additives may be incorporated into fibers by forming a continuous fiber from a composition comprising the charge-stabilizing additive.

In embodiments in which a filter media comprises two or more prefilters, each prefilter may independently comprise fibers comprising one or more of the materials described above and/or having one or more of the compositions described above.

Fibers suitable for use in the prefilters described herein may have a variety of average fiber diameters. In some embodiments, a prefilter comprises fibers having an average fiber diameter of greater than or equal to 1 micron, greater than or equal to 1.25 microns, greater than or equal to 1.5 microns, greater than or equal to 2 microns, greater than or equal to 2.5 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 10 microns, greater than or equal to 12.5 microns, greater than or equal to 15 microns, greater than or equal to 17.5 microns, greater than or equal to 20 microns, greater than or equal to 25 microns, greater than or equal to 30 microns, greater than or equal to 40 microns, greater than or equal to 50 microns, or greater than or equal to 75 microns. In some embodiments, a prefilter comprises fibers having an average fiber diameter of less than or equal to 100 microns, less than or equal to 75 microns, less than or equal to 50 microns, less than or equal to 40 microns, less than or equal to 35 microns, less than or equal to 30 microns, less than or equal to 20 microns, less than or equal to 17.5 microns, less than or equal to 15 microns, less than or equal to 14 microns, less than or equal to 12.5 microns, less than or equal to 10 microns, less than or equal to 8 microns, less than or equal to 6 microns, less than or equal to 5 microns, less than or equal to 4 microns, less than or equal to 3 microns, less than or equal to 2.5 microns, less than or equal to 2 microns, or less than or equal to 1.5 microns. Combinations of the above-referenced ranges are also possible (e.g., greater than or equal to 1 micron and less than or equal to 100 microns, greater than or equal to 5 microns and less than or equal to 100 microns, or greater than or equal to 5 microns and less than or equal to 30 microns). Other ranges are also possible.

In embodiments in which a prefilter comprises two or more types of fibers, each type of fiber may independently have an average fiber diameter in one or more of the ranges described above and/or all of the fibers in the prefilter may together have an average fiber diameter in one or more of the ranges described above. Similarly, when a filter media comprises two or more prefilters, each prefilter may independently comprise one or more types of fibers having an average fiber diameter in one or more of the ranges described above and/or may have an average fiber diameter in one or more of the ranges described above for all of the fibers therein.

Fibers suitable for use in the prefilters described herein may have a variety of average fiber lengths. In some embodiments, a prefilter comprises fibers having an average fiber length of greater than or equal to 3 microns, greater than or equal to 4 microns, greater than or equal to 5 microns, greater than or equal to 6 microns, greater than or equal to 7 microns, greater than or equal to 8 microns, greater than or equal to 10 microns, greater than or equal to 12.5 microns, greater than or equal to 15 microns, greater than or equal to 17.5 microns, greater than or equal to 20 microns, greater than or equal to 25 microns, greater than or equal to 30 microns, greater than or equal to 40 microns, greater than or equal to 50 microns, greater than or equal to 75 microns, greater than or equal to 100 microns, greater than or equal to 200 microns, greater than or equal to 300 microns, greater than or equal to 400 microns, greater than or equal to 500 microns, greater than or equal to 750 microns, greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 10 mm, greater than or equal to 20 mm, greater than or equal to 30 mm, or greater than or equal to 40 mm. In some embodiments, a prefilter comprises fibers having an average fiber length of less than or equal to 50 mm, less than or equal to 40 mm, less than or equal to 30 mm, less than or equal to 20 mm, less than or equal to 15 mm, less than or equal to 12 mm, less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2 mm, less than or equal to 1 mm, less than or equal to 750 microns, less than or equal to 500 microns, less than or equal to 250 microns, less than or equal to 100 microns, less than or equal to 75 microns, less than or equal to 50 microns, less than or equal to 40 microns, less than or equal to 35 microns, less than or equal to 30 microns, less than or equal to 24 microns, less than or equal to 20 microns, less than or equal to 18 microns, less than or equal to 17.5 microns, less than or equal to 15 microns, less than or equal to 14 microns, less than or equal to 12.5 microns, less than or equal to 12 microns, less than or equal to 10 microns, less than or equal to 8 microns, less than or equal to 6 microns, less than or equal to 5 microns, or less than or equal to 4 microns. Combinations of the above-referenced ranges are also possible (e.g., greater than or equal to 100 microns and less than or equal to 10 mm, greater than or equal to 3 microns and less than or equal to 24 microns, or greater than or equal to 3 mm and less than or equal to 50 mm). Other ranges are also possible.

In embodiments in which a prefilter comprises two or more types of fibers, each type of fiber may independently have an average fiber length in one or more of the ranges described above and/or all of the fibers in the prefilter may together have an average fiber length in one or more of the ranges described above. Similarly, when a filter media comprises two or more prefilters, each prefilter may independently comprise one or more types of fibers having an average fiber length in one or more of the ranges described above and/or may have an average fiber length in one or more of the ranges described above for all of the fibers therein.

Some prefilters may further comprise one or more additional components. By way of example, in some embodiments, a prefilter comprises a resin.

The prefilters described herein may have any suitable basis weight. In some embodiments, a prefilter has a basis weight of greater than or equal to 10 gsm, greater than or equal to 12.5 gsm, greater than or equal to 15 gsm, greater than or equal to 17.5 gsm, greater than or equal to 20 gsm, greater than or equal to 22.5 gsm, greater than or equal to 25 gsm, greater than or equal to 30 gsm, greater than or equal to 35 gsm, greater than or equal to 40 gsm, greater than or equal to 45 gsm, greater than or equal to 50 gsm, or greater than or equal to 55 gsm, greater than or equal to 75 gsm, greater than or equal to 100 gsm, greater than or equal to 200 gsm, greater than or equal to 300 gsm, or greater than or equal to 400 gsm. In some embodiments, a prefilter has a basis weight of less than or equal to 500 gsm, less than or equal to 400 gsm, less than or equal to 300 gsm, less than or equal to 250 gsm, less than or equal to 200 gsm, less than or equal to 180 gsm, less than or equal to 150 gsm, less than or equal to 100 gsm, less than or equal to 60 gsm, less than or equal to 55 gsm, less than or equal to 50 gsm, less than or equal to 45 gsm, less than or equal to 40 gsm, less than or equal to 35 gsm, less than or equal to 30 gsm, less than or equal to 25 gsm, less than or equal to 22.5 gsm, less than or equal to 20 gsm, less than or equal to 17.5 gsm, or less than or equal to 15 gsm. Combinations of the above-referenced ranges are also possible (e.g., greater than or equal to 10 gsm and less than or equal to 500 gsm, greater than or equal to 20 gsm and less than or equal to 250 gsm, or greater than or equal to 30 gsm and less than or equal to 180 gsm). The basis weight of a prefilter can be determined in accordance with TAPPI T 410: 2013.

In embodiments in which a filter media comprises two or more prefilters, each prefilter may independently have a basis weight in one or more of the ranges described above.

The thicknesses of the prefilters described herein may generally be selected as desired. In some embodiments, a prefilter has a thickness of greater than or equal to 0.01 mm, greater than or equal to 0.015 mm, greater than or equal to 0.02 mm, greater than or equal to 0.025 mm, greater than or equal to 0.03 mm, greater than or equal to 0.035 mm, greater than or equal to 0.04 mm, greater than or equal to 0.045 mm, greater than or equal to 0.05 mm, greater than or equal to 0.06 mm, greater than or equal to 0.07 mm, greater than or equal to 0.08 mm, greater than or equal to 0.09 mm, greater than or equal to 0.1 mm, greater than or equal to 0.13 mm, greater than or equal to 0.15 mm, greater than or equal to 0.2 mm, greater than or equal to 0.25 mm, greater than or equal to 0.3 mm, greater than or equal to 0.35 mm, greater than or equal to 0.4 mm, greater than or equal to 0.5 mm, greater than or equal to 0.6 mm, greater than or equal to 0.7 mm, greater than or equal to 0.8 mm, greater than or equal to 0.9 mm, greater than or equal to 1 mm, greater than or equal to 1.1 mm, greater than or equal to 1.2 mm, greater than or equal to 1.3 mm, greater than or equal to 1.4 mm, greater than or equal to 1.5 mm, greater than or equal to 1.75 mm, greater than or equal to 2 mm, greater than or equal to 2.25 mm, greater than or equal to 2.5 mm, greater than or equal to 3 mm, or greater than or equal to 4 mm. In some embodiments, a prefilter has a thickness of less than or equal to 5 mm, less than or equal to 4 mm, less than or equal to 3 mm, less than or equal to 2.5 mm, less than or equal to 2.25 mm, less than or equal to 2 mm, less than or equal to 1.75 mm, less than or equal to 1.5 mm, less than or equal to 1.4 mm, less than or equal to 1.3 mm, less than or equal to 1.2 mm, less than or equal to 1.1 mm, less than or equal to 1 mm, less than or equal to 0.9 mm, less than or equal to 0.8 mm, less than or equal to 0.75 mm, less than or equal to 0.7 mm, less than or equal to 0.6 mm, less than or equal to 0.5 mm, less than or equal to 0.4 mm, less than or equal to 0.35 mm, less than or equal to 0.3 mm, less than or equal to 0.25 mm, less than or equal to 0.2 mm, less than or equal to 0.15 mm, less than or equal to 0.1 mm, less than or equal to 0.09 mm, less than or equal to 0.08 mm, less than or equal to 0.07 mm, less than or equal to 0.06 mm, less than or equal to 0.05 mm, less than or equal to 0.045 mm, less than or equal to 0.04 mm, less than or equal to 0.035 mm, less than or equal to 0.03 mm, less than or equal to 0.025 mm, less than or equal to 0.02 mm, or less than or equal to 0.015 mm. Combinations of the above-referenced ranges are also possible (e.g., greater than or equal to 0.025 mm and less than or equal to 5 mm, greater than or equal to 0.13 mm and less than or equal to 2.5 mm, or greater than or equal to 0.13 mm and less than or equal to 0.75 mm). Other ranges are also possible. The thickness of a prefilter may be determined using scanning electron microscopy.

In embodiments in which a filter media comprises two or more prefilters, each prefilter may independently have a thickness in one or more of the ranges described above.

The prefilters described herein may be charged or may be uncharged. When present, charge (e.g., electrostatic charge) may be induced on the prefilter by a variety of suitable charging process, non-limiting examples of which include corona discharging (e.g., employing AC corona, employing DC corona), employing an ionic charge bar (e.g., powered by a positive current, powered by a negative current), and/or tribocharging (e.g., hydrocharging, charging by fiber friction). When employed charging by fiber friction may be accomplished by bringing into contact and then separating two surfaces, at least one of which is a surface at which fibers to be charged are positioned. This process may cause the transfer of charge between the two surfaces and the associated buildup of charge on the two surfaces. The surfaces may be selected such that they have sufficiently different positions in the triboelectric series to result in enhanced charge transfer therebetween upon contact.

In some embodiments, two or more charging processes may be employed. As one particular example, one or more ionic charge bars (e.g., four ionic charge bars) and one or more corona discharging stations may be employed together.

In embodiments in which a filter media comprises two or more prefilters, each prefilter may independently be charged or uncharged. Each charged prefilter may independently be charged by one or more of the methods described above.

In some embodiments, the additional layer comprises an efficiency layer. For example, in some embodiments, filter media 300 in FIG. 3 comprises upstream layer 310 (e.g., the non-woven fibrous layer) and downstream layer 320 (e.g., an efficiency layer). The efficiency layer may contribute appreciably to the filtration performance of the filter media. In some embodiments, the efficiency layer comprises a non-woven fiber web. The non-woven fiber web may be an electrospun non-woven fiber web, a centrifugal spun non-woven fiber web, a wetlaid non-woven fiber web, a non-wetlaid non-woven fiber web, a carded non-woven fiber web, and/or a meltblown non-woven fiber web.

In embodiments in which a filter media comprises two or more efficiency layers, each efficiency layer may independently comprise one of the non-woven fiber webs described above and/or one or more of the types of fibers described below.

In certain embodiments, the efficiency layer comprises fibers, such as cellulose, cellulose derivatives (e.g., lyocell fibers and/or rayon fibers), synthetic, and/or glass (e.g., microglass fibers and/or chopped strand glass fibers). In some embodiments, the efficiency layer comprises a membrane. In some embodiments, the efficiency layer comprises continuous fibers (e.g., electrospun fibers, and/or meltblown fibers).

Examples of suitable membranes include cellulose acetate membrane; regenerated cellulose membrane; hydrophobic PTFE membrane; polyamide membrane; polycarbonate membrane; polyethersulfone membrane; nanofiber membrane; ceramic membranes made from inorganic materials such as alumina, titania, zirconia oxides, silicon carbide or glassy materials; metallic membrane made from metals, such as Pd, Ag, Fe, Ni, steel, and their alloys; or combinations thereof. In some embodiments, the membrane comprises a polymer resin. Examples of suitable polymer resins include polyolefins (e.g., polyethylene, polypropylene, polyisobutylene, and/or ethylene-alpha-olefin copolymers), acrylic polymers and copolymers (e.g., polyacrylate, polymethylmethacrylate, and/or polyethylacrylate); vinyl halide polymers and copolymers (e.g., polyvinyl chloride); polyvinyl ethers (e.g., polyvinyl methyl ether); polyvinylidene halides (e.g., polyvinylidene fluoride and/or polyvinylidene chloride); polyacrylonitrile; polyvinyl ketones; polyvinyl amines; polyvinyl aromatics (e.g., polystyrene); polyvinyl esters (e.g., polyvinyl acetate); copolymers of vinyl monomers with each other and/or olefins (e.g., ethylene-methyl methacrylate copolymers, acrylonitrile-styrene copolymers, ABS resins, and/or ethylene-vinyl acetate copolymers); natural and synthetic rubbers (e.g., butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and/or polyurethane rubbers); polyamides (e.g., Nylon 66 and/or polycaprolactam); polyesters (e.g., polyethylene terephthalate); polycarbonates; polyimides; polyethers; and/or fluoropolymers (e.g., polytetrafluoroethylene and/or fluorinated ethylenepropylene).

In embodiments where the efficiency layer comprises cellulose fibers, examples of suitable cellulose fibers may include softwood fibers, hardwood fibers, and combinations thereof. Examples of softwood cellulose fibers may include fibers that are derived from the wood of pine, cedar, alpine fir, douglas fir, and spruce trees. Examples of hardwood cellulose fibers may include fibers derived from the wood of *eucalyptus* (e.g., *Grandis*), maple, birch, and other deciduous trees.

In some embodiments, when the efficiency layer comprises synthetic fibers, the synthetic fibers are monocomponent fibers. Non-limiting examples of suitable synthetic fibers include fibers comprising one or more of the following materials: poly(amide) s (e.g., nylons, such as nylon 6), poly(ester) s (e.g., poly(caprolactone), poly(butylene terephthalate)), poly(urethane) s, poly(urea) s, acrylics, polymers comprising a side chain comprising a carbonyl functional group (e.g., poly(vinyl acetate), cellulose ester, poly (acrylamide)), poly(ether sulfone), poly(acrylic) s (e.g., poly (acrylonitrile), poly(acrylic acid)), fluorinated polymers (e.g., poly(vinylidene difluoride)), polyols (e.g., poly(vinyl alcohol)), poly(ether) s (e.g., poly(ethylene oxide)), poly (vinyl pyrrolidone), poly(allylamine), butyl rubber, poly (ethylene), polymers comprising a silane functional group, polymers comprising a thiol functional group, polymers comprising a methylol functional group (e.g., phenolic polymers, melamine polymers, melamine-formaldehyde polymers, crosslinkable polymers comprising pendant methylol groups). In some embodiments, the synthetic fibers are organic polymer fibers.

The efficiency layers described herein may include more than one type of fiber (e.g., two or more different types of monocomponent synthetic fibers, such as poly(amide) fibers and poly(ester) fibers) or may include exclusively one type of fiber (e.g., exclusively monocomponent synthetic fibers comprising a single type of poly(amide)). In some embodiments, the fibers in the efficiency layer comprise fibers comprising a blend of two or more of the polymers listed above (e.g., a blend of two types of poly(amide)s).

In some embodiments, the efficiency layer is a nanofiber layer. As used herein, a nanofiber layer has an average fiber diameter of less than 1 micron. When present, a nanofiber layer may comprise a plurality of nanofibers comprising a variety of suitable types of nanofibers. In some embodiments, the plurality of nanofibers may comprise one or more synthetic polymers. Non-limiting examples of suitable synthetic polymers include polyamides (e.g., Nylons, such as Nylon 6), polyesters (e.g., poly(caprolactone), poly(butylene terephthalate)), polyurethanes, polyureas, acrylics, polymers comprising a side chain comprising a carbonyl functional group (e.g., poly(vinyl acetate), cellulose, cellulose ester, poly(acrylamide)), poly(ether sulfone), polyacrylics (e.g., poly(acrylonitrile), poly(acrylic acid)), fluorinated polymers (e.g., poly(vinylidene difluoride)), polyols (e.g., poly(vinyl alcohol)), polyethers (e.g., poly(ethylene oxide)), poly(vinyl pyrrolidone), poly(allylamine), polymers comprising a silane functional group, polymers comprising a thiol functional group, polymers comprising a methylol functional group (e.g., phenolic polymers or melamine polymers), and combinations thereof. In some embodiments, the plurality of nanofibers may comprise one or more natural polymers. In some embodiments, the plurality of nanofibers comprises nanofibers comprising a copolymer of two or more of the polymers listed above and/or a blend of two or more of the polymers listed above (e.g., a blend of a polyamide and a polyester). In embodiments in which more than one nanofiber layer is present, each nanofiber layer may independently comprise nanofibers comprising one or more of the polymers described above.

Fibers in an efficiency layer (e.g., synthetic fibers) may further comprise one or more additives. By way of example, the fibers in an efficiency layer may comprise a charge-stabilizing additive (e.g., as described above with respect to prefilters) and/or an antimicrobial additive.

In embodiments where the efficiency layer comprises cellulose fibers, the efficiency layer may include any suitable amount of cellulose fibers. In some embodiments, the efficiency layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose fibers relative to the total weight of the efficiency layer. In some embodiments, the efficiency layer comprises less than or equal to 99.99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % cellulose fibers relative to the total weight of the efficiency layer. Combinations of these ranges are also possible (e.g., 0.01 wt %-99.99 wt %). In some embodiments, the efficiency layer comprises 100 wt % cellulose fibers relative to the total weight of the efficiency layer. In some embodiments, the efficiency layer does not have cellulose fibers.

In embodiments where the efficiency layer comprises cellulose derivative fibers, the efficiency layer may include any suitable amount of cellulose derivative fibers. In some embodiments, the efficiency layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose derivative fibers relative to the total weight of the efficiency layer. In some embodiments, the efficiency layer comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % cellulose derivative fibers relative to the total weight of the efficiency layer. Combinations of these ranges are also possible (e.g., 0.01 wt %-100 wt %). In some embodiments, the efficiency layer comprises 100 wt % cellulose derivative fibers relative to the total weight of the efficiency layer. In some embodiments, the efficiency layer does not have cellulose derivative fibers.

In embodiments where the efficiency layer comprises synthetic fibers, the efficiency layer may include any suitable amount of synthetic fibers. In some embodiments, the efficiency layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % synthetic fibers relative to the total weight of the efficiency layer. In some embodiments, the efficiency layer comprises less than or equal to 100 wt %, less than or equal to 99.99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % synthetic fibers relative to the total weight of the efficiency layer. Combinations of these ranges are also possible (e.g., 0.01 wt %-100 wt % or 0.01 wt %-99.99 wt %). In some embodiments, the efficiency layer comprises 100 wt % synthetic fibers relative to the total weight of the efficiency layer. In some embodiments, the efficiency layer does not have synthetic fibers.

In embodiments where the efficiency layer comprises glass fibers, the efficiency layer may include any suitable amount of glass fibers. In some embodiments, the efficiency layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % glass fibers relative to the total weight of the efficiency layer. In some embodiments, the efficiency layer comprises less than or equal to 100 wt %, less than or equal to 99.99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % glass fibers relative to the total weight of the efficiency layer. Combinations of these ranges are also possible (e.g., 0.01 wt %-100 wt % or 0.01 wt %-99.99 wt %). In some embodiments, the efficiency layer comprises 100 wt % glass fibers relative to the total weight of the efficiency layer. In some embodiments, the efficiency layer does not have glass fibers.

In embodiments where the efficiency layer comprises nanofibers, the efficiency layer may include any suitable amount of nanofibers. In some embodiments, the efficiency layer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % nanofibers relative to the total weight of the efficiency layer. In some embodiments, the efficiency layer comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % nanofibers relative to the total weight of the efficiency layer. Combinations of these ranges are also possible (e.g., 0.01 wt %-100 wt %). In some embodiments, the efficiency layer comprises 100 wt % nanofibers relative to the total weight of the efficiency layer. In some embodiments, the efficiency layer does not have nanofibers.

Regardless of the type of fibers, the efficiency layer may have any suitable average fiber diameter. In some embodiments, the efficiency layer has an average fiber diameter of greater than or equal to 0.05 microns, greater than or equal to 0.1 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, or greater than or equal to 40 microns. In some embodiments, the efficiency layer has an average fiber diameter of less than or equal to 50 microns, less than or equal to 45 microns, less than or equal to 40 microns, less than or equal to 35 microns, less than or equal to 30 microns, less than or equal to 20 microns, less than or equal to 10 microns, less than or equal to 5 microns, less than or equal to 4 microns, less than or equal to 3 microns, less than or equal to 2 microns, less than or equal to 1 micron, less than or equal to 0.5 microns, or less than or equal to 0.1 microns. Combinations of these ranges are also possible (e.g., greater than or equal to 0.05 microns and less than or equal to 50 microns, greater than or equal to 0.05 microns and less than or equal to 35 microns, or greater than or equal to 0.05 microns and less than or equal to 35 microns).

Regardless of the type of fibers, the efficiency layer may have any suitable average fiber length. In some embodiments, the efficiency layer has an average fiber length of greater than or equal to 0.01 millimeters, greater than or equal to 0.05 millimeters, greater than or equal to 0.1 millimeters, greater than or equal to 0.5 millimeters, greater than or equal to 1 millimeter, greater than or equal to 2 millimeters, greater than or equal to 3 millimeters, greater than or equal to 4 millimeters, greater than or equal to 5 millimeters, greater than or equal to 10 millimeters, greater than or equal to 15 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the efficiency layer has an average fiber length of less than or equal to 52 millimeters, less than or equal to 50 millimeters, less than or equal to 45 millimeters, less than or equal to 42 millimeters, less than or equal to 39 millimeters, less than or equal to 35 millimeters, less than or equal to 30 millimeters, less than or equal to 26 millimeters, less than or equal to 23 millimeters, less than or equal to 20 millimeters, less than or equal to 15 millimeters, less than or equal to 10 millimeters, less than or equal to 5 millimeters, less than or equal to 4 millimeters, less than or equal to 3 millimeters, less than or equal to 2 millimeters, or less than or equal to 1 millimeter. Combinations of these ranges are also possible (e.g., greater than or equal to 0.01 millimeters and less than or equal to 52 millimeters, greater than or equal to 1 millimeter and less than or equal to 39 millimeters, or greater than or equal to 1 millimeter and less than or equal to 26 millimeters).

In some embodiments, the efficiency layer comprises continuous fibers. Continuous fibers are made by a "continuous" fiber-forming process, such as a meltblown, a meltspun, a melt electrospinning, a solvent electrospinning, a centrifugal spinning, or a spunbond process, and typically have longer lengths than non-continuous fibers. Non-continuous fibers may be staple fibers that may be cut (e.g., from a filament) or formed as non-continuous discrete fibers to have a particular length or a range of lengths as described in more detail herein. In certain embodiments, the continuous fibers described herein have an average length of greater than 5 inches.

In embodiments where the efficiency layer comprises cellulose fibers, the cellulose fibers may have any suitable average diameter. In some embodiments, the cellulose fibers have a diameter of greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the cellulose fibers have a diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, or less than or equal to 3 microns. Combinations of these ranges are also possible (e.g., greater than or equal to 1 micron and less than or equal to 100 microns, greater than or equal to 3 microns and less than or equal to 50 microns, or greater than or equal to 5 microns and less than or equal to 35 microns).

The cellulose fibers may have any suitable average length. In some embodiments, the cellulose fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, or greater than or equal to 9 millimeters. In some embodiments, the cellulose fibers have an average length of less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 10 millimeters, greater than or equal to 0.3 millimeters and less than or equal to 7 millimeters, or greater than or equal to 0.5 millimeters and less than or equal to 4 millimeters).

In embodiments where the non-woven fibrous layer comprises cellulose derivative fibers, the cellulose derivative fibers may be regenerated fibers (e.g., lyocell fibers and/or rayon fibers). In some embodiments, the cellulose derivative fibers may be fibrillated fibers. In embodiments where the cellulose derivative fibers are fibrillated fibers, the cellulose derivative fibers may have any suitable Canadian Standard Freeness (CSF). In some embodiments, the cellulose derivative fibers have a CSF of greater than or equal to 0 mL, greater than or equal to 1 mL, greater than or equal to 5 mL, greater than or equal to 10 mL, greater than or equal to 20 mL, greater than or equal to 30 mL, greater than or equal to 40 mL, greater than or equal to 50 mL, greater than or equal to 60 mL, greater than or equal to 70 mL, greater than or equal to 80 mL, greater than or equal to 90 mL, greater than or equal to 100 mL, greater than or equal to 125 mL, greater than or equal to 150 mL, greater than or equal to 175 mL, greater than or equal to 200 mL, greater than or equal to 250 mL, greater than or equal to 300 mL, greater than or equal to 350 mL, greater than or equal to 400 mL, or greater than or equal to 450 mL. In some embodiments, the cellulose derivative fibers have a CSF of less than or equal to 500 mL, less than or equal to 450 mL, less than or equal to 400 mL, less than or equal to 350 mL, less than or equal to 300 mL, less than or equal to 250 mL, less than or equal to 200 mL, less than or equal to 175 mL, less than or equal to 150 mL, less than or equal to 125 mL, less than or equal to 100 mL, less than or equal to 90 mL, less than or equal to 80 mL, less than or equal to 70 mL, less than or equal to 60 mL, less than or equal to 50 mL, less than or equal to 40 mL, less than or equal to 30 mL, less than or equal to 20 mL, or less than or equal to 10 mL. Combinations of these ranges are also possible (e.g., greater than or equal to 0 mL and less than or equal to 500 mL, greater than or equal to 0 mL and less than or equal to 200 mL, or greater than or equal to 0 mL and less than or equal to 100 mL).

The cellulose derivative fibers may have any suitable average length. In some embodiments, the cellulose derivative fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, or greater than or equal to 11 millimeters. In some embodiments, the cellulose derivative fibers have an average length of less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 12 millimeters, greater than or equal to 0.3 millimeters and less than or equal to 10 millimeters, or greater than or equal to 0.5 millimeters and less than or equal to 8 millimeters).

In embodiments where the efficiency layer comprises synthetic fibers, the synthetic fibers may have any suitable average diameter. In some embodiments, the synthetic fibers have an average diameter of greater than or equal to 0.05 microns, greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the synthetic fibers have an average diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, less than or equal to 3 microns, less than or equal to 2 microns, less than or equal to 1 micron, less than or equal to 0.9 microns, less than or equal to 0.8 microns, less than or equal to 0.7 microns, less than or equal to 0.6 microns, less than or equal to 0.5 microns, less than or equal to 0.4 microns, less than or equal to 0.3 microns, less than or equal to 0.2 microns, or less than or equal to 0.1 microns. Combinations of these ranges are also possible (e.g., greater than or equal to 0.05 microns and less than or equal to 5 microns, greater than or equal to 0.4 microns and less than or equal to 5 microns, greater than or equal to 1 micron and less than or equal to 5 microns, greater than or equal to 5 microns and less than or equal to 100 microns, greater than or equal to 5 microns and less than or equal to 50 microns, or greater than or equal to 5 microns and less than or equal to 35 microns).

Synthetic fibers may have any suitable average length. In some embodiments, the synthetic fibers have an average length of greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 12 mm, greater than or equal to 14 mm, greater than or equal to 16 mm, greater than or equal to 18 mm, greater than or equal to 20 mm, greater than or equal to 22 mm, or greater than or equal to 24 mm.

In some embodiments, the synthetic fibers have an average length of less than or equal to 26 mm, less than or equal to 24 mm, less than or equal to 22 mm, less than or equal to 20 mm, less than or equal to 18 mm, less than or equal to 16 mm, less than or equal to 14 mm, less than or equal to 12 mm, less than or equal to 10 mm, less than or equal to 9 mm, less than or equal to 8 mm, less than or equal to 7 mm, less than or equal to 6 mm, less than or equal to 5 mm, less than or equal to 4 mm, or less than or equal to 3 mm. Combinations of these ranges are also possible (e.g., greater than or equal to 1 mm and less than or equal to 26 mm, greater than or equal to 1 mm and less than or equal to 5 mm, greater than or equal to 1 mm and less than or equal to 4 mm, greater than or equal to 1 mm and less than or equal to 3 mm, greater than or equal to 3 mm and less than or equal to 26 mm, greater than or equal to 3 mm and less than or equal to 20 mm, or greater than or equal to 5 mm and less than or equal to 13 mm). In some embodiments, the synthetic fibers comprise continuous fibers having an average length of greater than 5 inches.

In embodiments where the efficiency layer comprises glass fibers, the glass fibers may have any suitable average diameter. In some embodiments, the glass fibers have an average diameter of greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 20 microns, or greater than or equal to 25 microns. In some embodiments, the glass fibers have an average diameter of less than or equal to 30 microns, less than or equal to 25 microns, less than or equal to 20 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.1 microns and less than or equal to 10 microns, greater than or equal to 0.4 microns and less than or equal to 6 microns, greater than or equal to 0.4 microns and less than or equal to 3 microns, greater than or equal to 4 microns and less than or equal to 30 microns, greater than or equal to 6 microns and less than or equal to 20 microns, or greater than or equal to 7 microns and less than or equal to 14 microns).

The glass fibers may have any suitable average length. In some embodiments, the glass fibers have an average length of greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, greater than or equal to 11 millimeters, greater than or equal to 12 millimeters, greater than or equal to 15 millimeters, greater than or equal to 17 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the glass fibers have an average length of less than or equal to 52 millimeters, less than or equal to 50 millimeters, less than or equal to 45 millimeters, less than or equal to 40 millimeters, less than or equal to 35 millimeters, less than or equal to 30 millimeters, less than or equal to 25 millimeters, less than or equal to 20 millimeters, less than or equal to 17 millimeters, less than or equal to 15 millimeters, less than or equal to 13 millimeters, less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, or less than or equal to 4 millimeters. Combinations of these ranges are also possible (e.g., greater than or equal to 3 millimeters and less than or equal to 52 millimeters, greater than or equal to 3 millimeters and less than or equal to 20 millimeters, or greater than or equal to 6 millimeters and less than or equal to 13 millimeters).

In embodiments where the efficiency layer comprises electrospun fibers, the electrospun fibers may have any suitable average diameter. In some embodiments, the electrospun fibers have an average diameter of greater than or equal to 50 nm, greater than or equal to 55 nm, greater than or equal to 60 nm, greater than or equal to 65 nm, greater than or equal to 70 nm, greater than or equal to 75 nm, greater than or equal to 80 nm, greater than or equal to 85 nm, greater than or equal to 100 nm, greater than or equal to 125 nm, greater than or equal to 150 nm, greater than or equal to 175 nm, greater than or equal to 200 nm, greater than or equal to 250 nm, greater than or equal to 300 nm, greater than or equal to 400 nm, greater than or equal to 500 nm, greater than or equal to 600 nm, greater than or equal to 700 nm, greater than or equal to 800 nm, or greater than or equal to 900 nm. In some embodiments, the electrospun fibers have an average diameter of less than or equal to 1,000 nm, less than or equal to 900 nm, less than or equal to 800 nm, less than or equal to 700 nm, less than or equal to 600 nm, less than or equal to 500 nm, less than or equal to 400 nm, less than or equal to 300 nm, less than or equal to 250 nm, less than or equal to 225 nm, less than or equal to 200 nm, less than or equal to 175 nm, less than or equal to 150 nm, less than or equal to 125 nm, less than or equal to 100 nm, less than or equal to 85 nm, less than or equal to 80 nm, less than or equal to 75 nm, less than or equal to 70 nm, less than or equal to 65 nm, less than or equal to 60 nm, or less than or equal to 55 nm. Combinations of the above-referenced ranges are also possible (e.g., greater than or equal to 50 nm and less than or equal to 1000 nm, greater than or equal to 75 nm and less than or equal to 250 nm, or greater than or equal to 85 nm and less than or equal to 200 nm).

In embodiments where the efficiency layer comprises meltblown fibers, the meltblown fibers may have any suitable average diameter. In some embodiments, the meltblown fibers have an average diameter of greater than or equal to 0.05 microns, greater than or equal to 0.1 microns, greater than or equal to 0.2 microns, greater than or equal to 0.3 microns, greater than or equal to 0.4 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 15 microns, greater than or equal to 20 microns, greater than or equal to 30 microns, or greater than or equal to 40 microns. In some embodiments, the meltblown fibers have an average diameter of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.05 microns and less than or equal to 50 microns, greater than or equal to 0.1 microns and less than or equal to 30 microns, or greater than or equal to 0.2 microns and less than or equal to 10 microns).

In embodiments in which a filter media comprises two or more efficiency layers, each efficiency layer may independently comprise fibers comprising one or more of the materials described above and/or having one or more of the compositions described above.

In embodiments in which an efficiency layer comprises two or more types of fibers, each type of fiber may independently have an average fiber diameter and/or length in one or more of the ranges described above and/or all of the fibers in the efficiency layer may together have an average fiber length and/or diameter in one or more of the ranges described above. Similarly, when a filter media comprises two or more efficiency layers, each efficiency layer may independently comprise one or more types of fibers having an average fiber length and/or diameter in one or more of the ranges described above and/or may have an average fiber length and/or diameter in one or more of the ranges described above for all of the fibers therein.

The efficiency layers described herein may have any suitable basis weight. In some embodiments, an efficiency layer has a basis weight of greater than or equal to 0.01 gsm, greater than or equal to 0.015 gsm, greater than or equal to 0.02 gsm, greater than or equal to 0.025 gsm, greater than or equal to 0.05 gsm, greater than or equal to 0.075 gsm, greater than or equal to 0.1 gsm, greater than or equal to 0.2 gsm, greater than or equal to 0.3 gsm, greater than or equal to 0.4 gsm, greater than or equal to 0.5 gsm, greater than or equal to 0.6 gsm, greater than or equal to 0.8 gsm, greater than or equal to 1 gsm, greater than or equal to 1.25 gsm, greater than or equal to 1.5 gsm, greater than or equal to 1.75 gsm, greater than or equal to 2 gsm, greater than or equal to 2.5 gsm, greater than or equal to 3 gsm, greater than or equal to 3.5 gsm, greater than or equal to 4 gsm, greater than or equal to 4.5 gsm, greater than or equal to 5 gsm, greater than or equal to 10 gsm, greater than or equal to 20 gsm, greater than or equal to 30 gsm, greater than or equal to 40 gsm, greater than or equal to 50 gsm, greater than or equal to 75 gsm, greater than or equal to 100 gsm, greater than or equal to 150 gsm, greater than or equal to 200 gsm, greater than or equal to 300 gsm, or greater than or equal to 400 gsm. In some embodiments, an efficiency layer has a basis weight of less than or equal to 500 gsm, less than or equal to 400 gsm, less than or equal to 300 gsm, less than or equal to 200 gsm, less than or equal to 150 gsm, less than or equal to 120 gsm, less than or equal to 100 gsm, less than or equal to 75 gsm, less than or equal to 50 gsm, less than or equal to 40 gsm, less than or equal to 30 gsm, less than or equal to 20 gsm, less than or equal to 10 gsm, less than or equal to 5 gsm, less than or equal to 4.5 gsm, less than or equal to 4 gsm, less than or equal to 3.5 gsm, less than or equal to 3 gsm, less than or equal to 2.5 gsm, less than or equal to 2 gsm, less than or equal to 1.75 gsm, less than or equal to 1.5 gsm, less than or equal to 1.25 gsm, less than or equal to 1 gsm, less than or equal to 0.8 gsm, less than or equal to 0.6 gsm, less than or equal to 0.5 gsm, less than or equal to 0.4 gsm, less than or equal to 0.3 gsm, less than or equal to 0.2 gsm, less than or equal to 0.1 gsm, less than or equal to 0.075 gsm, less than or equal to 0.05 gsm, less than or equal to 0.025 gsm, less than or equal to 0.02 gsm, or less than or equal to 0.015 gsm. Combinations of the above-referenced ranges are also possible (e.g., greater than or equal to 1 gsm and less than or equal to 500 gsm, greater than or equal to 1 gsm and less than or equal to 120 gsm, greater than or equal to 0.1 gsm and less than or equal to 100 gsm, or greater than or equal to 1 gsm and less than or equal to 50 gsm). Other ranges are also possible.

In embodiments in which a filter media comprises two or more efficiency layers, each efficiency layer may independently have a basis weight in one or more of the ranges described above.

The thickness of the efficiency layers described herein may be selected as desired. In some embodiments, an efficiency layer has a thickness of greater than or equal to 50 nm, greater than or equal to 75 nm, greater than or equal to 100 nm, greater than or equal to 150 nm, greater than or equal to 200 nm, greater than or equal to 250 nm, greater than or equal to 500 nm, greater than or equal to 1000 nm, greater than or equal to 2500 nm, greater than or equal to 5000 nm, greater than or equal to 7500 nm, greater than or equal to 0.01 mm, greater than or equal to 0.025 mm, greater than or equal to 0.050 mm, greater than or equal to 0.075 mm, greater than or equal to 0.1 mm, greater than or equal to 0.2 mm, greater than or equal to 0.3 mm, greater than or equal to 0.4 mm, greater than or equal to 0.5 mm, greater than or equal to 0.6 mm, greater than or equal to 0.7 mm, greater than or equal to 0.8 mm, greater than or equal to 0.9 mm, greater than or equal to 1 mm, greater than or equal to 1.25 mm, greater than or equal to 1.5 mm, greater than or equal to 1.75 mm, greater than or equal to 2 mm, greater than or equal to 2.5 mm, greater than or equal to 3 mm, or greater than or equal to 4 mm. In some embodiments, an efficiency layer has a thickness of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.75 mm, less than or equal to 1.5 mm, less than or equal to 1.25 mm, less than or equal to 1 mm, less than or equal to 0.9 mm, less than or equal to 0.8 mm, less than or equal to 0.7 mm, less than or equal to 0.6 mm, less than or equal to 0.5 mm, less than or equal to 0.4 mm, less than or equal to 0.3 mm, less than or equal to 0.2 mm, less than or equal to 0.1 mm, less than or equal to 0.075 mm, less than or equal to 0.05 mm, less than or equal to 0.025 mm, less than or equal to 0.01 mm, less than or equal to 7500 nm, less than or equal to 5000 nm, less than or equal to 2500 nm, less than or equal to 1000 nm, less than or equal to 500 nm, less than or equal to 250 nm, less than or equal to 200 nm, less than or equal to 150 nm, or less than or equal to 100 nm. Combinations of the above-referenced ranges are also possible (e.g., greater than or equal to 50 nm and less than or equal to 5 mm, greater than or equal to 100 nm and less than or equal to 3 mm, or greater than or equal to 200 nm and less than or equal to 2 mm). Other ranges are also possible. The thickness of an efficiency layer may be determined using scanning electron microscopy.

In embodiments in which a filter media comprises two or more efficiency layers, each efficiency layer may independently have a thickness in one or more of the ranges described above.

The efficiency layer may have any suitable maximum pore size. In some embodiments, the maximum pore size of the efficiency layer is greater than or equal to 0.1 microns, greater than or equal to 0.2 microns, greater than or equal to 0.3 microns, greater than or equal to 0.4 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, the maximum pore size of the efficiency layer is less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.1 microns and less than or equal to 50 microns, greater than or equal to 0.2 microns and less than or equal to 40 microns, or greater than or equal to 0.4 microns and less than or equal to 30 microns).

In embodiments in which a filter media comprises two or more efficiency layers, each efficiency layer may independently have a maximum pore size in one or more of the ranges described above.

The efficiency layer may have any suitable air permeability. In some embodiments, the efficiency layer has an air permeability of greater than or equal to 0.1 CFM, greater than or equal to 0.2 CFM, greater than or equal to 0.3 CFM, greater than or equal to 0.4 CFM, greater than or equal to 0.5 CFM, greater than or equal to 1 CFM, greater than or equal to 2 CFM, greater than or equal to 3 CFM, greater than or equal to 4 CFM, greater than or equal to 5 CFM, greater than or equal to 10 CFM, greater than or equal to 20 CFM, greater than or equal to 30 CFM, greater than or equal to 40 CFM, greater than or equal to 50 CFM, greater than or equal to 75 CFM, greater than or equal to 100 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, or greater than or equal to 900 CFM. In some embodiments, the efficiency layer has an air permeability of less than or equal to 1,000 CFM, less than or equal to 950 CFM, less than or equal to 900 CFM, less than or equal to 850 CFM, less than or equal to 800 CFM, less than or equal to 750 CFM, less than or equal to 700 CFM, less than or equal to 650 CFM, less than or equal to 600 CFM, less than or equal to 550 CFM, less than or equal to 500 CFM, less than or equal to 400 CFM, less than or equal to 300 CFM, less than or equal to 200 CFM, less than or equal to 150 CFM, less than or equal to 100 CFM, less than or equal to 75 CFM, less than or equal to 50 CFM, less than or equal to 40 CFM, less than or equal to 30 CFM, less than or equal to 20 CFM, less than or equal to 10 CFM, less than or equal to 5 CFM, less than or equal to 4 CFM, less than or equal to 3 CFM, less than or equal to 2 CFM, or less than or equal to 1 CFM. Combinations of these ranges are also possible (e.g., greater than or equal to 0.1 CFM and less than or equal to 1,000 CFM, greater than or equal to 0.3 CFM and less than or equal to 750 CFM, or greater than or equal to 0.5 CFM and less than or equal to 500 CFM). Air permeability may be measured according to ASTM D737-04 (2016).

In embodiments in which a filter media comprises two or more efficiency layers, each efficiency layer may independently have an air permeability in one or more of the ranges described above.

In some embodiments, the additional layer comprises a backer layer. For example, in some embodiments, filter media 300 in FIG. 3 comprises upstream layer 310 (e.g., the non-woven fibrous layer) and downstream layer 320 (e.g., a backer). The backer layer(s) may support another layer present in the filter media and/or may be a layer onto which another layer was deposited during fabrication of the filter media. The backer layer(s) may provide structural support, provide stiffness, and/or enhance the ease with which the filter media may be fabricated without appreciably increasing the resistance of the filter media. In some embodiments, the backer layer does not contribute appreciably to the filtration performance of the filter media. In other embodiments, the backer layer(s) may enhance the performance of the filter media in one or more ways (e.g., one or more backer layers may be positioned upstream of other layers and/or may serve as prefilter layers). In some embodiments, a filter media comprises two or more backer layers. For instance, a filter media may comprise two or more backer layers disposed on one another that together form a composite backer layer. In some embodiments, an adhesive may be disposed on the backer layer (e.g., positioned between the backer layer and another layer).

It should be understood that any individual backer layer (and/or composite backer layer) may independently have some or all of the properties described herein with respect to backer layers. It should also be understood that a filter media may comprise two backer layers that are identical and/or may comprise two or more backer layers that differ in one or more ways.

The backer may comprise a variety of suitable fibers. In some embodiments, the backer comprises cellulose, cellulose derivative (e.g., lyocell fibers and/or rayon fibers), synthetic, and/or glass (e.g., microglass fibers and/or chopped strand fibers). In some embodiments, the backer comprises continuous fibers (e.g., meltblown fibers and/or spunbond fibers).

In embodiments where the backer comprises cellulose fibers, examples of suitable cellulose fibers may include softwood fibers, hardwood fibers, and combinations thereof. Examples of softwood cellulose fibers may include fibers that are derived from the wood of pine, cedar, alpine fir, douglas fir, and spruce trees. Examples of hardwood cellulose fibers may include fibers derived from the wood of *eucalyptus* (e.g., *Grandis*), maple, birch, and other deciduous trees.

In some embodiments, when the backer comprises synthetic fibers, the synthetic fibers are monocomponent fibers. Non-limiting examples of suitable synthetic fibers include fibers comprising one or more of the following materials: poly(amide) s (e.g., nylons, such as nylon 6), poly(ester) s (e.g., poly(caprolactone), poly(butylene terephthalate)), poly(urethane) s, poly(urea) s, acrylics, polymers comprising a side chain comprising a carbonyl functional group (e.g., poly(vinyl acetate), cellulose ester, poly(acrylamide)), poly(ether sulfone), poly(acrylic) s (e.g., poly(acrylonitrile), poly(acrylic acid)), fluorinated polymers (e.g., poly(vinylidene difluoride)), polyols (e.g., poly(vinyl alcohol)), poly(ether) s (e.g., poly(ethylene oxide)), poly(vinyl pyrrolidone), poly(allylamine), butyl rubber, poly(ethylene), polymers comprising a silane functional group, polymers comprising a thiol functional group, polymers comprising a methylol functional group (e.g., phenolic polymers, melamine polymers, melamine-formaldehyde polymers, crosslinkable polymers comprising pendant methylol groups). In some embodiments, the synthetic fibers are organic polymer fibers.

The backer described herein may include more than one type of fiber (e.g., two or more different types of monocomponent synthetic fibers, such as poly(amide) fibers and poly(ester) fibers) or may include exclusively one type of fiber (e.g., exclusively monocomponent synthetic fibers comprising a single type of poly(amide)). In some embodiments, the fibers in the backer comprise fibers comprising a blend of two or more of the polymers listed above (e.g., a blend of two types of poly(amide) s).

In some embodiments, the backer is a nanofiber layer. When present, a nanofiber layer may comprise a plurality of nanofibers comprising a variety of suitable types of nanofibers. In some embodiments, the plurality of nanofibers may comprise one or more synthetic polymers. Non-limiting examples of suitable synthetic polymers include polyamides (e.g., Nylons, such as Nylon 6), polyesters (e.g., poly (caprolactone), poly(butylene terephthalate)), polyurethanes, polyureas, acrylics, polymers comprising a side chain comprising a carbonyl functional group (e.g., poly (vinyl acetate), cellulose, cellulose ester, poly(acrylamide)), poly(ether sulfone), polyacrylics (e.g., poly(acrylonitrile), poly(acrylic acid)), fluorinated polymers (e.g., poly(vinylidene difluoride)), polyols (e.g., poly(vinyl alcohol)), polyethers (e.g., poly(ethylene oxide)), poly(vinyl pyrrolidone), poly(allylamine), polymers comprising a silane functional group, polymers comprising a thiol functional group, polymers comprising a methylol functional group (e.g., phenolic polymers or melamine polymers), and combinations thereof. In some embodiments, the plurality of nanofibers may comprise one or more natural polymers. Non-limiting examples of suitable natural polymers include biomolecules, such as DNA, RNA, proteins, antibodies, antigens, and combinations thereof. In some embodiments, the plurality of nanofibers comprises nanofibers comprising a copolymer of two or more of the polymers listed above and/or a blend of two or more of the polymers listed above (e.g., a blend of a polyamide and a polyester). In embodiments in which more than one nanofiber layer is present, each nanofiber layer may independently comprise nanofibers comprising one or more of the polymers described above.

In embodiments where the backer comprises cellulose fibers, the backer may include any suitable amount of cellulose fibers. In some embodiments, the backer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose fibers relative to the total weight of the backer. In some embodiments, the backer comprises less than or equal to 100 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % cellulose fibers relative to the total weight of the backer. Combinations of these ranges are also possible (e.g., 0.01 wt %-100 wt %). In some embodiments, the backer comprises 100 wt % cellulose fibers relative to the total weight of the backer. In some embodiments, the backer does not have cellulose fibers.

In embodiments where the backer comprises cellulose derivative fibers, the backer may include any suitable amount of cellulose derivative fibers. In some embodiments, the backer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % cellulose derivative fibers relative to the total weight of the backer. In some embodiments, the backer comprises less than or equal to 100 wt %, less than or equal to 99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % cellulose derivative fibers relative to the total weight of the backer. Combinations of these ranges are also possible (e.g., 0.01 wt %-99 wt %, 0.01 wt %-90%, or 0.01 wt %-80 wt %). In some embodiments, the backer comprises 100 wt % cellulose derivative fibers relative to the total weight of the backer. In some embodiments, the backer does not have cellulose derivative fibers.

In embodiments where the backer comprises synthetic fibers, the backer may include any suitable amount of synthetic fibers. In some embodiments, the backer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % synthetic fibers relative to the total weight of the backer. In some embodiments, the backer comprises less than or equal to 100 wt %, less than or equal to 99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % synthetic fibers relative to the total weight of the backer. Combinations of these ranges are also possible (e.g., 0.01 wt %-100 wt %, 0.01 wt %-99 wt %, 0.01 wt %-90 wt %, or 0.01 wt %-80 wt %). In some embodiments, the backer comprises 100 wt % synthetic fibers relative to the total weight of the backer. In some embodiments, the backer does not have synthetic fibers.

In embodiments where the backer comprises glass fibers, the backer may include any suitable amount of glass fibers. In some embodiments, the backer comprises greater than or equal to 0.01 wt %, greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % glass fibers relative to the total weight of the backer. In some embodiments, the backer comprises less than or equal to 100 wt %, less than or equal to 99 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt % glass fibers relative to the total weight of the backer. Combinations of these ranges are also possible (e.g., 0.01 wt %-100 wt %, 0.01 wt %-99 wt %, 0.01 wt %-90 wt %, or 0.01 wt %-80 wt %). In some embodiments, the backer comprises 100 wt % glass fibers relative to the total weight of the backer. In some embodiments, the backer does not have glass fibers.

Regardless of the type of fibers, the backer may have any suitable average fiber diameter. In some embodiments, the backer has an average fiber diameter of greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the backer has an average fiber diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, less than or equal to 3 microns, or less than or equal to 2 microns. Combinations of these ranges are also possible (e.g., greater than or equal to 1 micron and less than or equal to 100 microns, greater than or equal to 3 microns and less than or equal to 50 microns, or greater than or equal to 5 microns and less than or equal to 35 microns).

Regardless of the type of fibers, the backer may have any suitable average fiber length. In some embodiments, the backer has an average fiber length of greater than or equal to 1 millimeter, greater than or equal to 2 millimeters, greater than or equal to 3 millimeters, greater than or equal to 4 millimeters, greater than or equal to 5 millimeters, greater than or equal to 10 millimeters, greater than or equal to 15 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the backer has an average fiber length of less than or equal to 52 millimeters, less than or equal to 50 millimeters, less than or equal to 45 millimeters, less than or equal to 42 millimeters, less than or equal to 39 millimeters, less than or equal to 35 millimeters, less than or equal to 30 millimeters, less than or equal to 26 millimeters, less than or equal to 23 millimeters, less than or equal to 20 millimeters, less than or equal to 15 millimeters, less than or equal to 10 millimeters, less than or equal to 5 millimeters, less than or equal to 4 millimeters, less than or equal to 3 millimeters, or less than or equal to 2 millimeters. Combinations of these ranges are also possible (e.g., greater than or equal to 1 millimeter and less than or equal to 52 millimeters, greater than or equal to 1 millimeter and less than or equal to 39 millimeters, or greater than or equal to 1 millimeter and less than or equal to 26 millimeters). In some embodiments, the backer comprises continuous fibers having an average length of greater than 5 inches.

In embodiments where the backer comprises cellulose fibers, the cellulose fibers may have any suitable average diameter. In some embodiments, the cellulose fibers have a diameter of greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the cellulose fibers have a diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, or less than or equal to 3 microns. Combinations of these ranges are also possible (e.g., greater than or equal to 1 micron and less than or equal to 100 microns, greater than or equal to 3 microns and less than or equal to 50 microns, or greater than or equal to 5 microns and less than or equal to 35 microns).

The cellulose fibers may have any suitable average length. In some embodiments, the cellulose fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, or greater than or equal to 9 millimeters. In some embodiments, the cellulose fibers have an average length of less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 10 millimeters, greater than or equal to 0.3 millimeters and less than or equal to 7 millimeters, or greater than or equal to 0.5 millimeters and less than or equal to 4 millimeters).

In embodiments where the non-woven fibrous layer comprises cellulose derivative fibers, the cellulose derivative fibers may be regenerated fibers (e.g., lyocell fibers and/or rayon fibers). In some embodiments, the cellulose derivative fibers may be fibrillated fibers. In embodiments where the cellulose derivative fibers are fibrillated fibers, the cellulose derivative fibers may have any suitable Canadian Standard Freeness (CSF). In some embodiments, the cellulose derivative fibers have a CSF of greater than or equal to 0 mL, greater than or equal to 1 mL, greater than or equal to 5 mL, greater than or equal to 10 mL, greater than or equal to 20 mL, greater than or equal to 30 mL, greater than or equal to 40 mL, greater than or equal to 50 mL, greater than or equal to 60 mL, greater than or equal to 70 mL, greater than or equal to 80 mL, greater than or equal to 90 mL, greater than or equal to 100 mL, greater than or equal to 125 mL, greater than or equal to 150 mL, greater than or equal to 175 mL, greater than or equal to 200 mL, greater than or equal to 250 mL, greater than or equal to 300 mL, greater than or equal to 350 mL, greater than or equal to 400 mL, or greater than or equal to 450 mL. In some embodiments, the cellulose derivative fibers have a CSF of less than or equal to 500 mL, less than or equal to 450 mL, less than or equal to 400 mL, less than or equal to 350 mL, less than or equal to 300 mL, less than or equal to 250 mL, less than or equal to 200 mL, less than or equal to 175 mL, less than or equal to 150 mL, less than or equal to 125 mL, less than or equal to 100 mL, less than or equal to 90 mL, less than or equal to 80 mL, less than or equal to 70 mL, less than or equal to 60 mL, less than or equal to 50 mL, less than or equal to 40 mL, less than or equal to 30 mL, less than or equal to 20 mL, or less than or equal to 10 mL. Combinations of these ranges are also possible (e.g., greater than or equal to 0 mL and less than or equal to 500 mL, greater than or equal to 0 mL and less than or equal to 200 mL, or greater than or equal to 0 mL and less than or equal to 100 mL).

The cellulose derivative fibers may have any suitable average length. In some embodiments, the cellulose derivative fibers have an average length of greater than or equal to 0.1 millimeter, greater than or equal to 0.2 millimeters, greater than or equal to 0.3 millimeters, greater than or equal to 0.4 millimeters, greater than or equal to 0.5 millimeters, greater than or equal to 0.75 millimeters, greater than or equal to 1 millimeter, greater than or equal to 1.25 millimeters, greater than or equal to 1.5 millimeters, greater than or equal to 2 millimeters, greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, or greater than or equal to 11 millimeters. In some embodiments, the cellulose derivative fibers have an average length of less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, less than or equal to 4 millimeters, less than or equal to 3 millimeters, less than or equal to 2 millimeters, less than or equal to 1.5 millimeters, less than or equal to 1.25 millimeters, less than or equal to 1 millimeter, less than or equal to 0.75 millimeters, less than or equal to 0.5 millimeters, less than or equal to 0.4 millimeters, or less than or equal to 0.3 millimeters. Combinations of these ranges are also possible (e.g., greater than or equal to 0.1 millimeter and less than or equal to 12 millimeters, greater than or equal to 0.3 millimeters and less than or equal to 10 millimeters, or greater than or equal to 0.5 millimeters and less than or equal to 8 millimeters).

In embodiments where the backer comprises synthetic fibers, the synthetic fibers may have any suitable average diameter. In some embodiments, the synthetic fibers have an average diameter of greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the synthetic fibers have an average diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 20 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.4 microns and less than or equal to 5 microns, greater than or equal to 0.7 microns and less than or equal to 5 microns, greater than or equal to 1 micron and less than or equal to 5 microns, greater than or equal to 5 microns and less than or equal to 100 microns, greater than or equal to 5 microns and less than or equal to 50 microns, or greater than or equal to 5 microns and less than or equal to 35 microns). Synthetic fibers may have any suitable average length. In some embodiments, the synthetic fibers have an average length of greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, greater than or equal to 10 mm, greater than or equal to 12 mm, greater than or equal to 14 mm, greater than or equal to 16 mm, greater than or equal to 18 mm, greater than or equal to 20 mm, greater than or equal to 22 mm, or greater than or equal to 24 mm. In some embodiments, the synthetic fibers have an average length of less than or equal to 26 mm, less than or equal to 24 mm, less than or equal to 22 mm, less than or equal to 20 mm, less than or equal to 18 mm, less than or equal to 16 mm, less than or equal to 14 mm, less than or equal to 12 mm, less than or equal to 10 mm, less than or equal to 9 mm, less than or equal to 8 mm, less than or equal to 7 mm, less than or equal to 6 mm, less than or equal to 5 mm, less than or equal to 4 mm, or less than or equal to 3 mm. Combinations of these ranges are also possible (e.g., greater than or equal to 1 mm and less than or equal to 26 mm, greater than or equal to 1 mm and less than or equal to 5 mm, greater than or equal to 1 mm and less than or equal to 4 mm, greater than or equal to 1 mm and less than or equal to 3 mm, greater than or equal to 3 mm and less than or equal to 26 mm, greater than or equal to 3 mm and less than or equal to 20 mm, or greater than or equal to 5 mm and less than or equal to 13 mm).

In embodiments where the backer comprises glass fibers, the glass fibers may have any suitable average diameter. In some embodiments, the glass fibers have an average diameter of greater than or equal to 0.1 microns, greater than or equal to 0.2 microns, greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, greater than or equal to 8 microns, greater than or equal to 9 microns, greater than or equal to 10 microns, greater than or equal to 11 microns, greater than or equal to 12 microns, greater than or equal to 13 microns, greater than or equal to 14 microns, greater than or equal to 15 microns, greater than or equal to 20 microns, or greater than or equal to 25 microns. In some embodiments, the glass fibers have an average diameter of less than or equal to 30 microns, less than or equal to 25 microns, less than or equal to 20 microns, less than or equal to 15 microns, less than or equal to 14 microns, less than or equal to 13 microns, less than or equal to 12 microns, less than or equal to 11 microns, less than or equal to 10 microns, less than or equal to 9 microns, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.1 microns and less than or equal to 10 microns, greater than or equal to 0.4 microns and less than or equal to 6 microns, greater than or equal to 0.4 microns and less than or equal to 3 microns, greater than or equal to 4 microns and less than or equal to 30 microns, greater than or equal to 6 microns and less than or equal to 20 microns, or greater than or equal to 7 microns and less than or equal to 14 microns).

The glass fibers may have any suitable average length. In some embodiments, the glass fibers have an average length of greater than or equal to 3 millimeters, greater than or equal to 4 millimeters, greater than or equal to 5 millimeters, greater than or equal to 6 millimeters, greater than or equal to 7 millimeters, greater than or equal to 8 millimeters, greater than or equal to 9 millimeters, greater than or equal to 10 millimeters, greater than or equal to 11 millimeters, greater than or equal to 12 millimeters, greater than or equal to 15 millimeters, greater than or equal to 17 millimeters, greater than or equal to 20 millimeters, greater than or equal to 25 millimeters, greater than or equal to 30 millimeters, greater than or equal to 35 millimeters, greater than or equal to 40 millimeters, greater than or equal to 45 millimeters, or greater than or equal to 50 millimeters. In some embodiments, the glass fibers have an average length of less than or equal to 52 millimeters, less than or equal to 50 millimeters, less than or equal to 45 millimeters, less than or equal to 40 millimeters, less than or equal to 35 millimeters, less than or equal to 30 millimeters, less than or equal to 25 millimeters, less than or equal to 20 millimeters, less than or equal to 17 millimeters, less than or equal to 15 millimeters, less than or equal to 13 millimeters, less than or equal to 12 millimeters, less than or equal to 11 millimeters, less than or equal to 10 millimeters, less than or equal to 9 millimeters, less than or equal to 8 millimeters, less than or equal to 7 millimeters, less than or equal to 6 millimeters, less than or equal to 5 millimeters, or less than or equal to 4 millimeters. Combinations of these ranges are also possible (e.g., greater than or equal to 3 millimeters and less than or equal to 52 millimeters, greater than or equal to 3 millimeters and less than or equal to 20 millimeters, or greater than or equal to 6 millimeters and less than or equal to 13 millimeters).

In embodiments where the backer comprises meltblown fibers, the meltblown fibers may have any suitable average diameter. In some embodiments, the meltblown fibers have an average diameter of greater than or equal to 0.05 microns, greater than or equal to 0.1 microns, greater than or equal to 0.2 microns, greater than or equal to 0.3 microns, greater than or equal to 0.4 microns, greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 15 microns, greater than or equal to 20 microns, greater than or equal to 30 microns, or greater than or equal to 40 microns. In some embodiments, the meltblown fibers have an average diameter of less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 5 microns, less than or equal to 4 microns, less than or equal to 3 microns, less than or equal to 2 microns, or less than or equal to 1 micron. Combinations of these ranges are also possible (e.g., greater than or equal to 0.05 microns and less than or equal to 50 microns, greater than or equal to 0.1 microns and less than or equal to 30 microns, or greater than or equal to 0.2 microns and less than or equal to 10 microns).

In embodiments where the backer comprises spunbond fibers, the spunbond fibers may have any suitable average diameter. In some embodiments, the spunbond fibers have an average diameter of greater than or equal to 1 micron, greater than or equal to 3 microns, greater than or equal to 5 microns, greater than or equal to 7 microns, greater than or equal to 9 microns, greater than or equal to 11 microns, greater than or equal to 13 microns, greater than or equal to 15 microns, greater than or equal to 20 microns, greater than or equal to 25 microns, greater than or equal to 30 microns, greater than or equal to 35 microns, greater than or equal to 40 microns, greater than or equal to 50 microns, greater than or equal to 60 microns, greater than or equal to 70 microns, greater than or equal to 80 microns, or greater than or equal to 90 microns. In some embodiments, the spunbond fibers have an average diameter of less than or equal to 100 microns, less than or equal to 90 microns, less than or equal to 80 microns, less than or equal to 70 microns, less than or equal to 60 microns, less than or equal to 50 microns, less than or equal to 40 microns, less than or equal to 35 microns, less than or equal to 30 microns, less than or equal to 25 microns, less than or equal to 20 microns, less than or equal to 15 microns, less than or equal to 13 microns, less than or equal to 11 microns, less than or equal to 9 microns, less than or equal to 7 microns, less than or equal to 5 microns, or less than or equal to 3 microns. Combinations of these ranges are also possible (e.g., greater than or equal to 1 micron and less than or equal to 100 microns, greater than or equal to 5 microns and less than or equal to 50 microns, or greater than or equal to 15 microns and less than or equal to 35 microns).

The backer described herein may have any suitable basis weight. In some embodiments, a backer has a basis weight of greater than or equal to 10 gsm, greater than or equal to 20 gsm, greater than or equal to 30 gsm, greater than or equal to 40 gsm, greater than or equal to 50 gsm, greater than or equal to 75 gsm, greater than or equal to 100 gsm, greater than or equal to 150 gsm, greater than or equal to 200 gsm, greater than or equal to 300 gsm, or greater than or equal to 400 gsm. In some embodiments, a backer has a basis weight of less than or equal to 500 gsm, less than or equal to 400 gsm, less than or equal to 300 gsm, less than or equal to 250 gsm, less than or equal to 200 gsm, less than or equal to 180 gsm, less than or equal to 150 gsm, less than or equal to 120 gsm, less than or equal to 100 gsm, less than or equal to 75 gsm, less than or equal to 50 gsm, less than or equal to 40 gsm, less than or equal to 30 gsm, or less than or equal to 20 gsm. Combinations of the above-referenced ranges are also possible (e.g., greater than or equal to 10 gsm and less than or equal to 500 gsm, greater than or equal to 20 gsm and less than or equal to 250 gsm, or greater than or equal to 30 gsm and less than or equal to 180 gsm). Other ranges are also possible.

In embodiments in which a filter media comprises two or more backers, each backer may independently have a basis weight in one or more of the ranges described above.

The thickness of the backers described herein may be selected as desired. In some embodiments, a backer has a thickness of greater than or equal to 0.025 mm, greater than or equal to 0.050 mm, greater than or equal to 0.075 mm, greater than or equal to 0.1 mm, greater than or equal to 0.13 mm, greater than or equal to 0.2 mm, greater than or equal to 0.3 mm, greater than or equal to 0.4 mm, greater than or equal to 0.5 mm, greater than or equal to 0.6 mm, greater than or equal to 0.7 mm, greater than or equal to 0.8 mm, greater than or equal to 0.9 mm, greater than or equal to 1 mm, greater than or equal to 1.25 mm, greater than or equal to 1.5 mm, greater than or equal to 1.75 mm, greater than or equal to 2 mm, greater than or equal to 2.5 mm, greater than or equal to 3 mm, greater than or equal to 3.5 mm, or greater than or equal to 4 mm. In some embodiments, a backer has a thickness of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.75 mm, less than or equal to 1.5 mm, less than or equal to 1.25 mm, less than or equal to 1 mm, less than or equal to 0.9 mm, less than or equal to 0.8 mm, less than or equal to 0.75 mm, less than or equal to 0.7 mm, less than or equal to 0.6 mm, less than or equal to 0.5 mm, less than or equal to 0.4 mm, less than or equal to 0.3 mm, less than or equal to 0.2 mm, less than or equal to 0.1 mm, or less than or equal to 0.075 mm. Combinations of the above-referenced ranges are also possible (e.g., greater than or equal to 0.025 mm and less than or equal to 5 mm, greater than or equal to 0.13 mm and less than or equal to 2.5 mm, or greater than or equal to 0.13 mm and less than or equal to 0.75 mm). Other ranges are also possible. The thickness of a backer may be determined using scanning electron microscopy.

In embodiments in which a filter media comprises two or more backers, each backer may independently have a thickness in one or more of the ranges described above.

The backer may have any suitable maximum pore size. In some embodiments, the maximum pore size of the backer is greater than or equal to 0.5 microns, greater than or equal to 1 micron, greater than or equal to 2 microns, greater than or equal to 3 microns, greater than or equal to 4 microns, greater than or equal to 5 microns, greater than or equal to 10 microns, greater than or equal to 20 microns, greater than or equal to 30 microns, greater than or equal to 40 microns, greater than or equal to 50 microns, greater than or equal to 75 microns, greater than or equal to 100 microns, greater than or equal to 150 microns, greater than or equal to 200 microns, greater than or equal to 300 microns, or greater than or equal to 400 microns. In some embodiments, the maximum pore size of the backer is less than or equal to 500 microns, less than or equal to 450 microns, less than or equal to 400 microns, less than or equal to 350 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 40 microns, less than or equal to 30 microns, less than or equal to 20 microns, less than or equal to 10 microns, less than or equal to 5 microns, less than or equal to 4 microns, less than or equal to 3 microns, or less than or equal to 2 microns. Combinations of these ranges are also possible (e.g., greater than or equal to 0.5 microns and less than or equal to 500 microns, greater than or equal to 0.5 microns and less than or equal to 400 microns, or greater than or equal to 1 micron and less than or equal to 300 microns).

In embodiments in which a filter media comprises two or more backers, each backer may independently have a maximum pore size in one or more of the ranges described above.

The backer may have any suitable air permeability. In some embodiments, the backer has an air permeability of greater than or equal to 1 CFM, greater than or equal to 2 CFM, greater than or equal to 3 CFM, greater than or equal to 4 CFM, greater than or equal to 5 CFM, greater than or equal to 10 CFM, greater than or equal to 20 CFM, greater than or equal to 30 CFM, greater than or equal to 40 CFM, greater than or equal to 50 CFM, greater than or equal to 75 CFM, greater than or equal to 100 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, or greater than or equal to 900 CFM. In some embodiments, the backer has an air permeability of less than or equal to 1,000 CFM, less than or equal to 950 CFM, less than or equal to 900 CFM, less than or equal to 850 CFM, less than or equal to 800 CFM, less than or equal to 750 CFM, less than or equal to 700 CFM, less than or equal to 650 CFM, less than or equal to 600 CFM, less than or equal to 550 CFM, less than or equal to 500 CFM, less than or equal to 450 CFM, less than or equal to 400 CFM, less than or equal to 300 CFM, less than or equal to 200 CFM, less than or equal to 150 CFM, less than or equal to 100 CFM, less than or equal to 75 CFM, less than or equal to 50 CFM, less than or equal to 40 CFM, less than or equal to 30 CFM, less than or equal to 20 CFM, or less than or equal to 10 CFM. Combinations of these ranges are also possible (e.g., greater than or equal to 1 CFM and less than or equal to 1,000 CFM, greater than or equal to 5 CFM and less than or equal to 700 CFM, or greater than or equal to 10 CFM and less than or equal to 400 CFM).

In embodiments in which a filter media comprises two or more backers, each backer may independently have an air permeability in one or more of the ranges described above.

In some embodiments, the additional layer comprises a functionalized layer. For example, in some embodiments, filter media 300 in FIG. 3 comprises upstream layer 310 (e.g., the non-woven fibrous layer) and downstream layer 320 (e.g., a functionalized layer). In certain embodiments, a layer (e.g., a prefilter layer, efficiency layer, and/or backer) can be functionalized. For example, in some embodiments, filter media 300 in FIG. 3 comprises upstream layer 310 (e.g., a functionalized prefilter layer) and downstream layer 320 (e.g., the non-woven fibrous layer). Examples of methods of functionalizing a layer include chemical vapor deposition (e.g., to change the surface energy by using free radical chemicals to make the surface oleophobic, oleophilic, hydrophobic, or hydrophilic)

In some embodiments, the one or more layers may also be modified by hydrocharging (e.g., to create electrostatic charge); corona processing (e.g., to create electrostatic charge); liquid to solid coating (e.g., curtain coating, size press coating, graviur coating, screen printing coating, and/or spray coating); and/or thermal treatment (e.g., baking and/or flaming).

The filter media described herein (e.g., any composite described herein, such as a filter media comprising a prefilter layer (if any), the non-woven fibrous layer comprising out-of-plane solid elements, an efficiency layer (if any), and a backer (if any)) may have any suitable basis weight. In some embodiments, a filter media has a basis weight of greater than or equal to 10 gsm, greater than or equal to 20 gsm, greater than or equal to 30 gsm, greater than or equal to 40 gsm, greater than or equal to 50 gsm, greater than or equal to 75 gsm, greater than or equal to 100 gsm, greater than or equal to 150 gsm, greater than or equal to 200 gsm, greater than or equal to 300 gsm, or greater than or equal to 400 gsm. In some embodiments, a filter media has a basis weight of less than or equal to 500 gsm, less than or equal to 400 gsm, less than or equal to 300 gsm, less than or equal to 250 gsm, less than or equal to 200 gsm, less than or equal to 180 gsm, less than or equal to 150 gsm, less than or equal to 120 gsm, less than or equal to 100 gsm, less than or equal to 75 gsm, less than or equal to 50 gsm, less than or equal to 40 gsm, less than or equal to 30 gsm, or less than or equal to 20 gsm. Combinations of the above-referenced ranges are also possible (e.g., greater than or equal to 10 gsm and less than or equal to 500 gsm, greater than or equal to 20 gsm and less than or equal to 250 gsm, or greater than or equal to 30 gsm and less than or equal to 180 gsm). Other ranges are also possible.

The thickness of the filter media described herein may be selected as desired. In some embodiments, a filter media has a thickness of greater than or equal to 0.025 mm, greater than or equal to 0.050 mm, greater than or equal to 0.075 mm, greater than or equal to 0.1 mm, greater than or equal to 0.13 mm, greater than or equal to 0.2 mm, greater than or equal to 0.3 mm, greater than or equal to 0.4 mm, greater than or equal to 0.5 mm, greater than or equal to 0.6 mm, greater than or equal to 0.7 mm, greater than or equal to 0.8 mm, greater than or equal to 0.9 mm, greater than or equal to 1 mm, greater than or equal to 1.25 mm, greater than or equal to 1.5 mm, greater than or equal to 1.75 mm, greater than or equal to 2 mm, greater than or equal to 2.5 mm, greater than or equal to 3 mm, greater than or equal to 3.5 mm, or greater than or equal to 4 mm. In some embodiments, a filter media has a thickness of less than or equal to 5 mm, less than or equal to 4.5 mm, less than or equal to 4 mm, less than or equal to 3.5 mm, less than or equal to 3 mm, less than or equal to 2.5 mm, less than or equal to 2 mm, less than or equal to 1.75 mm, less than or equal to 1.5 mm, less than or equal to 1.25 mm, less than or equal to 1 mm, less than or equal to 0.9 mm, less than or equal to 0.8 mm, less than or equal to 0.75 mm, less than or equal to 0.7 mm, less than or equal to 0.6 mm, less than or equal to 0.5 mm, less than or equal to 0.4 mm, less than or equal to 0.3 mm, less than or equal to 0.2 mm, less than or equal to 0.1 mm, or less than or equal to 0.075 mm. Combinations of the above-referenced ranges are also possible (e.g., greater than or equal to 0.025 mm and less than or equal to 5 mm, greater than or equal to 0.13 mm and less than or equal to 2.5 mm, or greater than or equal to 0.13 mm and less than or equal to 0.75 mm). Other ranges are also possible. Thickness (e.g., overall caliper thickness) of a filter media may be determined according to ISO 12625-3:2014 at 2 kPa.

The filter media may have any suitable efficiency level. In some embodiments, a filter media has an initial efficiency according to the EN779 test of less than or equal to 99.99%, less than or equal to 99%, less than or equal to 98%, less than or equal to 97%, less than or equal to 96%, less than or equal to 95%, less than or equal to 92.5%, less than or equal to 90%, less than or equal to 85%, less than or equal to 80%, less than or equal to 70%, less than or equal to 60%, less than or equal to 50%, less than or equal to 40%, less than or equal to 30%, less than or equal to 25%, less than or equal to 20%, or less than or equal to 15%. In some embodiments, a filter media has an initial efficiency according to the EN779 test of greater than or equal to 10%, greater than or equal to 15%, greater than or equal to 20%, greater than or equal to 25%, greater than or equal to 30%, greater than or equal to 40%, greater than or equal to 50%, greater than or equal to 60%, greater than or equal to 70%, greater than or equal to 80%, greater than or equal to 85%, greater than or equal to 90%, greater than or equal to 92.5%, greater than or equal to 95%, greater than or equal to 96%, greater than or equal to 97%, or greater than or equal to 98%, or greater than or equal to 99%. Combinations of the above-referenced ranges are also possible (e.g., less than or equal to 99.99% and greater than or equal to 10%). Other ranges are also possible. The initial efficiency of the filter media may be determined at a face velocity of 2.8 cm/s in accordance with EN779: 2012 with the use of a TSI 8130 automated filter testing unit from TSI, Inc. In some embodiments, these ranges of initial efficiency may be achieved for a DEHS particle size of 0.4 microns. In some embodiments, these ranges of initial efficiency may be achieved for the most penetrating particle size (MPPS).

In some embodiments, the filter media has an initial efficiency according to the ISO 5011 test of greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 85%, greater than or equal to 90%, greater than or equal to 95%, greater than or equal to 99%, greater than or equal to 99.5%, greater than or equal to 99.9%, or greater than or equal to 99.99%. In some embodiments, the filter media has an overall average efficiency according to the ISO 5011 test of less than or equal to 99.999%, less than or equal to 99.99%, less than or equal to 99.9%, less than or equal to 99.5%, less than or equal to 99%, less than or equal to 95%, less than or equal to 90%, less than or equal to 85%, less than or equal to 80%, less than or equal to 70%, less than or equal to 60%, less than or equal to 50%, less than or equal to 40%, or less than or equal to 30%. Combinations of these ranges are also possible (e.g., greater than or equal to 10% and less than or equal to 99.999% or greater than or equal to 30% and less than or equal to 99.99%). Initial efficiency may be measured according to ISO 5011 (2014) at a face velocity of 5.33 cm/s using ISO Fine A2 dust and a particle size of 0.4 microns.

In some embodiments, the filter media has an overall average efficiency of greater than or equal to 1%, greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 85%, greater than or equal to 90%, greater than or equal to 95%, greater than or equal to 99%, greater than or equal to 99.5%, greater than or equal to 99.9%, or greater than or equal to 99.99%. In some embodiments, the filter media has an overall average efficiency of less than or equal to 99.9999%, less than or equal to 99.999%, less than or equal to 99.9%, less than or equal to 99.5%, less than or equal to 99%, less than or equal to 95%, less than or equal to 90%, less than or equal to 85%, less than or equal to 80%, less than or equal to 70%, less than or equal to 60%, less than or equal to 50%, less than or equal to 40%, or less than or equal to 30%. Combinations of these ranges are also possible (e.g., greater than or equal to 1% and less than or equal to 99.9999% or greater than or equal to 1% and less than or equal to 99.999%). The overall average efficiency may be measured according to ISO 4548 (2012)

at a face velocity of 0.1 cm/s using ISO A3 Medium dust with a particle size of 4 microns.

The filter media may have any suitable air permeability. In some embodiments, the filter media has an air permeability of greater than or equal to 1 CFM, greater than or equal to 5 CFM, greater than or equal to 10 CFM, greater than or equal to 20 CFM, greater than or equal to 30 CFM, greater than or equal to 40 CFM, greater than or equal to 50 CFM, greater than or equal to 75 CFM, greater than or equal to 100 CFM, greater than or equal to 125 CFM, greater than or equal to 150 CFM, greater than or equal to 200 CFM, greater than or equal to 300 CFM, greater than or equal to 400 CFM, greater than or equal to 500 CFM, greater than or equal to 600 CFM, greater than or equal to 700 CFM, greater than or equal to 800 CFM, or greater than or equal to 900 CFM. In some embodiments, the filter media has an air permeability of less than or equal to 1000 CFM, less than or equal to 900 CFM, less than or equal to 800 CFM, less than or equal to 700 CFM, less than or equal to 600 CFM, less than or equal to 500 CFM, less than or equal to 400 CFM, less than or equal to 300 CFM, less than or equal to 200 CFM, less than or equal to 150 CFM, less than or equal to 125 CFM, less than or equal to 100 CFM, less than or equal to 75 CFM, less than or equal to 50 CFM, less than or equal to 40 CFM, less than or equal to 30 CFM, less than or equal to 20 CFM, less than or equal to 10 CFM, or less than or equal to 5 CFM. Combinations of these ranges are also possible (e.g., greater than or equal to 1 CFM and less than or equal to 1000 CFM, greater than or equal to 1 CFM and less than or equal to 500 CFM, or greater than or equal to 1 CFM and less than or equal to 200 CFM).

The filter media may have any suitable dust holding capacity. In some embodiments, the filter media has a dust holding capacity according to the ISO 5011 test of greater than or equal to 1 gsm, greater than or equal to 5 gsm, greater than or equal to 10 gsm, greater than or equal to 25 gsm, greater than or equal to 50 gsm, greater than or equal to 100 gsm, greater than or equal to 200 gsm, greater than or equal to 300 gsm, greater than or equal to 400 gsm, greater than or equal to 500 gsm, greater than or equal to 750 gsm, greater than or equal to 1,000 gsm, or greater than or equal to 1,250 gsm. In some embodiments, the filter media has a dust holding capacity according to the ISO 5011 test of less than or equal to 1,500 gsm, less than or equal to 1,250 gsm, less than or equal to 1,000 gsm, less than or equal to 750 gsm, less than or equal to 500 gsm, less than or equal to 400 gsm, less than or equal to 300 gsm, less than or equal to 200 gsm, less than or equal to 100 gsm, less than or equal to 50 gsm, less than or equal to 25 gsm, or less than or equal to 10 gsm. Combinations of these ranges are also possible (e.g., greater than or equal to 1 gsm and less than or equal to 1,500 gsm, greater than or equal to 1 gsm and less than or equal to 1,500 gsm, or greater than or equal to 1 gsm and less than or equal to 1,000 gsm). Dust holding capacity may be measured according to ISO 5011 (2014) at 5.33 cm/s using ISO Fine A2 dust.

In some embodiments, the filter media has a dust holding capacity according to the ISO 4058 test of greater than or equal to 20 gsm, greater than or equal to 30 gsm, greater than or equal to 40 gsm, greater than or equal to 50 gsm, greater than or equal to 75 gsm, greater than or equal to 100 gsm, greater than or equal to 150 gsm, greater than or equal to 200 gsm, greater than or equal to 250 gsm, greater than or equal to 300 gsm, greater than or equal to 400 gsm, greater than or equal to 500 gsm, greater than or equal to 600 gsm, greater than or equal to 700 gsm, greater than or equal to 800 gsm, or greater than or equal to 900 gsm. In some embodiments, the filter media has a dust holding capacity according to the ISO 4058 test of less than or equal to 1000 gsm, less than or equal to 900 gsm, less than or equal to 800 gsm, less than or equal to 700 gsm, less than or equal to 600 gsm, less than or equal to 500 gsm, less than or equal to 400 gsm, less than or equal to 300 gsm, less than or equal to 250 gsm, less than or equal to 200 gsm, less than or equal to 150 gsm, less than or equal to 100 gsm, less than or equal to 75 gsm, less than or equal to 50 gsm, less than or equal to 40 gsm, or less than or equal to 30 gsm. Combinations of these ranges are also possible (e.g., greater than or equal to 20 gsm and less than or equal to 1000 gsm or greater than or equal to 30 gsm and less than or equal to 400 gsm). Dust holding capacity may be measured according to ISO 4058 (2012) at a face velocity of 0.1 cm/s using ISO A3 Medium dust.

The filter media may have any suitable initial pressure drop. In some embodiments, the filter media has an initial pressure drop of greater than or equal to 0.01 Pa, greater than or equal to 0.05 Pa, greater than or equal to 0.1 Pa, greater than or equal to 0.5 Pa, greater than or equal to 1 Pa, greater than or equal to 5 Pa, greater than or equal to 10 Pa, greater than or equal to 25 Pa, greater than or equal to 50 Pa, greater than or equal to 100 Pa, greater than or equal to 200 Pa, greater than or equal to 300 Pa, greater than or equal to 400 Pa, greater than or equal to 500 Pa, greater than or equal to 750 Pa, greater than or equal to 1,000 Pa, greater than or equal to 1,500 Pa, greater than or equal to 2,000 Pa, greater than or equal to 3,000 Pa, or greater than or equal to 3,500 Pa. In some embodiments, the filter media has an initial pressure drop of less than or equal to 4,000 Pa, less than or equal to 3,500 Pa, less than or equal to 3,000 Pa, less than or equal to 2,500 Pa, less than or equal to 2,000 Pa, less than or equal to 1,500 Pa, less than or equal to 1,000 Pa, less than or equal to 750 Pa, less than or equal to 500 Pa, less than or equal to 400 Pa, less than or equal to 300 Pa, less than or equal to 200 Pa, less than or equal to 100 Pa, less than or equal to 50 Pa, less than or equal to 25 Pa, less than or equal to 10 Pa, less than or equal to 5 Pa, or less than or equal to 1 Pa. Combinations of these ranges are also possible (e.g., greater than or equal to 0.01 Pa and less than or equal to 4,000 Pa, greater than or equal to 0.05 Pa and less than or equal to 3,000 Pa, or greater than or equal to 0.1 Pa and less than or equal to 1,500 Pa). Initial pressure drop may be measured according to ISO 5011 (2014) at 5.33 cm/s.

The filter media may have any suitable Gurley bending dry stiffness. In some embodiments, the filter media has a Gurley bending dry stiffness of greater than or equal to 50 mg, greater than or equal to 60 mg, greater than or equal to 70 mg, greater than or equal to 80 mg, greater than or equal to 90 mg, greater than or equal to 100 mg, greater than or equal to 125 mg, greater than or equal to 150 mg, greater than or equal to 200 mg, greater than or equal to 250 mg, greater than or equal to 300 mg, greater than or equal to 350 mg, greater than or equal to 400 mg, greater than or equal to 500 mg, greater than or equal to 600 mg, greater than or equal to 750 mg, greater than or equal to 1,000 mg, greater than or equal to 5,000 mg, greater than or equal to 10,000 mg, greater than or equal to 15,000 mg, greater than or equal to 20,000 mg, or greater than or equal to 25,000 mg. In some embodiments, the filter media has a Gurley bending dry stiffness of less than or equal to 30,000 mg, less than or equal to 25,000 mg, less than or equal to 20,000 mg, less than or equal to 15,000 mg, less than or equal to 10,000 mg, less than or equal to 5,000 mg, less than or equal to 1,000 mg, less than or equal to 750 mg, less than or equal to 600 mg, less than or equal to 500 mg, less than or equal to 400 mg, less than or equal to 350 mg, less than or equal to 300 mg, less than or equal to 250 mg, less than or equal to 200 mg, less than or equal to 150 mg, less than or equal to 125 mg, or less than or equal to 100 mg. Combinations of these ranges are also possible (e.g., greater than or equal to 50 mg and less than or equal to 30,000 mg, greater than or equal to 100 mg and less than or equal to 30,000 mg, or greater than or equal to 150 mg and less than or equal to 30,000 mg).

In some embodiments, a filter media described herein may be a component of a filter element. That is, the filter media may be incorporated into an article suitable for use by an end user. When incorporated into a filter element, the filter media may be arranged such that a prefilter, if present, is positioned on the upstream surface. An efficiency layer, when present, may be positioned downstream of the prefilter and/or a backer, when present, may be positioned downstream of the efficiency layer. It is also possible for a backer to be the upstreammost layer, for a prefilter to be the downstreammost layer, and/or for a prefilter to be downstream of a backer.

Non-limiting examples of suitable filter elements include flat panel filters, V-bank filters (comprising, e.g., between 1 and 24 Vs), cartridge filters, cylindrical filters, conical filters, and curvilinear filters. Filter elements may have any suitable height (e.g., between 2 in and 124 in for flat panel filters, between 4 in and 124 in for V-bank filters, between 1 in and 124 in for cartridge and cylindrical filter media). Filter elements may also have any suitable width (between 2 in and 124 in for flat panel filters, between 4 in and 124 in for V-bank filters). Some filter media (e.g., cartridge filter media, cylindrical filter media) may be characterized by a diameter instead of a width; these filter media may have a diameter of any suitable value (e.g., between 1 in and 124 in). Filter elements typically comprise a frame, which may be made of one or more materials such as cardboard, aluminum, steel, alloys, wood, and polymers.

In some embodiments, a filter media described herein may be a component of a filter element and may be pleated. The pleat height and pleat density (number of pleats per unit length of the media) may be selected as desired. In some embodiments, the pleat height may be greater than or equal to 10 mm, greater than or equal to 15 mm, greater than or equal to 20 mm, greater than or equal to 25 mm, greater than or equal to 30 mm, greater than or equal to 35 mm, greater than or equal to 40 mm, greater than or equal to 45 mm, greater than or equal to 50 mm, greater than or equal to 53 mm, greater than or equal to 55 mm, greater than or equal to 60 mm, greater than or equal to 65 mm, greater than or equal to 70 mm, greater than or equal to 75 mm, greater than or equal to 80 mm, greater than or equal to 85 mm, greater than or equal to 90 mm, greater than or equal to 95 mm, greater than or equal to 100 mm, greater than or equal to 125 mm, greater than or equal to 150 mm, greater than or equal to 175 mm, greater than or equal to 200 mm, greater than or equal to 225 mm, greater than or equal to 250 mm, greater than or equal to 275 mm, greater than or equal to 300 mm, greater than or equal to 325 mm, greater than or equal to 350 mm, greater than or equal to 375 mm, greater than or equal to 400 mm, greater than or equal to 425 mm, greater than or equal to 450 mm, greater than or equal to 475 mm, or greater than or equal to 500 mm. In some embodiments, the pleat height is less than or equal to 510 mm, less than or equal to 500 mm, less than or equal to 475 mm, less than or equal to 450 mm, less than or equal to 425 mm, less than or equal to 400 mm, less than or equal to 375 mm, less than or equal to 350 mm, less than or equal to 325 mm, less than or equal to 300 mm, less than or equal to 275 mm, less than or equal to 250 mm, less than or equal to 225 mm, less than or equal to 200 mm, less than or equal to 175 mm, less than or equal to 150 mm, less than or equal to 125 mm, less than or equal to 100 mm, less than or equal to 95 mm, less than or equal to 90 mm, less than or equal to 85 mm, less than or equal to 80 mm, less than or equal to 75 mm, less than or equal to 70 mm, less than or equal to 65 mm, less than or equal to 60 mm, less than or equal to 55 mm, less than or equal to 53 mm, less than or equal to 50 mm, less than or equal to 45 mm, less than or equal to 40 mm, less than or equal to 35 mm, less than or equal to 30 mm, less than or equal to 25 mm, less than or equal to 20 mm, or less than or equal to 15 mm. Combinations of the above-referenced ranges are also possible (e.g., greater than or equal to 10 mm and less than or equal to 510 mm, or greater than or equal to 10 mm and less than or equal to 100 mm). Other ranges are also possible.

In some embodiments, a filter media has a pleat density of greater than or equal to 5 pleats per 100 mm, greater than or equal to 6 pleats per 100 mm, greater than or equal to 10 pleats per 100 mm, greater than or equal to 15 pleats per 100 mm, greater than or equal to 20 pleats per 100 mm, greater than or equal to 25 pleats per 100 mm, greater than or equal to 28 pleats per 100 mm, greater than or equal to 30 pleats per 100 mm, or greater than or equal to 35 pleats per 100 mm. In some embodiments, a filter media has a pleat density of less than or equal to 40 pleats per 100 mm, less than or equal to 35 pleats per 100 mm, less than or equal to 30 pleats per 100 mm, less than or equal to 28 pleats per 100 mm, less than or equal to 25 pleats per 100 mm, less than or equal to 20 pleats per 100 mm, less than or equal to 15 pleats per 100 mm, less than or equal to 10 pleats per 100 mm, or less than or equal to 6 pleats per 100 mm. Combinations of the above-referenced ranges are also possible (e.g., greater than or equal to 5 pleats per 100 mm and less than or equal to 100 pleats per 100 mm, greater than or equal to 6 pleats per 100 mm and less than or equal to 100 pleats per 100 mm, or greater than or equal to 25 pleats per 100 mm and less than or equal to 28 pleats per 100 mm). Other ranges are also possible.

Other pleat heights and densities may also be possible. For instance, filter media within flat panel or V-bank filters may have pleat heights between ¼ in and 24 in, and/or pleat densities between 1 pleat/in and 50 pleats/in. As another example, filter media within cartridge filters or conical filters may have pleat heights between ¼ in and 24 in and/or pleat densities between ½ pleats/in and 100 pleats/in. In some embodiments, pleats are separated by a pleat separator made of, e.g., polymer, glass, aluminum, and/or cotton. In other embodiments, the filter element lacks a pleat separator. The filter media may be wire-backed, or it may be self-supporting.

The filter media and/or filter elements described herein may have a variety of suitable uses. In some embodiments, the filter media and/or filter elements described herein may be used for heavy duty air, auto air, gas turbine (both static and pulsing), lube, fuel, and/or hydraulic applications.

Figure 4:
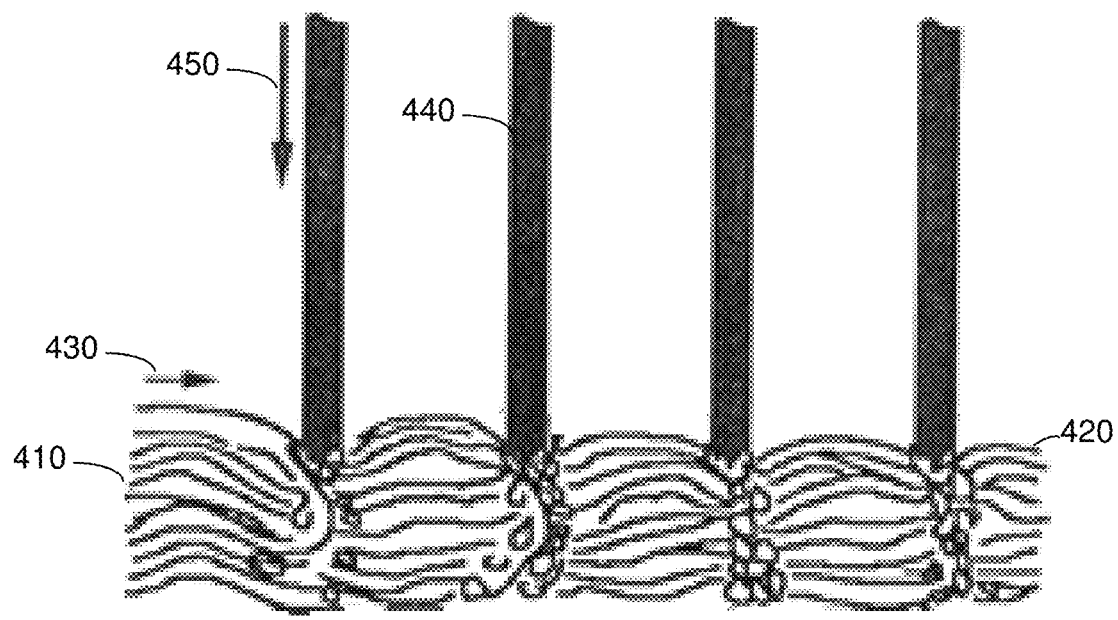
FIG. 4 is, in accordance with certain embodiments, a schematic of a hydroentanglement process.

Methods of forming filter media including out-of-plane solid elements are also disclosed. In some embodiments, the method comprises impinging fluid on a top surface of a non-woven precursor layer to produce a modified layer. In some embodiments, impinging fluid comprises use of nozzles (e.g., hydrojets). For example, in some embodiments, in FIG. 4, the method comprises impinging fluid 440 on a top surface of non-woven precursor layer 410 to produce modified layer 420. In some embodiments, the pressure of the impinging fluid (e.g., when leaving the nozzle) and/or the quantity of the nozzles, and/or the movement of the precursor layer relative to the impinging fluid and/or nozzles are selected to affect the relative frequency of the out-of-plane solid elements in the modified layer. In some embodiments, the fiber types, the fiber lengths, and/or the fiber diameters are selected to affect the relative frequency of the out-of-plane solid elements in the modified layer.

In some embodiments, the method comprises providing a non-woven precursor layer comprising fibers (such as embodiments of the non-woven fibrous layer described above, or elsewhere herein, or combinations thereof).

In some embodiments, the method comprises impinging fluid on a top surface of the precursor layer to produce a modified layer (such as embodiments of the non-woven fibrous layer described above, or elsewhere herein, of combinations thereof). In some embodiments, at least a section of the modified layer comprises out-of-plane solid elements having an out-of-plane orientation angle of greater than 30 degrees; wherein the section has a thickness that extends from a top surface of the section to a bottom surface of the section and a total volume that includes a first volume portion, a second volume portion and a third volume portion; wherein the first volume portion starts at a cross-sectional area located at 20% of the thickness and extends to a cross-sectional area located at 40% of the thickness, wherein a first relative frequency of out-of-plane solid elements in the first volume portion is assigned to be located at a cross-sectional area located at 30% of the thickness; wherein the second volume portion starts at a cross-sectional area located at 40% of the thickness and extends to a cross-sectional area located at 60% of the thickness, wherein a second relative frequency of out-of-plane solid elements in the second volume portion is assigned to be located at a cross-sectional area located at 50% of the thickness; wherein the third volume portion starts at a cross-sectional area located at 60% of the thickness and extends to a cross-sectional area located at 80% of the thickness, wherein a third relative frequency of out-of-plane solid elements in the third volume portion is assigned to be located at a cross-sectional area located at 70% of the thickness; wherein the section has a gradient in relative frequency of the out-of-plane solid elements across at least a portion of the thickness and the gradient is represented by a linear equation fit to the first relative frequency of out-of-plane solid elements, the second relative frequency of out-of-plane solid elements, and the third relative frequency of out-of-plane solid elements.

The impinging fluid may be any suitable fluid. In some embodiments, the impinging fluid comprises water. For example, in some embodiments, impinging fluid comprises using hydrojets. In accordance with certain embodiments, in FIG. 4, the method comprises impinging fluid 440, for example, from nozzles, such as hydrojets, on a top surface of non-woven precursor layer 410 to produce modified layer 420.

The pressure of the impinging fluid in each nozzle may be independently selected as desired. In some embodiments, impinging fluid comprises impinging fluid at a pressure of greater than or equal to 2 bar, greater than or equal to 3 bar, greater than or equal to 4 bar, greater than or equal to 5 bar, greater than or equal to 10 bar, greater than or equal to 15 bar, greater than or equal to 20 bar, greater than or equal to 30 bar, greater than or equal to 40 bar, greater than or equal to 50 bar, greater than or equal to 75 bar, greater than or equal to 100 bar, or greater than or equal to 150 bar in each nozzle independently. In some embodiments, impinging fluid comprises impinging fluid at a pressure of less than or equal to 200 bar, less than or equal to 175 bar, less than or equal to 150 bar, less than or equal to 125 bar, less than or equal to 100 bar, less than or equal to 75 bar, less than or equal to 50 bar, less than or equal to 40 bar, less than or equal to 30 bar, less than or equal to 20 bar, less than or equal to 15 bar, less than or equal to 10 bar, less than or equal to 5 bar, less than or equal to 4 bar, or less than or equal to 3 bar in each nozzle independently. Combinations of these ranges are also possible (e.g., 2-200, 10-200, 15-100, or 20-50 bar). In some embodiments, the pressure is selected to achieve the desired relative frequency of out-of-plane solid elements for the type of fiber (e.g., cellulose) of a certain diameter and/or length.

The number of nozzles may be selected as desired. In some embodiments, there are a plurality of nozzles. In certain embodiments, there are greater than or equal to 1 nozzle, greater than or equal to 2 nozzles, greater than or equal to 5 nozzles, greater than or equal to 10 nozzles, greater than or equal to 50 nozzles, greater than or equal to 100 nozzles, greater than or equal to 500 nozzles, greater than or equal to 1,000 nozzles, greater than or equal to 5,000 nozzles, greater than or equal to 10,000 nozzles, greater than or equal to 50,000 nozzles, greater than or equal to 100,000 nozzles, greater than or equal to 500,000 nozzles, or greater than or equal to 1,000,000 nozzles. In some embodiments, there are less than or equal to 5,000,000 nozzles, less than or equal to 1,000,000 nozzles, less than or equal to 500,000 nozzles, less than or equal to 100,000 nozzles, less than or equal to 50,000 nozzles, less than or equal to 10,000 nozzles, less than or equal to 5,000 nozzles, less than or equal to 1,000 nozzles, less than or equal to 500 nozzles, less than or equal to 100 nozzles, less than or equal to 50 nozzles, less than or equal to 10 nozzles, less than or equal to 5 nozzles, or less than or equal to 2 nozzles. Combinations of these ranges are also possible (e.g., 1-5,000,000 or 100,000-1,000,000).

The nozzles may have any suitable average diameter (i.e., the largest cross-sectional dimension). In some embodiments, the nozzles have an average diameter of greater than or equal to 5 microns, greater than or equal to 10 microns, greater than or equal to 15 microns, greater than or equal to 20 microns, greater than or equal to 25 microns, greater than or equal to 50 microns, greater than or equal to 75 microns, greater than or equal to 100 microns, greater than or equal to 150 microns, greater than or equal to 200 microns, greater than or equal to 250 microns, greater than or equal to 300 microns, greater than or equal to 350 microns, greater than or equal to 400 microns, greater than or equal to 500 microns, greater than or equal to 600 microns, greater than or equal to 700 microns, greater than or equal to 800 microns, or greater than or equal to 900 microns. In some embodiments, the nozzles have an average diameter of less than or equal to 1000 microns, less than or equal to 900 microns, less than or equal to 800 microns, less than or equal to 700 microns, less than or equal to 600 microns, less than or equal to 500 microns, less than or equal to 400 microns, less than or equal to 350 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 25 microns, less than or equal to 20 microns, less than or equal to 15 microns, or less than or equal to 10 microns. Combinations of these ranges are also possible (e.g., greater than or equal to 5 microns and less than or equal to 1000 microns or greater than or equal to 20 microns and less than or equal to 400 microns).

In some embodiments, impinging fluid on a top surface of the precursor layer comprises moving nozzles (e.g., hydrojets) at various speeds and/or patterns over a stationary precursor layer. In some embodiments, impinging fluid on a top surface of the precursor layer comprises turning nozzles (e.g., hydrojets) on and off over a moving or stationary precursor layer. In some embodiments, impinging fluid on a top surface of the precursor layer comprises moving the precursor layer (e.g., on a conveyor belt) under stationary nozzles (e.g., hydrojets). For example, in some embodiments, in FIG. 4, the method comprises impinging fluid 440 on a top surface of non-woven precursor layer 410 to produce modified layer 420, while impinging fluid 440 is stationary (e.g., the fluid is being dispersed from stationary nozzles), but non-woven precursor layer 410 moves in the direction of arrow 430 and the impinging fluid moves in the direction of arrow 450.

In embodiments where the precursor layer is moving (e.g., when the precursor layer is moving and the nozzles are stationary), the precursor layer may move at any suitable speed. In some embodiments, the precursor layer is moving at a speed of greater than or equal to 1 m/min, greater than or equal to 2 m/min, greater than or equal to 3 m/min, greater than or equal to 4 m/min, greater than or equal to 5 m/min, greater than or equal to 10 m/min, greater than or equal to 20 m/min, greater than or equal to 30 m/min, greater than or equal to 40 m/min, greater than or equal to 50 m/min, greater than or equal to 75 m/min, greater than or equal to 100 m/min, greater than or equal to 150 m/min, greater than or equal to 200 m/min, greater than or equal to 250 m/min, greater than or equal to 300 m/min, greater than or equal to 400 m/min, greater than or equal to 500 m/min, greater than or equal to 750 m/min, greater than or equal to 1000 m/min, greater than or equal to 1500 m/min, or greater than or equal to 2000 m/min with respect to the nozzles. In certain embodiments, the precursor layer is moving at a speed of less than or equal to 2500 m/min, less than or equal to 2000 m/min, less than or equal to 1500 m/min, less than or equal to 1000 m/min, less than or equal to 750 m/min, less than or equal to 500 m/min, less than or equal to 400 m/min, less than or equal to 300 m/min, less than or equal to 250 m/min, less than or equal to 200 m/min, less than or equal to 150 m/min, less than or equal to 100 m/min, less than or equal to 75 m/min, less than or equal to 50 m/min, less than or equal to 40 m/min, less than or equal to 30 m/min, less than or equal to 20 m/min, less than or equal to 10 m/min, less than or equal to 5 m/min, less than or equal to 4 m/min, less than or equal to 3 m/in, or less than or equal to 2 m/min with respect to the nozzles. Combinations of these ranges are also possible (e.g., 1-2500 m/min, 5-300 m/min, or 10-100 m/min).

The following examples are intended to illustrate certain embodiments of the present invention, but do not exemplify the full scope of the invention.

EXAMPLES

Example 1: Hydroentanglement

This example describes, in accordance with certain embodiments, the use of hydroentanglement to produce filter media with out-of-plane solid elements.

Figure 5:
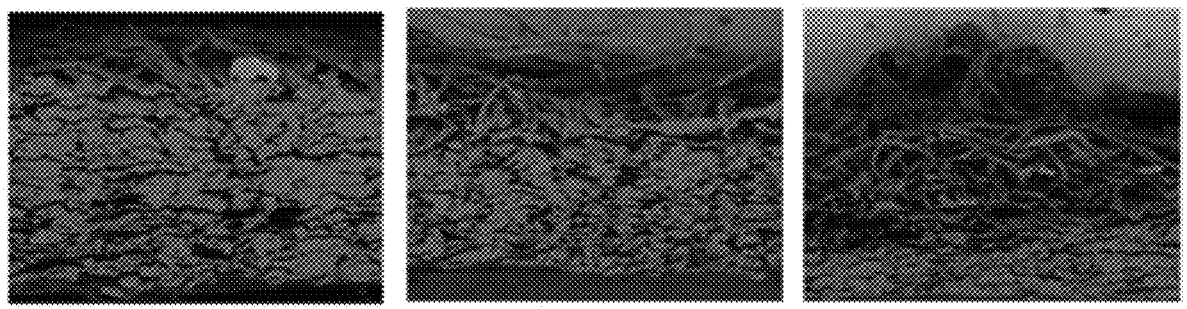
FIG. 5 is pictures of a fiber web that was not treated with hydroentanglement (left), a fiber web treated with hydroentanglement with a pressure of 10 bar (middle), and a fiber web treated with hydroentanglement with a pressure of 20 bar (right), with 200×-magnification.

In this example, wet fiber webs were passed through an array of high-pressure fine water jets. The contact time was very short (the wet fiber web moved through the hydrojets at a speed of 100 mm/s) and the water jets were very fine (between 5-50 microns), such that when the water jets touched a fiber, they did not break the fiber, but instead disturbed the fiber, causing a change in the orientation of the fiber and generating a larger void volume in the sheet. As the pressure of the water jets was increased, the relative frequency of out-of-plane solid elements increased, as shown in FIG. 5. From left to right, FIG. 5 shows a fiber web that was not treated with hydroentanglement, a fiber web treated with hydroentanglement with a pressure of 10 bar, and a fiber web treated with hydroentanglement with a pressure of 20 bar, with 200X-magnification.

Example 2: Characterization of Out-of-Plane Solid Elements in Fiber Webs Treated with Hydroentanglement This example describes, in accordance with certain embodiments, the characterization of out-of-plane solid elements of a fiber web that was treated with hydroentanglement compared to fiber webs that were not treated with hydroentanglement.

The fiber webs in Table 1 were studied in this example.

TABLE 1

| | | | | | | | |
|---|---|---|---|---|---|---|---|
| | Studied Fiber Webs | | | | | | |
| | Pressure of Hydrojets (bar) | Speed through Hydrojets (mm/s) | Type of Fibers | Average fiber diameter (microns) | Basis Weight (saturated) (gsm) | Thickness (mm) | Average Fiber length (mm) |
| C | N/A | N/A | Cellulose and polyester | Softwood: 20-35 Hardwood: 5-20 Polyester: 12 | 100 | 0.5 | Softwood: 2.0-4.0 Hardwood: 0.5-1.5 Polyester: 6.0 and 12.0 |
| C' | 30 | 100 | Cellulose and polyester | Softwood: 20-35 Hardwood: 5-20 Polyester: 12 | 100 | 0.5 | Softwood: 2.0-4.0 Hardwood: 0.5-1.5 Polyester: 6.0 and 12.0 |

Figure 6:
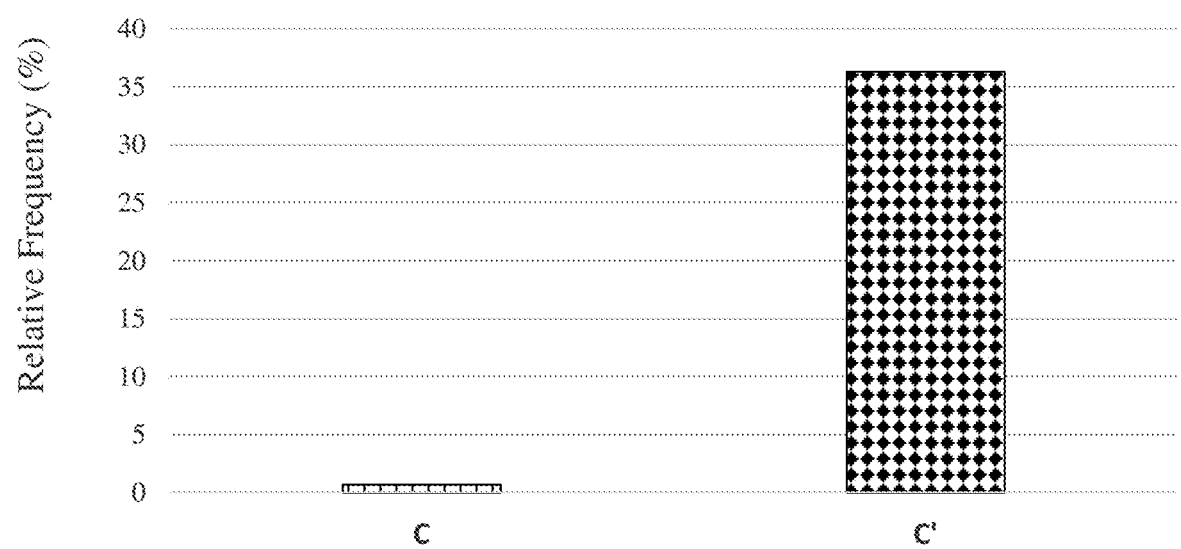
FIG. 6 is a bar chart of the relative frequency of solid elements with an orientation greater than 30 degrees in the middle 60% of the section of the sheet for a sample treated with hydroentanglement in accordance with certain embodiments and an identical sample not treated with hydroentanglement.

As shown in FIG. 6, the relative frequency of out-of-plane solid elements increased for the sample treated with hydroentanglement. FIG. 6 shows the relative frequency of solid elements with an orientation greater than 30 degrees in the middle 60% of the layer. Sample C' was treated with hydroentanglement while Sample C was not.

Figure 7:
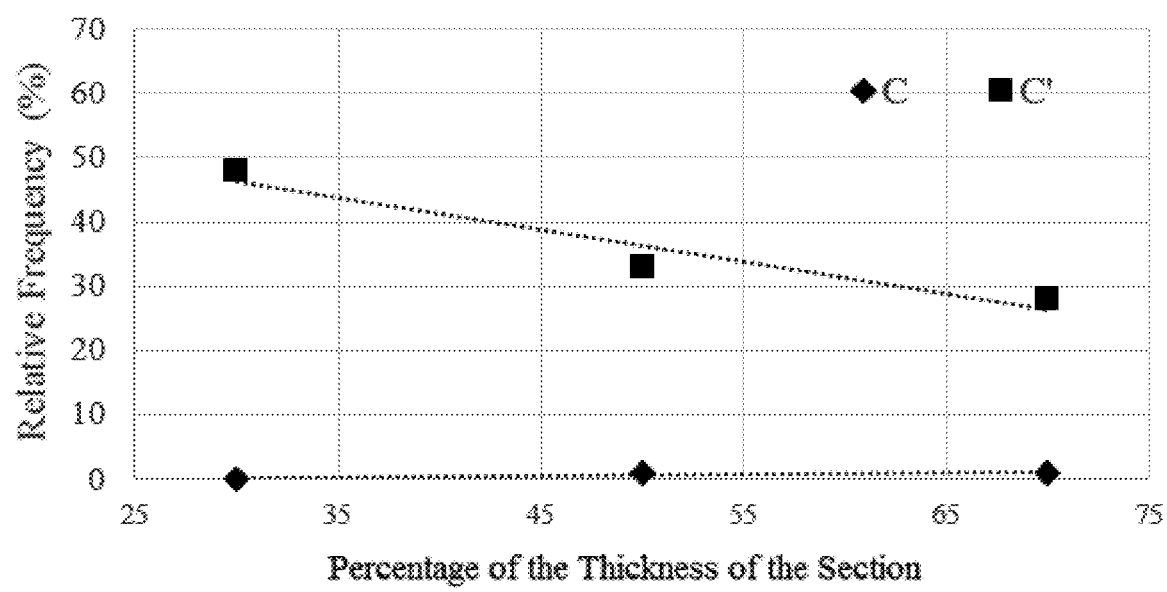
FIG. 7 is a plot of the relative frequency of out-of-plane solid elements versus the assigned location within the thickness of the layer for the middle 60% of the layer for a sample treated with hydroentanglement in accordance with certain embodiments and an identical sample not treated with hydroentanglement.

Additionally, a plot of the relative frequency of out-of-plane solid elements (y-axis) versus the assigned location within the thickness of the layer (x-axis) for the middle 60% of the section comprising out-of-plane solid elements was linear for the fiber web treated with hydroentanglement, as shown in FIG. 7. For example, as shown in Table 2, sample C' (treated with hydroentanglement) had an $R^2$ value of 0.92, while sample C (an identical sample without hydroentanglement treatment) had an $R^2$ value of 0.75. Further, as shown in Table 2, the slope for the fiber web treated with hydroentanglement was −0.5 with an $R^2$ value of 0.92.

TABLE 2

Linear Equation Parameters

|  | Slope | R-square |
|---|---|---|
| C | 0.025 | 0.75 |
| C' | −0.500 | 0.92 |

Figure 8:
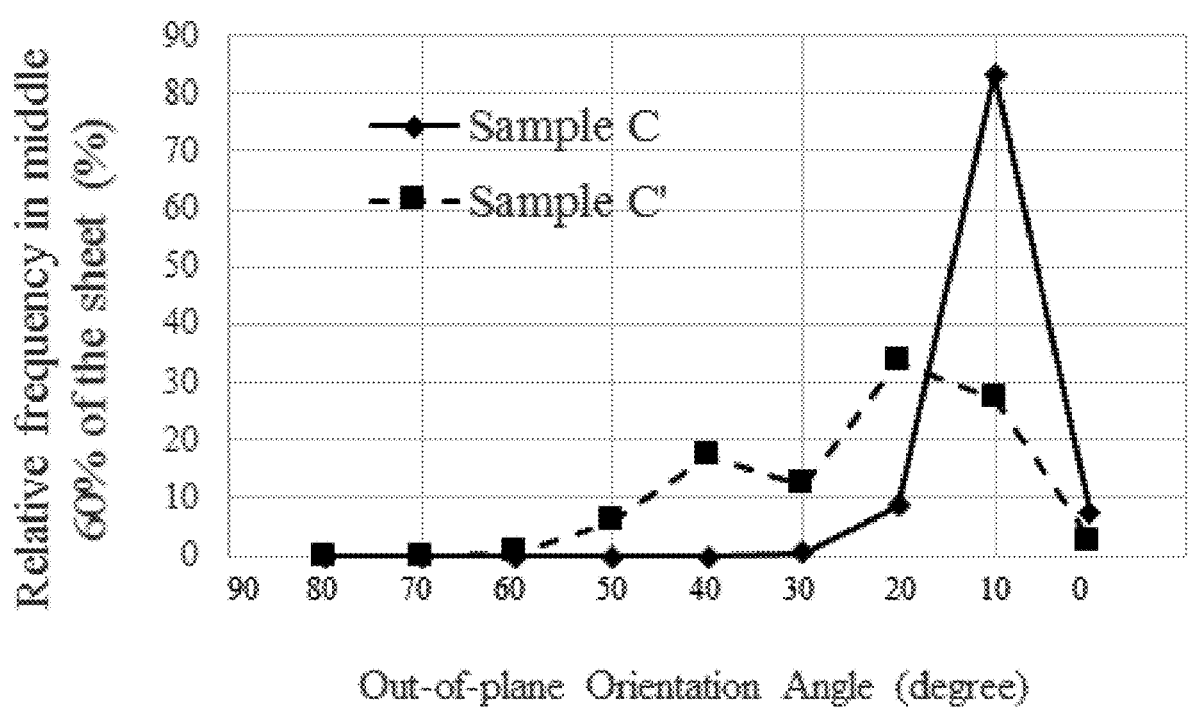
FIG. 8 is a plot of the relative frequency of out-of-plane solid elements in the middle 60% of the sheet versus out-of-plane orientation angle for a sample treated with hydroentanglement in accordance with certain embodiments compared to an identical sample not treated with hydroentanglement.

FIG. 8 is a plot of the relative frequency (%) of solid elements in the middle 60% of the sheet versus out-of-plane orientation angle for Sample C (untreated) versus Sample C' (treated with hydroentanglement). As shown in FIG. 8, all of the solid elements in Sample C had an orientation angle of less than 30 degrees, while a significant portion of the solid elements in Sample C' had an orientation angle of 30 or more degrees.

Example 3: Characterization of Filter Media Treated with Hydroentanglement

This example describes, in accordance with certain embodiments, the characteristics (such as dust holding capacity) of filter media treated with hydroentanglement.

Identical fiber webs were either not treated with hydroentanglement, treated with hydroentanglement at a pressure of 50 bar, treated with hydroentanglement at a pressure of 70 bar, or treated with hydroentanglement at a pressure of 90 bar. The fiber webs were the same as Samples C/C' from Example 2 but with various levels of hydroentanglement treatment.

As shown in Table 3, the basis weight and the overall efficiency at 20 microns (measured according to ISO 4548-12—a liquid filtration test) did not vary significantly with hydroentanglement; however, the air permeability and dust holding capacity increased significantly with hydroentanglement. For example, the air permeability in the fiber web treated at a pressure of 90 bar was 39 CFM, which was a 56% increase over that of the untreated fiber web, which had an air permeability of 25 CFM. Similarly, the dust holding capacity (measured according to ISO 4548-12—a liquid filtration test) in the fiber web treated at a pressure of 90 bar was 61 gsm, which was a 61% increase over that of the untreated fiber web, which had a dust holding capacity of 38 gsm.

TABLE 3

Characteristics of Filter Media Treated with Hydroentanglement

| Hydroentanglement Pressure (bar) | Basis Weight (lbs) | Air Permeability (CFM) | Overall Efficiency (%) at 20 Microns | Dust Holding Capacity (gsm) |
|---|---|---|---|---|
| 0 | 63 | 25 | 97 | 38 |
| 50 | 60 | 33 | 95 | 59 |
| 70 | 63 | 34 | 95 | 67 |
| 90 | 65 | 39 | 94 | 61 |

Example 4: Characterization of Filter Media Treated with Hydroentanglement

This example describes, in accordance with certain embodiments, the characteristics (such as dust holding capacity) of Samples C and C' from Example 2. As shown in Table 4, the sample treated with hydroentanglement (C') had a lower pressure drop by 55% and a higher dust holding capacity by 28% than the same sample without hydroentanglement (C), with no change in initial efficiency at 0.4 microns. The initial efficiency, pressure drop, and dust holding capacity were measured with the EN779 (2012) test with a face velocity of 2.8 cm/s.

TABLE 4

Characteristics of Samples C and C'

| Sample | Initial Efficiency (%) at 0.4 Microns | Pressure Drop (mm $H_2O$) | Dust Holding Capacity (g/m$^2$) |
|---|---|---|---|
| C | 75 | 66 | 250 |
| C' | 75 | 30 | 320 |

Example 5: Internal Bond Strength and Tensile Ratio of Filter Media Treated with Hydroentanglement This example describes, in accordance with certain embodiments, the internal bond strength and tensile ratio of filter media treated with hydroentanglement.

The tensile ratio of several fiber webs was calculated according to the following equation:

$$\text{Tensile ratio} = \frac{\text{Internal Bond Strength}}{(\text{Tensile } MD + \text{Tensile } CD)/2}$$

where the internal bond strength was measured in the z-plane (out-of-plane) and the tensile strength was measured in the XY-plane (tensile machine direction (MD) and tensile cross direction (CD)). The internal bond strength was measured according to TAPPI T569, and the tensile strength was measured according to TAPPI T494.

For each fiber web, three samples were collected from different positions in the full width roll. For each sample, two samples were cut for the tensile MD test, two samples were cut for the tensile CD test, and two samples were cut for the internal bond strength test.

Figure 9:
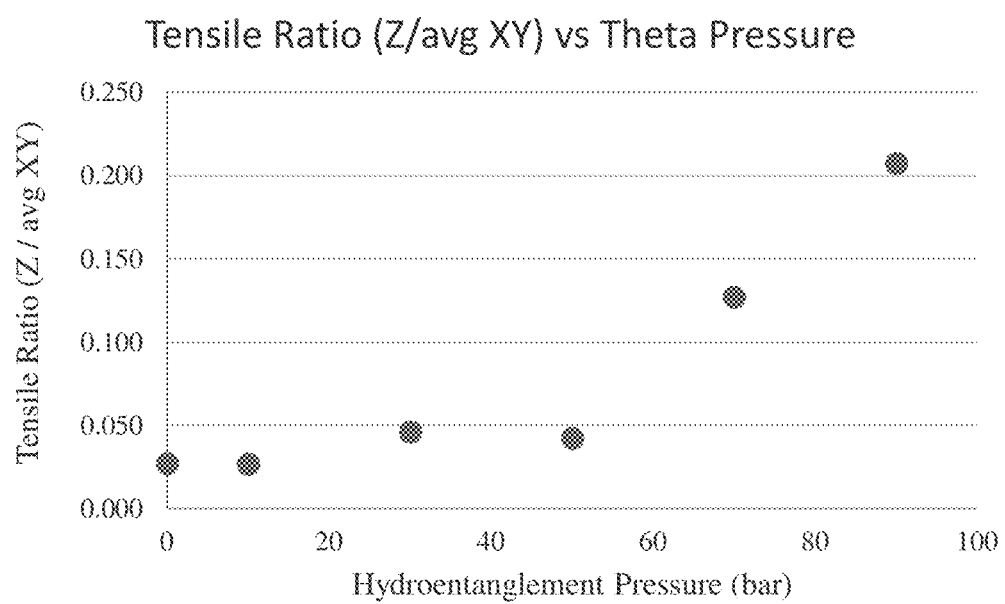
FIG. 9 is a plot of tensile ratio versus hydroentanglement pressure (bar) for samples with varying amounts of hydroentanglement pressure.

FIG. 9 is a plot of tensile ratio versus hydroentanglement pressure (bar) for various samples that are the same as Samples C/C' from Example 2 but with varying amounts of hydroentanglement pressure. FIG. 9 shows that samples had higher tensile ratios when treated with hydroentanglement at increasing pressures.

As shown in Table 5, the internal bond strength in the z-plane increased with hydroentanglement. For example, the internal bond strength in the z-plane for Sample C' with hydroentanglement (90 bar) was over 4 times greater than for Sample C without hydroentanglement.

TABLE 5

Internal Bond Strength (Z-Plane) of Samples C and C'

| Sample | Internal Bond Strength (z-plane) ($10^3$ ft * lbs/in$^2$) |
|---|---|
| C | 70 |
| C' (90 bar) | 302 |

Example 6: Characterization of Filter Media Treated with Hydroentanglement

This example describes, in accordance with certain embodiments, the characteristics of filter media treated with hydroentanglement.

Figure 10:
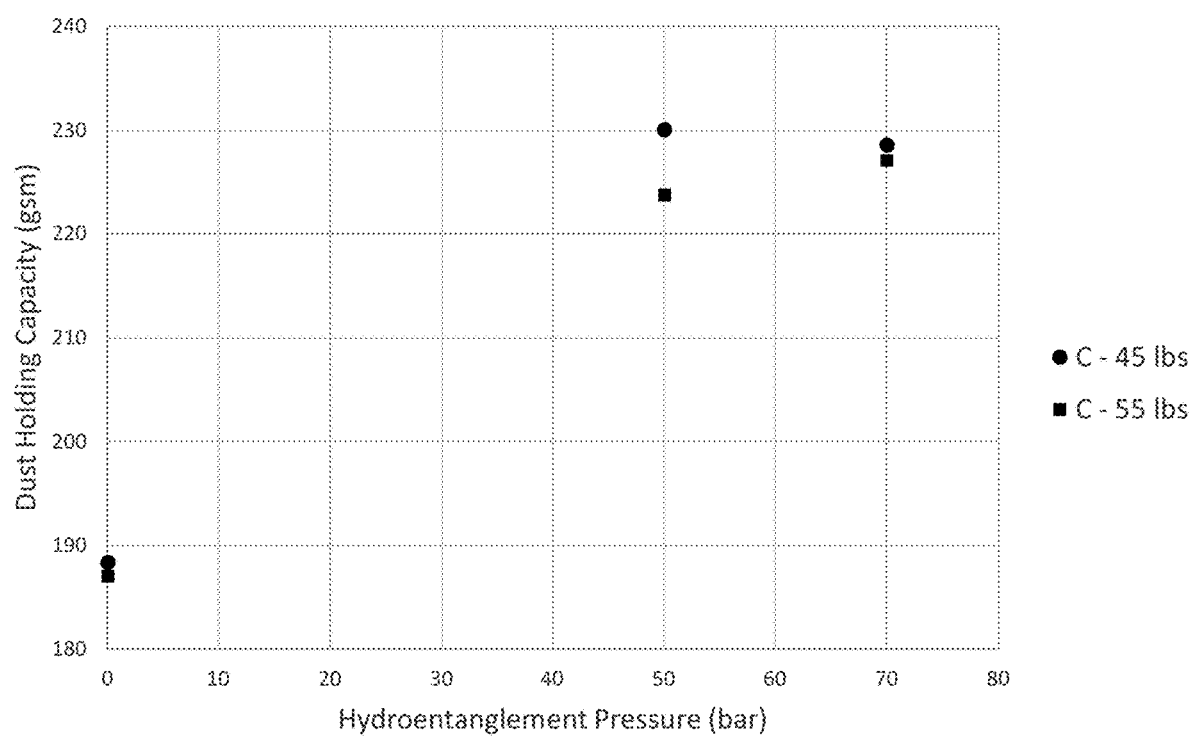
FIG. 10 is a plot of the dust holding capacity versus the hydroentanglement pressure (bar) for samples with varying basis weights and amounts of hydroentanglement pressure.

FIG. 10 is a plot of the dust holding capacity versus the hydroentanglement pressure (bar) for various samples that are the same as Samples C/C' from Example 2 but with varying basis weights and hydroentanglement treatments. This was measured according to ISO 5011 (2014) at 5.33 cm/s, with ISO A2 fine dust. FIG. 10 demonstrates that the dust holding capacity increased for samples treated with hydroentanglement compared to untreated samples.

Figure 11:
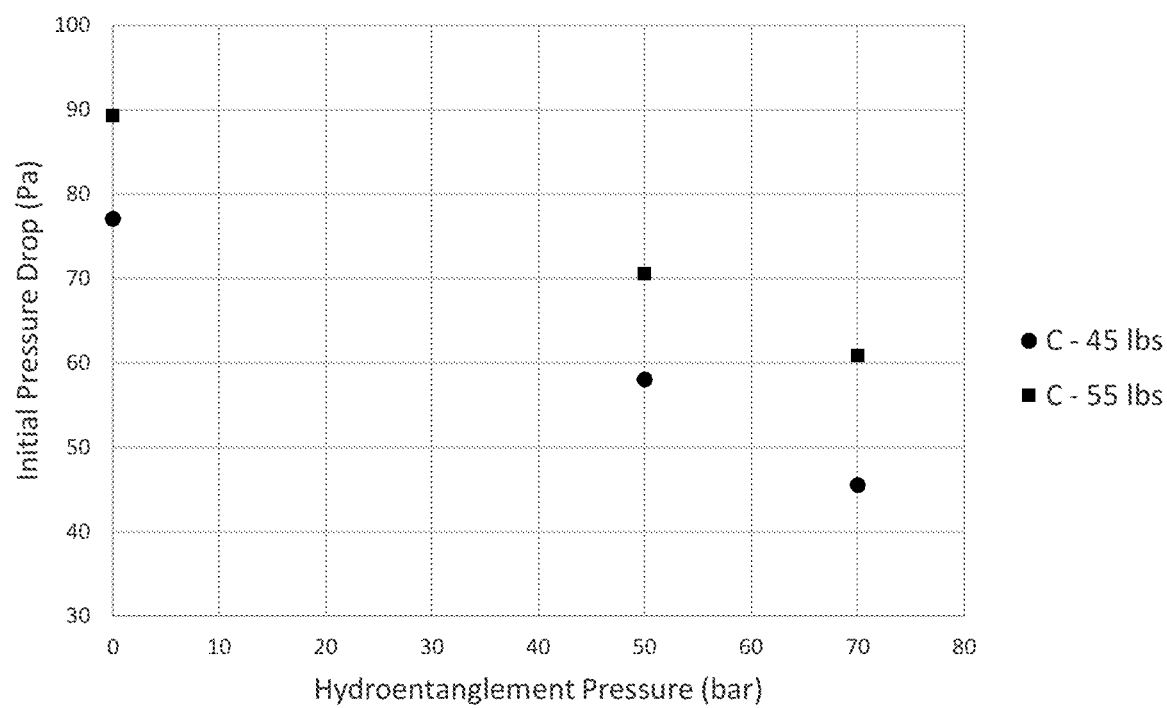
FIG. 11 is a plot of the initial pressure drop (Pa) versus the hydroentanglement pressure (bar) for samples with varying basis weights and amounts of hydroentanglement pressure.

FIG. 11 is a plot of the initial pressure drop (Pa) versus the hydroentanglement pressure (bar) for various samples that are the same as Samples C/C' from Example 2 but with varying basis weights and hydroentanglement treatments. The initial pressure drop was measured with ISO 5011 (2014) at a face velocity of 5.33 cm/s using ISO Fine A2 dust. FIG. 11 demonstrates that the initial pressure drop decreased with hydroentanglement at increasing pressures.

Figure 12:
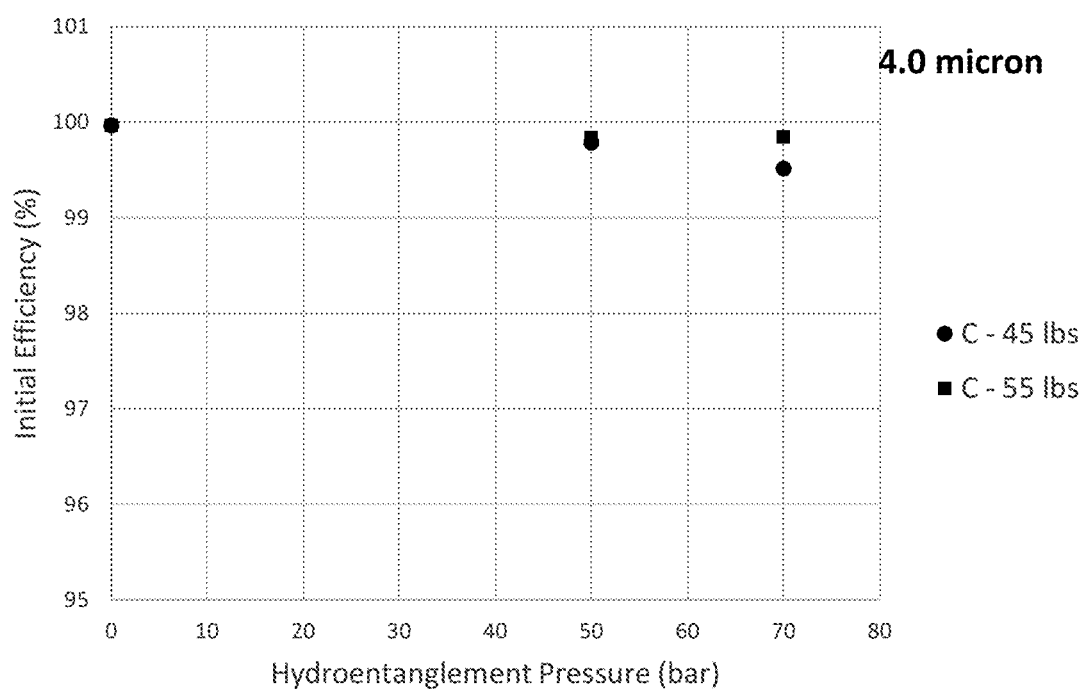
FIG. 12 is a plot of the initial efficiency at 4 microns versus the hydroentanglement pressure (bar) for samples with varying basis weights and amounts of hydroentanglement pressure.

FIG. 12 is a plot of the initial efficiency at 4 microns (%) (determined according to ISO5011 at a face velocity of 5.33 cm/s) versus the hydroentanglement pressure (bar) for various samples that are the same as Samples C/C' from Example 2 but with varying basis weights and hydroentanglement treatments. FIG. 12 demonstrates that the initial efficiency at 4 microns did not change significantly with hydroentanglement at increasing pressures.

Figure 13:
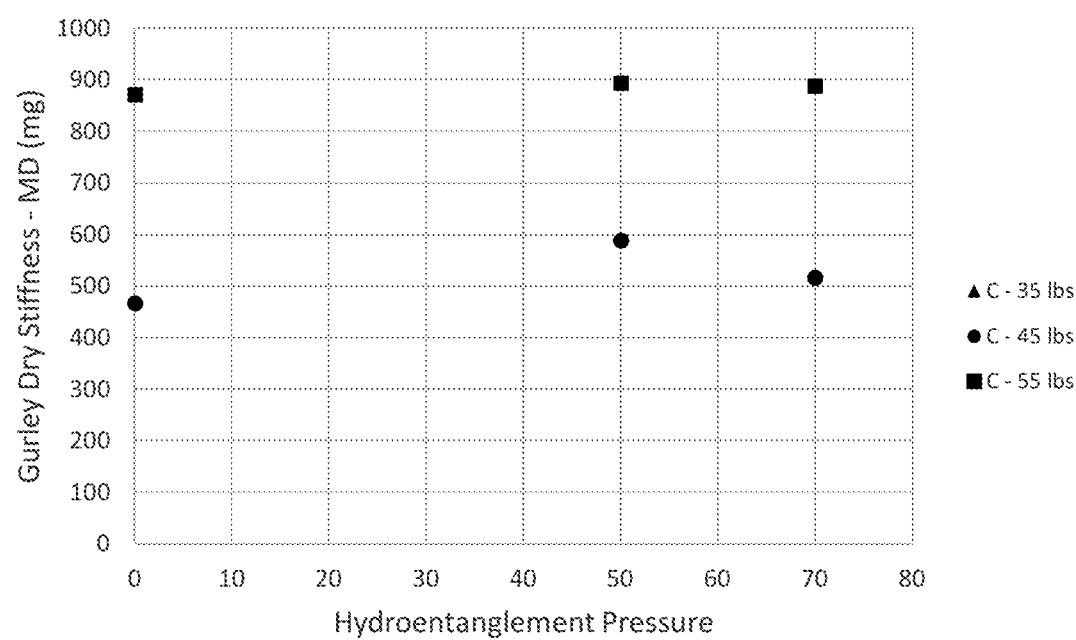
FIG. 13 is a plot of the Gurley bending dry stiffness in the machine direction versus the hydroentanglement pressure (bar) for samples with varying basis weights and amounts of hydroentanglement pressure.

FIG. 13 is a plot of the Gurley bending dry stiffness in the machine direction (mg) (1.5"×2" sample) versus the hydroentanglement pressure (bar) for various samples that are the same as Samples C/C' from Example 2 but with varying basis weights and hydroentanglement treatments. FIG. 13 demonstrates that the Gurley bending dry stiffness in the machine direction generally did not change significantly with hydroentanglement at increasing pressures.

Figure 14:
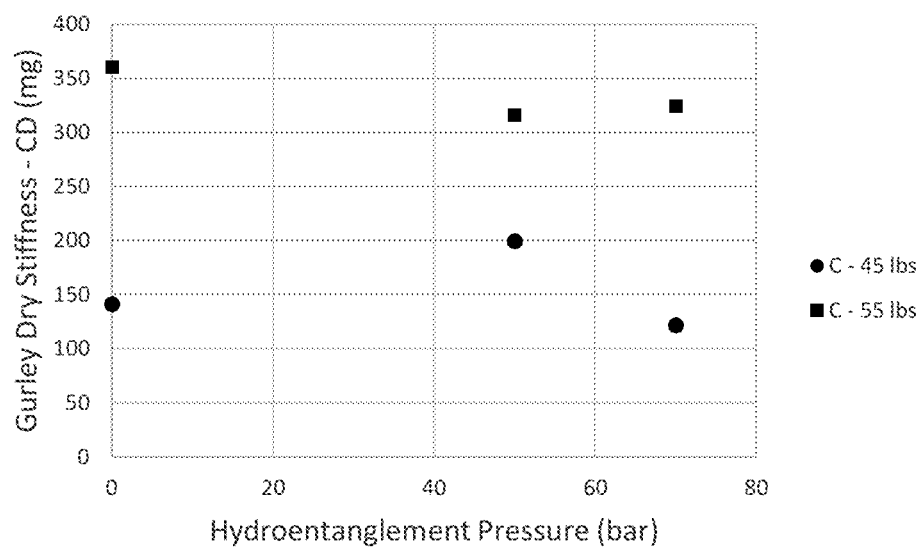
FIG. 14 is a plot of the Gurley bending dry stiffness in the cross direction versus the hydroentanglement pressure (bar) for samples with varying basis weights and amounts of hydroentanglement pressure.

FIG. 14 is a plot of the Gurley bending dry stiffness in the cross direction (mg) (1.5"×2" sample) versus the hydroentanglement pressure (bar) for various samples that are the same as Samples C/C' from Example 2 but with varying basis weights and hydroentanglement treatments. FIG. 14 demonstrates that the Gurley bending dry stiffness in the cross direction generally did not change significantly with hydroentanglement at increasing pressures.

Further, samples that are the same as Samples C/C' from Example 2 but with varying basis weights and various hydroentanglement treatments were then coated with electrospun nanofibers.

Figure 15:
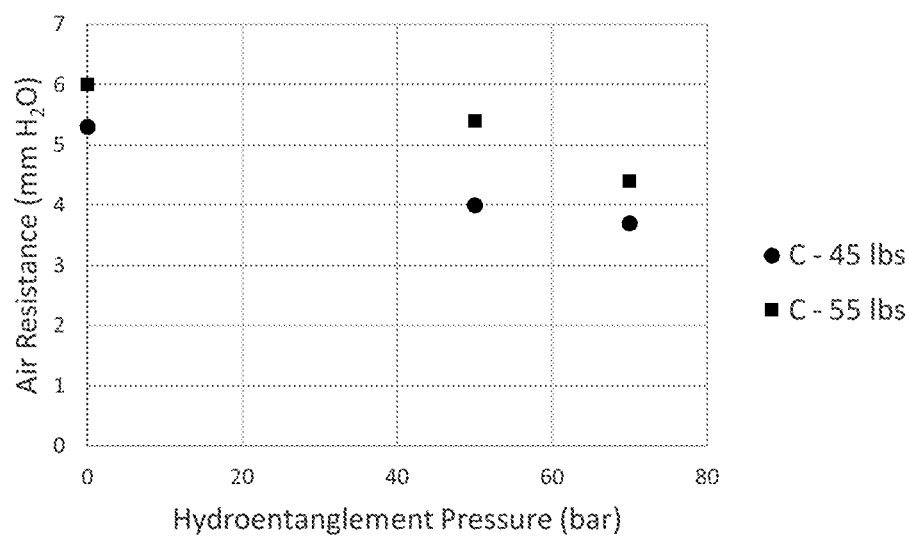
FIG. 15 is a plot of the air resistance of electrospun nanofiber coated samples with varying basis weights and amounts of hydroentanglement pressure versus the hydroentanglement pressure (bar).

FIG. 15 is a plot of the air resistance (mmH$_2$O) (at 2.8 cm/s) of these electrospun nanofiber coated samples versus the hydroentanglement pressure (bar). FIG. 15 demonstrates that the air resistance of these electrospun nanofiber coated samples decreased with hydroentanglement at increasing pressures.

Figure 17:
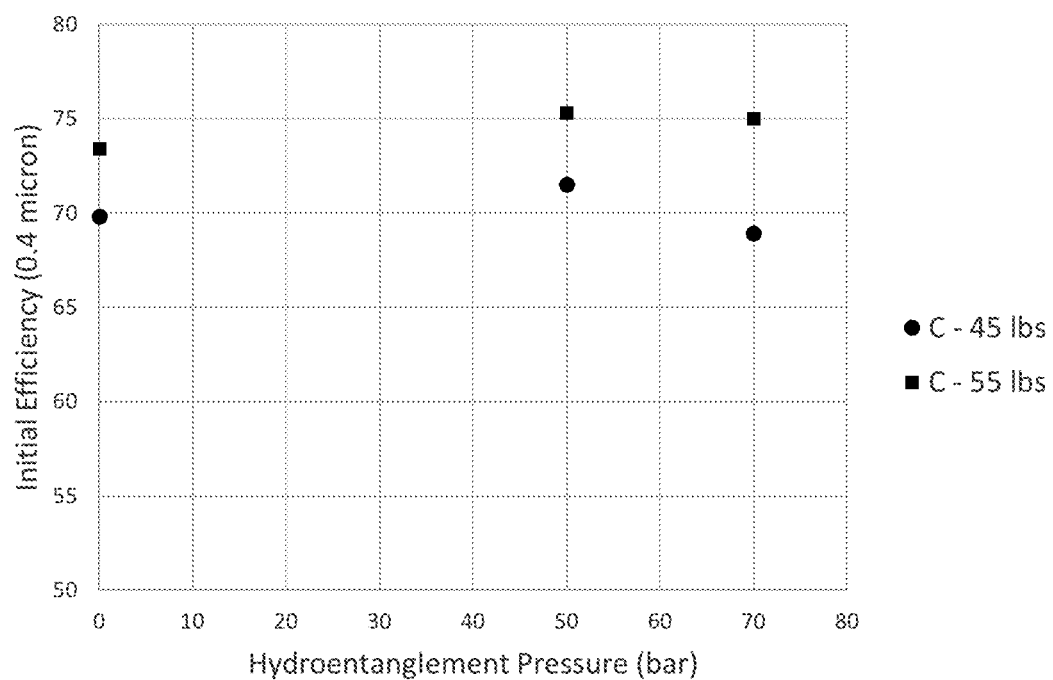
FIG. 17 is a plot of the initial efficiency at 0.4 microns of electrospun nanofiber coated samples with varying basis weights and amounts of hydroentanglement pressure versus the hydroentanglement pressure (bar).

FIG. 17 is a plot of the initial efficiency at 0.4 microns (at 2.8 cm/s) (EN779 (2012)) (%) for these electrospun nanofiber coated samples versus the hydroentanglement pressure (bar). FIG. 17 demonstrates that the initial efficiency at 0.4 microns of these electrospun nanofiber coated samples did not change significantly with hydroentanglement at increasing pressures.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A filter media, comprising:
   a non-woven fibrous layer defining a plane, wherein the non-woven fibrous layer has an average fiber length of less than or equal to 26 mm;
   wherein at least a section of the non-woven fibrous layer has a gradient in relative frequency of out-of-plane solid elements having an out-of-plane orientation angle of greater than 30 degrees;
   wherein the section has a thickness that extends from a top surface of the section to a bottom surface of the section, wherein the top surface is the surface with the highest relative frequency of out-of-plane solid elements;
   wherein the section has a total volume that includes a first volume portion, a second volume portion and a third volume portion;
   wherein the first volume portion starts at a cross-sectional area located at 20% of the thickness and extends to a cross-sectional area located at 40% of the thickness, wherein a first relative frequency of the out-of-plane solid elements in the first volume portion is assigned to be located at a cross-sectional area located at 30% of the thickness;
   wherein the second volume portion starts at a cross-sectional area located at 40% of the thickness and extends to a cross-sectional area located at 60% of the thickness, wherein a second relative frequency of the out-of-plane solid elements in the second volume portion is assigned to be located at a cross-sectional area located at 50% of the thickness;
   wherein the third volume portion starts at a cross-sectional area located at 60% of the thickness and extends to a cross-sectional area located at 80% of the thickness, wherein a third relative frequency of the out-of-plane solid elements in the third volume portion is assigned to be located at a cross-sectional area located at 70% of the thickness;
   wherein the gradient in relative frequency of the out-of-plane solid elements is represented by a linear equation fit to the first relative frequency of the out-of-plane solid elements, the second relative frequency of the out-of-plane solid elements, and the third relative frequency of the out-of-plane solid elements;
   wherein the linear equation is y=mx+b, where y is the relative frequency of the out-of-plane solid elements (expressed in percentage), x is the assigned location within the thickness of the section (expressed in percentage of the thickness from the top surface of the section), m is the slope, and b is the y-intercept;
   wherein the slope is greater than or equal to $-10$ and less than or equal to $-0.01$; and
   wherein the linear equation has an $R^2$ value of greater than or equal to 0.9.
2. A method, comprising:
providing a non-woven precursor layer defining a plane and comprising fibers, wherein the fibers have an average fiber length of less than or equal to 26 mm;
impinging fluid on a top surface of the precursor layer to produce a modified layer,
wherein at least a section of the modified layer comprises out-of-plane solid elements having an out-of-plane orientation angle of greater than 30 degrees;
wherein the section has a thickness that extends from a top surface of the section to a bottom surface of the section, wherein the top surface is the surface with the highest relative frequency of out-of-plane solid elements;
wherein the section has a total volume that includes a first volume portion, a second volume portion and a third volume portion;
wherein the first volume portion starts at a cross-sectional area located at 20% of the thickness and extends to a cross-sectional area located at 40% of the thickness, wherein a first relative frequency of the out-of-plane solid elements in the first volume portion is assigned to be located at a cross-sectional area located at 30% of the thickness;

wherein the second volume portion starts at a cross-sectional area located at 40% of the thickness and extends to a cross-sectional area located at 60% of the thickness, wherein a second relative frequency of the out-of-plane solid elements in the second volume portion is assigned to be located at a cross-sectional area located at 50% of the thickness;

wherein the third volume portion starts at a cross-sectional area located at 60% of the thickness and extends to a cross-sectional area located at 80% of the thickness, wherein a third relative frequency of the out-of-plane solid elements in the third volume portion is assigned to be located at a cross-sectional area located at 70% of the thickness;

wherein the section has a gradient in relative frequency of the out-of-plane solid elements across at least a portion of the thickness and the gradient is represented by a linear equation fit to the first relative frequency of the out-of-plane solid elements, the second relative frequency of the out-of-plane solid elements, and the third relative frequency of the out-of-plane solid elements;

wherein the linear equation is y=mx+b, where y is the relative frequency of the out-of-plane solid elements (expressed in percentage), x is the assigned location within the thickness of the section (expressed in percentage of the thickness from the top surface of the section), m is the slope, and b is the y-intercept;

wherein the slope is greater than or equal to −10 and less than or equal to −0.01; and wherein the linear equation has an $R^2$ value of greater than or equal to 0.9.

3. The filter media of claim 1, wherein the slope is less than or equal to −0.15.

4. The filter media of claim 1, wherein the thickness of the section is greater than or equal to 80% and less than or equal to 100% of the thickness of the non-woven fibrous layer.

5. The filter media of claim 1, wherein the out-of-plane solid elements that form the gradient have an out-of-plane orientation angle of less than 60 degrees.

6. The filter media of claim 1, wherein the total volume of the section has a relative frequency of the out-of-plane solid elements of greater than or equal to 5% and less than or equal to 100%.

7. The filter media of claim 1, wherein the non-woven fibrous layer has a tensile ratio of greater than or equal to 0.03.

8. The filter media of claim 1, wherein the non-woven fibrous layer has a Gurley bending dry stiffness of greater than or equal to 50 mg and less than or equal to 10,000 mg.

9. The filter media of claim 1, wherein the non-woven fibrous layer has an average fiber length of greater than or equal to 1 millimeter and less than or equal to 15 millimeters.

10. The filter media of claim 1, wherein the non-woven fibrous layer has an average fiber diameter of greater than or equal to 1 micron and less than or equal to 100 microns.

11. The filter media of claim 1, wherein the non-woven fibrous layer comprises synthetic fibers, glass fibers, cellulose fibers, and/or cellulose derivative fibers.

12. The filter media of claim 1, wherein the non-woven fibrous layer comprises a resin.

13. The filter media of claim 1, wherein the non-woven fibrous layer has a thickness of greater than or equal to 0.025 millimeters and less than or equal to 5 millimeters as measured with scanning electron microscopy.

14. The filter media of claim 1, wherein the non-woven fibrous layer has a basis weight of greater than or equal to 10 gsm and less than or equal to 500 gsm.

15. The filter media of claim 1, wherein the non-woven fibrous layer has an air permeability of greater than or equal to 1 CFM and less than or equal to 1,000 CFM.

16. The filter media of claim 1, further comprising a second layer.

17. The filter media of claim 1, wherein the filter media has a dust holding capacity of greater than or equal to 1 gsm and less than or equal to 1,500 gsm measured according to ISO 5011 (2014) at 5.33 cm/s using ISO Fine A2 dust.

18. The filter media of claim 1, wherein the filter media has an initial pressure drop of greater than or equal to 0.01 Pa and less than or equal to 4,000 Pa.

19. The filter media of claim 1, wherein the non-woven fibrous layer has an internal bond strength in the Z-plane of greater than or equal to 20 $10^3$ ft*lbs/in$^2$ and less than or equal to 1,000 $10^3$ ft*lbs/in$^2$.

20. The filter media of claim 1, wherein the non-woven fibrous layer has an average fiber length of greater than or equal to 1 millimeter and less than or equal to 26 mm.

21. The filter media of claim 1, wherein the non-woven fibrous layer is wetlaid.

22. The method of claim 2, wherein the fibers have an average fiber length of greater than or equal to 1 millimeter and less than or equal to 26 mm.

* * * * *